United States Patent
Pan et al.

(10) Patent No.: US 12,526,862 B1
(45) Date of Patent: Jan. 13, 2026

(54) METHOD AND APPARATUS FOR SUPPORTING LINK IDENTIFIER UPDATE FOR UE-TO-UE RELAY COMMUNICATION IN A WIRELESS COMMUNICATION SYSTEM

(71) Applicant: ASUS Technology Licensing Inc., Beitou District Taipei (TW)

(72) Inventors: Li-Te Pan, Taipei (TW); Richard Lee-Chee Kuo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/235,860

(22) Filed: Jun. 12, 2025

Related U.S. Application Data

(60) Provisional application No. 63/669,617, filed on Jul. 10, 2024.

(51) Int. Cl.
| | | |
|---|---|---|
| *H04W 76/14* | (2018.01) | |
| *H04W 76/20* | (2018.01) | |
| *H04W 76/30* | (2018.01) | |

(52) U.S. Cl.
CPC ........... *H04W 76/14* (2018.02); *H04W 76/20* (2018.02); *H04W 76/30* (2018.02)

(58) Field of Classification Search
CPC ...... H04W 76/14; H04W 76/20; H04W 76/30
See application file for complete search history.

(56) References Cited

U.S. PATENT DOCUMENTS

| | | | |
|---|---|---|---|
| 9,526,122 B2 | 12/2016 | Shin et al. | |
| 2019/0394816 A1* | 12/2019 | Kim | H04W 76/10 |
| 2021/0352767 A1* | 11/2021 | Paladugu | H04W 76/11 |
| 2022/0377524 A1* | 11/2022 | Ferdi | H04W 28/0273 |
| 2023/0007447 A1* | 1/2023 | Kuo | H04W 76/11 |
| 2023/0061284 A1* | 3/2023 | Perras | H04W 4/023 |
| 2023/0148166 A1* | 5/2023 | Kuo | H04W 40/22 370/328 |
| 2023/0262579 A1* | 8/2023 | Zhang | H04W 40/248 370/254 |
| 2023/0413350 A1* | 12/2023 | Guo | H04W 76/14 |
| 2025/0008605 A1* | 1/2025 | Zhou | H04W 48/16 |
| 2025/0063617 A1* | 2/2025 | Lu | H04W 88/04 |
| 2025/0142446 A1* | 5/2025 | Zheng | H04W 76/11 |

* cited by examiner

*Primary Examiner* — Will W Lin
(74) *Attorney, Agent, or Firm* — Blue Capital Law Firm, P.C.

(57) ABSTRACT

A method and device for a relay User Equipment (UE) are disclosed. In one embodiment, the relay UE establishes a first direct link with a source end UE and a second direct link with a target end UE for supporting UE-to-UE (U2U) relay communication between the source end UE and the target end UE via the relay UE. The relay UE also receives a first link identifier update request message from the source end UE for updating a first user info of the source end UE to a second user info of the source end UE. Furthermore, the relay UE, in response to reception of the first link identifier update request message, performs a first relay update procedure with the target end UE.

12 Claims, 31 Drawing Sheets

| IEI | Information Element | Type/Reference | Presence | Format | Length |
|---|---|---|---|---|---|
|  | PROSE DIRECT LINK IDENTIFIER UPDATE REQUEST message identity | ProSe PC5 signalling message type 11.3.1 | M | V | 1 |
|  | Sequence number | Sequence number 11.3.2 | M | V | 1 |
|  | MSB of K$_{NRP-sess}$ ID | MSB of K$_{NRP-sess}$ ID 11.3.13 | M | V | 1 |
|  | Source layer-2 ID | Layer-2 ID 11.3.25 | M | V | 3 |
| 27 | Source user info | Application layer ID 11.3.4 | O | TLV | 3-257 |
| 60 | Source link local IPv6 address | Link local IPv6 address 11.3.7 | O | TV | 17 |
| 30 | Source end UE IP address | UE IP address 11.3.49 | O | TLV | 7-19 |
| A- | IP address/prefix needed indication | IP address/prefix needed indication 11.3.42 | O | TV | 1 |
| 69 | List of target end UE user info | List of application layer IDs 11.3.34 | O | TLV | 3-257 |
| 6A | List of target end UE IP addresses | List of UE IP addresses 11.3.50 | O | TLV | 17-257 |

FIG. 21 (PRIOR ART)

| IEI | Information Element | Type/Reference | Presence | Format | Length |
|---|---|---|---|---|---|
| | PROSE DIRECT LINK IDENTIFIER UPDATE REJECT message identity | ProSe PC5 signalling message type 11.3.1 | M | V | 1 |
| | Sequence number | Sequence number 11.3.2 | M | V | 1 |
| | PC5 signalling protocol cause | PC5 signalling protocol cause 11.3.8 | M | V | 1 |

FIG. 22 (PRIOR ART)

| IEI | Information Element | Type/Reference | Presence | Format | Length |
|---|---|---|---|---|---|
| | PROSE UE TO UE RELAY UPDATE REQUEST message identity | ProSe PC5 signalling message type 11.3.1 | M | V | 1 |
| | Sequence number | Sequence number 11.3.2 | M | V | 1 |
| | MSB of K$_{NRP-sess}$ ID | MSB of K$_{NRP-sess}$ ID 11.3.13 | M | V | 1 |
| | Source layer-2 ID | Layer-2 ID 11.3.25 | M | V | 3 |
| 36 | Old source end UE IP address | UE IP address 11.3.49 | O | TLV | 7-19 |
| 37 | New source end UE IP address | UE IP address 11.3.49 | O | TLV | 7-19 |
| 6C | Old source end UE user info | Application layer ID 11.3.4 | O | TLV | 3-257 |
| 6D | New source end UE user info | Application layer ID 11.3.4 | O | TLV | 3-257 |

FIG. 23 (PRIOR ART)

| IEI | Information Element | Type/Reference | Presence | Format | Length |
|---|---|---|---|---|---|
|  | PROSE UE TO UE RELAY UPDATE ACCEPT message identity | ProSe PC5 signalling message type 11.3.1 | M | V | 1 |
|  | Sequence number | Sequence number 11.3.2 | M | V | 1 |
|  | LSB of KNRP-sess ID | LSB of KNRP-sess ID 11.3.15 | M | V | 1 |
|  | MSB of KNRP-sess ID | MSB of KNRP-sess ID 11.3.13 | M | V | 1 |
|  | Source layer-2 ID | Layer-2 ID 11.3.25 | M | V | 3 |
|  | Target layer-2 ID | Layer-2 ID 11.3.25 | M | V | 3 |
| 36 | Old source end UE IP address | UE IP address 11.3.49 | O | TLV | 7-19 |
| 37 | New source end UE IP address | UE IP address 11.3.49 | O | TLV | 7-19 |
| 6C | Old source end UE user info | Application layer ID 11.3.4 | O | TLV | 3-257 |
| 6D | New source end UE user info | Application layer ID 11.3.4 | O | TLV | 3-257 |

FIG. 24 (PRIOR ART)

| IEI | Information Element | Type/Reference | Presence | Format | Length |
|---|---|---|---|---|---|
| | PROSE UE TO UE RELAY UPDATE REJECT message identity | ProSe PC5 signalling message type 11.3.1 | M | V | 1 |
| | Sequence number | Sequence number 11.3.2 | M | V | 1 |
| | PC5 signalling protocol cause | PC5 signalling protocol cause 11.3.8 | M | V | 1 |

FIG. 25 (PRIOR ART)

METHOD AND APPARATUS FOR SUPPORTING LINK IDENTIFIER UPDATE FOR UE-TO-UE RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/669,617 filed on Jul. 10, 2024, the entire disclosure of which is incorporated herein in its entirety by reference.

FIELD

This disclosure generally relates to wireless communication networks, and more particularly, to a method and apparatus for supporting link identifier update for UE-to-UE relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a relay User Equipment (UE) are disclosed. In one embodiment, the relay UE establishes a first direct link with a source end UE and a second direct link with a target end UE for supporting UE-to-UE (U2U) relay communication between the source end UE and the target end UE via the relay UE. The relay UE also receives a first link identifier update request message from the source end UE for updating a first user info of the source end UE to a second user info of the source end UE. Furthermore, the relay UE, in response to reception of the first link identifier update request message, performs a first relay update procedure with the target end UE, wherein a first relay update request message sent from the relay UE to the target end UE in the first relay update procedure includes the first user info of the source end UE as the source end UE's old user info and the second user info of the source end UE as the source end UE's new user info. The relay UE also receives a second link identifier update request message from the source end UE for updating the first user info of the source end UE to a third user info of the source end UE. In addition, the relay UE, in response to reception of the second link identifier update request message, performs a second relay update procedure with the target end UE, wherein a second relay update request message sent from the relay UE to the target end UE in the second relay update procedure includes the second user info of the source end UE as the source end UE's old user info and the third user info of the source end UE as the source end UE's new user info in case the first relay update procedure with the target end UE is completed successfully.

BRIEF DESCRIPTION OF THE DRAWINGS

FIG. 21 is a reproduction of Table 10.3.18.1.1 of 3GPP TS 24.554 V18.4.0.

FIG. 22 is a reproduction of Table 10.3.21.1.1 of 3GPP TS 24.554 V18.4.0.

FIG. 23 is a reproduction of Table 10.3.28.1.1 of 3GPP TS 24.554 V18.4.0.

FIG. 24 is a reproduction of Table 10.3.29.1.1 of 3GPP TS 24.554 V18.4.0.

FIG. 25 is a reproduction of Table 10.3.33.1.1 of 3GPP TS 24.554 V18.4.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 v18.6.0, "Proximity based Services (ProSe) in the 5G System (5GS) (Release 18)"; and TS 24.554 V18.4.0, "Proximity-services (ProSe) in 5G System (5GS) protocol aspects; Stage 3 (Release 18)". The standards and documents listed above are hereby expressly incorporated by reference in their entirety.

Figure 1:
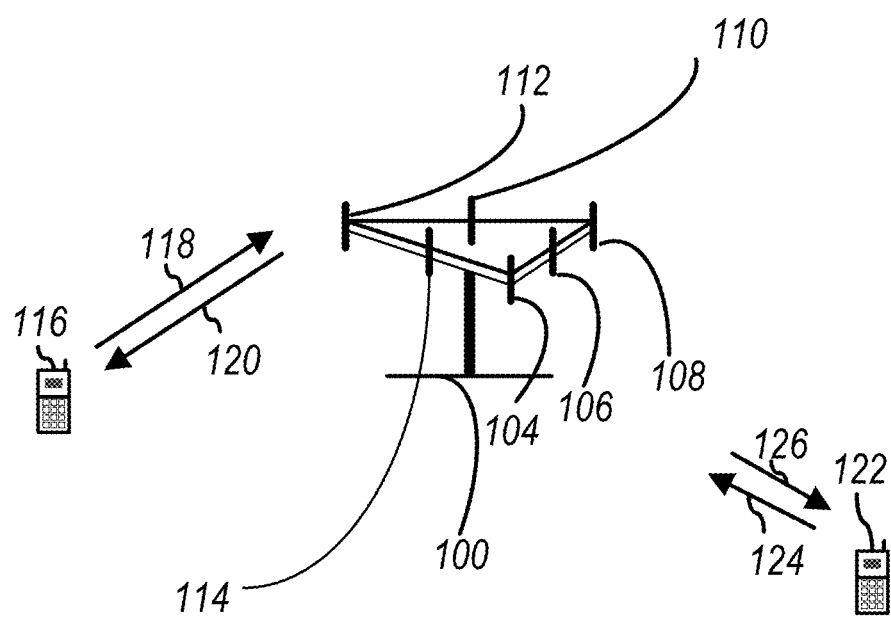
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
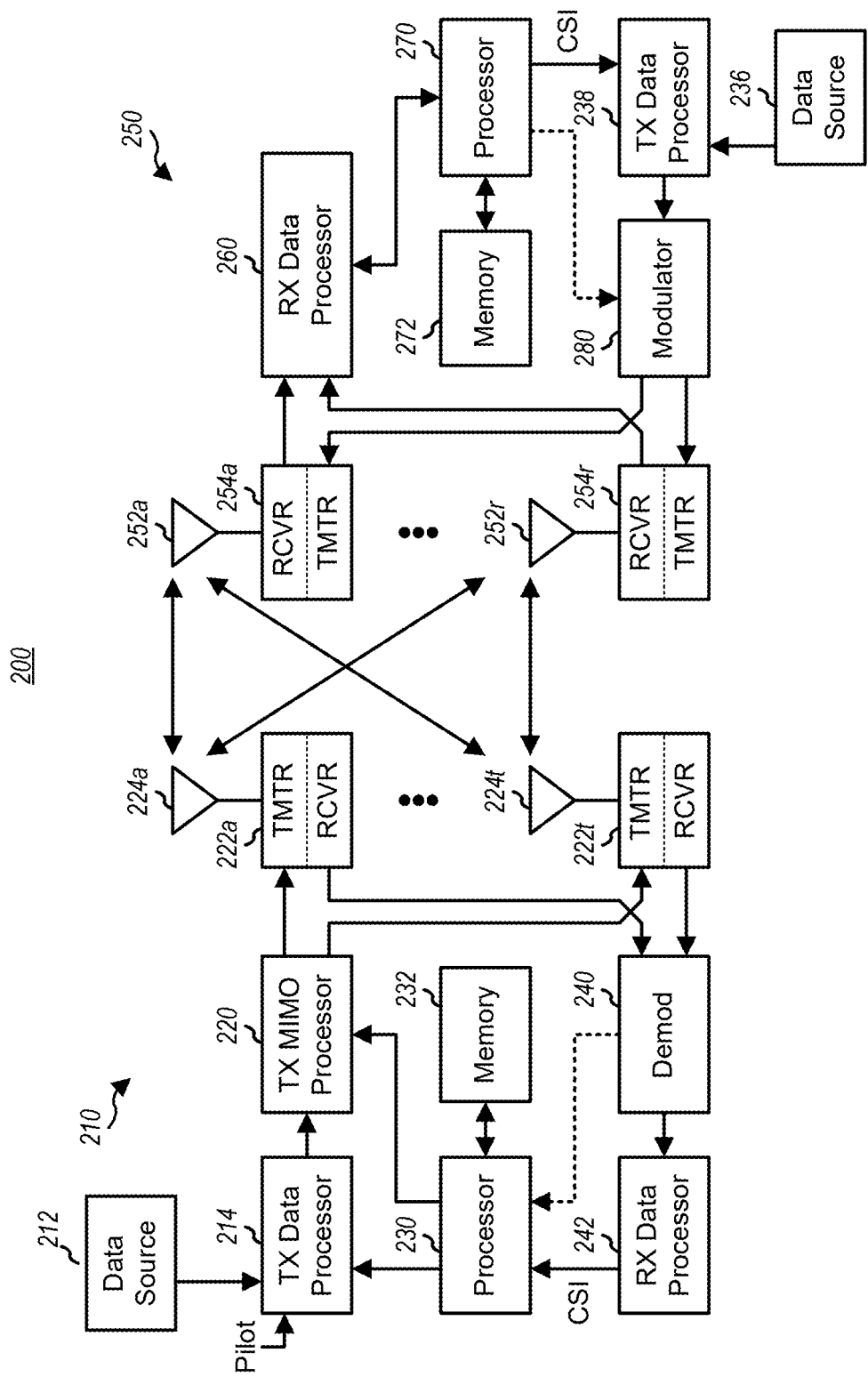
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides Nr modulation symbol streams to Nr transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Nr modulated signals from transmitters 222a through 222t are then transmitted from Nr antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
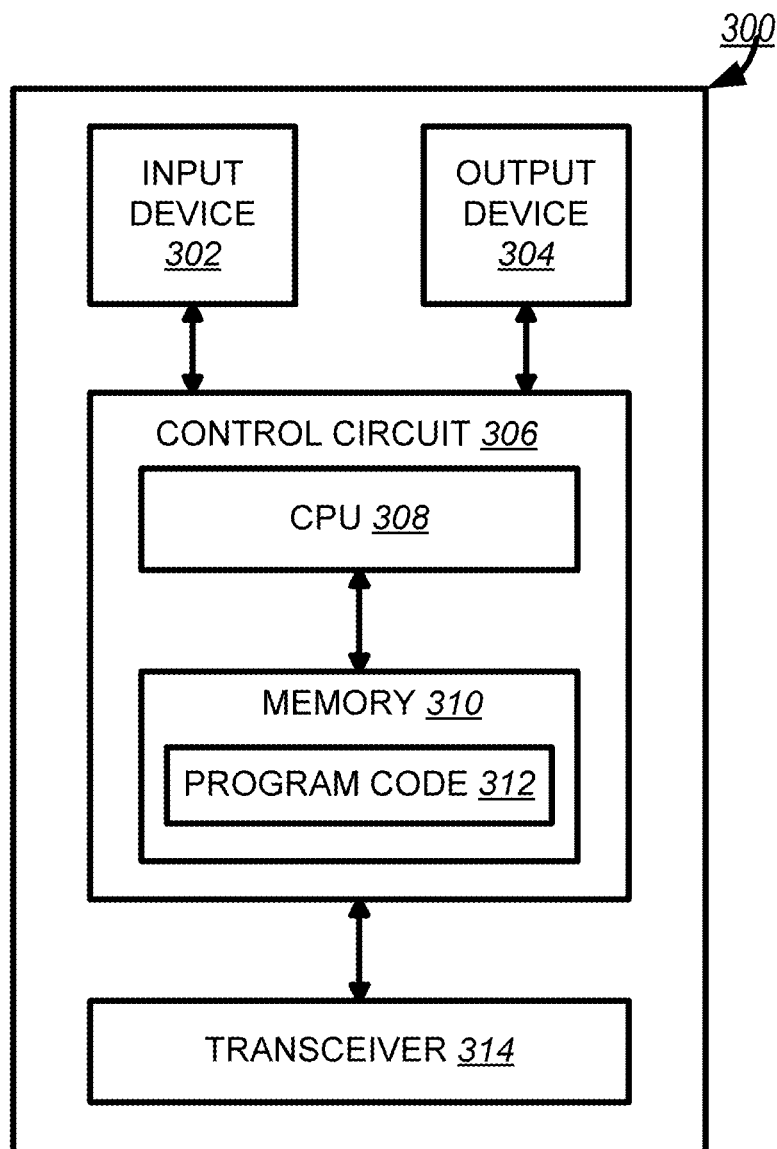
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
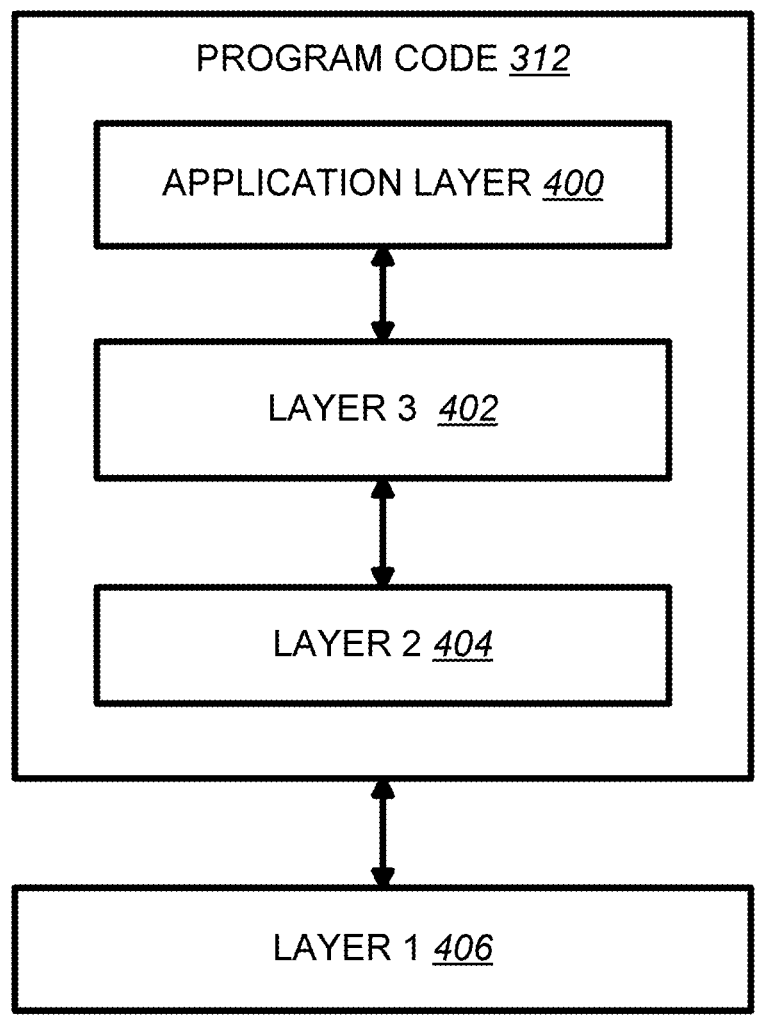
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 introduced the following concepts:
4.2.8 5G ProSe UE-to-UE Relay Reference Architecture Figure 4.2.8-1 shows the Layer-2 and Layer-3 5G ProSe UE-to-UE Relay reference architecture. The 5G ProSe End UEs communicate with each other via a 5G ProSe UE-to-UE Relay.

Figure 5:
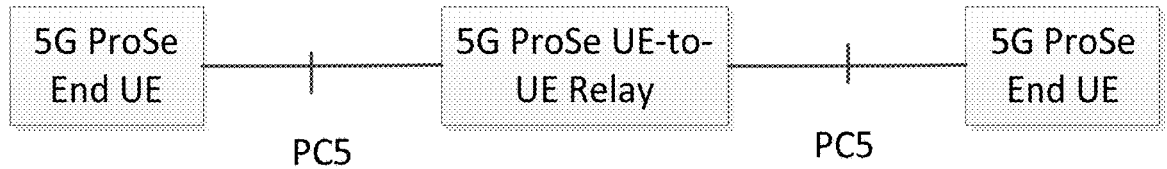
FIG. 5 is a reproduction of Figure 4.2.8-1 of 3GPP TS 23.304 V18.6.0.

Figure 4.2.8-1 of 3GPP TS 23.304 V18.6.0, Entitled "Reference Architecture for 5G ProSe UE-to-UE Relay", is Reproduced as FIG. 5

Each 5G ProSe End UE and the 5G ProSe UE-to-UE Relay may have subscriptions from the same PLMN or different PLMNs.
[ . . . ]
5.8.4 Identifiers for 5G ProSe UE-to-UE Relay Discovery
5.8.4.1 General The 5G ProSe UE-to-UE Relay Discovery message contains two sets of identifiers, a Direct Discovery set and a UE-to-UE Relay Discovery set.

The Direct Discovery set of identifiers are part of the contents of the 5G ProSe Direct Discovery message as defined in clause 5.8.1. This set of identifiers provides information about the 5G ProSe End UE(s) (e.g. user info (i.e. Application Layer ID)) to be discovered via 5G ProSe UE-to-UE Relay.

The UE-to-UE Relay Discovery set of identifiers as defined in clause 5.8.4.2 contain information to support the discovery of the 5G ProSe UE-to-UE Relay and extensions of the Direct Discovery.

5G ProSe UE-to-UE Relay shall modify the UE-to-UE Relay Discovery set of identifiers and forward the Direct Discovery set and the UE-to-UE Relay Discovery set of identifiers during the discovery procedures. The Direct Discovery set can be protected using different keys as used to protect the UE-to-UE Relay Discover set according to TS 33.503 [29].

5.8.4.2 Common identifiers for 5G ProSe UE-to-UE Relay Discovery

The following parameters are used as UE-to-UE Relay Discovery set of identifiers for the 5G ProSe UE-to-UE Relay Discovery Announcement message (Model A), where Source Layer-2 ID and Destination Layer-2 ID are used for sending and receiving the message and User Info ID and Relay Service Code are contained in the message:

Source Layer-2 ID: the 5G ProSe UE-to-UE Relay self-selects a Source Layer-2 ID for 5G ProSe UE-to-UE Relay Discovery Announcement message.

Destination Layer-2 ID: the Destination Layer-2 ID for 5G ProSe UE-to-UE Relay Discovery Announcement message is selected based on the configuration as described in clause 5.1.5.1.

User Info ID of 5G ProSe UE-to-UE Relay: provides information about the 5G ProSe UE-to-UE Relay.

Relay Service Code: information to indicate the connectivity service the 5G ProSe UE-to-UE Relay provides to 5G ProSe End UEs.

The following parameters are used as UE-to-UE Relay Discovery set of identifiers for the 5G ProSe UE-to-UE Relay Discovery Solicitation message (Model B) between discoverer 5G ProSe End UE and 5G ProSe UE-to-UE Relay, where Source Layer-2 ID and Destination Layer-2 ID are used for sending and receiving the message and User Info ID and Relay Service Code are contained in the message:

Source Layer-2 ID: the discoverer 5G ProSe End UE self-selects a Source Layer-2 ID for 5G ProSe UE-to-UE Relay Discovery Solicitation message.

Destination Layer-2 ID: the Destination Layer-2 ID for 5G ProSe UE-to-UE Relay Discovery Solicitation message is selected based on the configuration as described in clause 5.1.5.1.

Relay Service Code: information about connectivity service that the discoverer 5G ProSe End UE is interested in.

The following parameters are used as UE-to-UE Relay Discovery set of identifiers in the 5G ProSe UE-to-UE Relay Discovery Response message (Model B) between discoverer 5G ProSe End UE and 5G ProSe UE-to-UE Relay, where Source Layer-2 ID and Destination Layer-2 ID are used for sending and receiving the message and User Info ID and Relay Service Code are contained in the message:

- Source Layer-2 ID: the 5G ProSe UE-to-UE Relay self-selects a Source Layer-2 ID for 5G ProSe UE-to-UE Relay Discovery Response message.
- Destination Layer-2 ID: set to the Source Layer-2 ID of the received 5G ProSe UE-to-UE Relay Discovery Solicitation message.
- User Info ID of 5G ProSe UE-to-UE Relay: provides information about the 5G ProSe UE-to-UE Relay.
- Relay Service Code: identifies the connectivity service the 5G ProSe UE-to-UE Relay provides to 5G ProSe End UEs that matches the Relay Service Code from the corresponding Discovery Solicitation message.

The following parameters are used as UE-to-UE Relay Discovery set of identifiers for the 5G ProSe UE-to-UE Relay Discovery Solicitation message (Model B) between 5G ProSe UE-to-UE Relay and discoveree 5G ProSe End UE, where Source Layer-2 ID and Destination Layer-2 ID are used for sending and receiving the message and User Info ID and Relay Service Code are contained in the message:

- Source Layer-2 ID: the 5G ProSe UE-to-UE Relay self-selects a Source Layer-2 ID for 5G ProSe UE-to-UE Relay Discovery Solicitation message.
- When a 5G ProSe UE-to-UE Relay self-selects a Source Layer-2 ID for a received 5G ProSe UE-to-UE Relay Discovery Solicitation message, it selects a different Source Layer-2 ID values for each 5G ProSe UE-to-UE Relay Discovery Solicitation message, so that the 5G ProSe UE-to-UE Relay can correlate the 5G ProSe UE-to-UE Relay Discovery Response message with the 5G ProSe UE-to-UE Relay Discovery Solicitation message. The 5G ProSe UE-to-UE Relay can determine the discoverer 5G ProSe End UE that triggered the 5G ProSe UE-to-UE Relay Discovery Solicitation based on the destination Layer-2 ID of the received 5G ProSe UE-to-UE Relay Discovery Response message.
- Destination Layer-2 ID: the Destination Layer-2 ID for 5G ProSe UE-to-UE Relay Discovery Solicitation message is selected based on the configuration as described in clause 5.1.5.1.
- User Info ID of 5G ProSe UE-to-UE Relay: provides information about the 5G ProSe UE-to-UE Relay.
- Relay Service Code: identifies the connectivity service the 5G ProSe UE-to-UE Relay provides to 5G ProSe End UEs.

The following parameters are used as UE-to-UE Relay Discovery set of identifiers in the 5G ProSe UE-to-UE Relay Discovery Response message (Model B) between 5G ProSe UE-to-UE Relay and discoveree 5G ProSe End UE, where Source Layer-2 ID and Destination Layer-2 ID are used for sending and receiving the message and User Info ID and Relay Service Code are contained in the message:

- Source Layer-2 ID: the discoveree 5G ProSe End UE self-selects a Source Layer-2 ID for 5G ProSe UE-to-UE Relay Discovery Response message.
- Destination Layer-2 ID: set to the Source Layer-2 ID of the received 5G ProSe UE-to-UE Relay Discovery Solicitation message.
- Relay Service Code: identifies the connectivity service the 5G ProSe UE-to-UE Relay provides to 5G ProSe End UEs that matches the Relay Service Code from the corresponding Discovery Solicitation message.
- NOTE 1: The UE implementation needs to ensure that when the UE self-selects Source Layer-2 IDs, the self-selected Source Layer-2 IDs are different between 5G ProSe Direct Discovery (including 5G ProSe UE-to-Network Relay Discovery and 5G ProSe UE-to-UE Relay Discovery) in clause 6.3.2 and 5G ProSe Direct Communication (including 5G ProSe UE-to-Network Relay Communication and 5G ProSe UE-to-UE Relay Communication) in clause 6.4, 6.5 and 6.7 and are different from any other provisioned Destination Layer-2 IDs as described in clause 5.1 and any other self-selected Source Layer-2 IDs used in a simultaneous 5G ProSe Direct Discovery (including 5G ProSe UE-to-Network Relay Discovery and 5G ProSe UE-to-UE Relay Discovery) with a different discovery model.
- NOTE 2: If a 5G ProSe UE-to-UE Relay and 5G ProSe End UEs from different PLMNs discover each other, it means that the Relay Service Code is associated with the same connectivity service, and the same Relay Service Code is provisioned based on Service Level Agreement among PLMNs.

5.8.5 Identifiers for 5G ProSe UE-to-UE Relay Communication with Integrated Discovery For the broadcast Direct Communication Request message over the first hop PC5 reference point, the Source Layer-2 ID is self-selected by the source 5G ProSe End UE and the Destination Layer-2 ID is selected based on the configuration as described in clause 5.1.

For the broadcast Direct Communication Request message over the second hop PC5 reference point, the Source Layer-2 ID is self-selected by the 5G ProSe UE-to-UE Relay and the Destination Layer-2 ID is selected based on the configuration as described in clause 5.1.

5G ProSe UE-to-UE Relay may send a unicast Direct Communication Request message to the target 5G ProSe End UE by setting the Destination Layer-2 ID with a received unicast Destination Layer-2 ID of the target 5G ProSe End UE as specified in clause 6.4.3.7. The Source Layer-2 ID is self-selected by the 5G ProSe UE-to-UE Relay.

For unicast Direct Communication Accept message, the Source Layer-2 ID is self-selected by the target 5G ProSe End UE or 5G ProSe UE-to-UE Relay.

[ . . . ]

6.3.2.4 5G ProSe UE-to-UE Relay Discovery 6.3.2.4.1 General

5G ProSe UE-to-UE Relay Discovery is applicable to both 5G ProSe Layer-3 and Layer-2 UE-to-UE Relay Discovery for public safety use and commercial services. To perform 5G ProSe UE-to-UE Relay Discovery, the 5G ProSe End UE and the 5G ProSe UE-to-UE Relay are pre-configured or provisioned with the related information as described in clause 5.1.

A Relay Service Code (RSC) is used in the 5G ProSe UE-to-UE Relay Discovery, to indicate the connectivity service the 5G ProSe UE-to-UE Relay provides to 5G ProSe End UEs. The RSCs are pre-configured or provisioned on the 5G ProSe UE-to-UE Relay and the 5G ProSe End UE as defined in clause 5.1. The 5G ProSe UE-to-UE Relay and the 5G ProSe End UE are aware of whether a RSC is offering 5G ProSe Layer-2 or Layer-3 UE-to-UE Relay service based on the UE-to-UE Relay Layer indicator as specified in clause 5.1. A 5G ProSe UE-to-UE Relay supporting multiple RSCs advertises the RSCs using multiple discovery messages, with one RSC per discovery message.

6.3.2.4.2 Procedure for 5G ProSe UE-to-UE Relay Discovery with Model A

Figure 6:
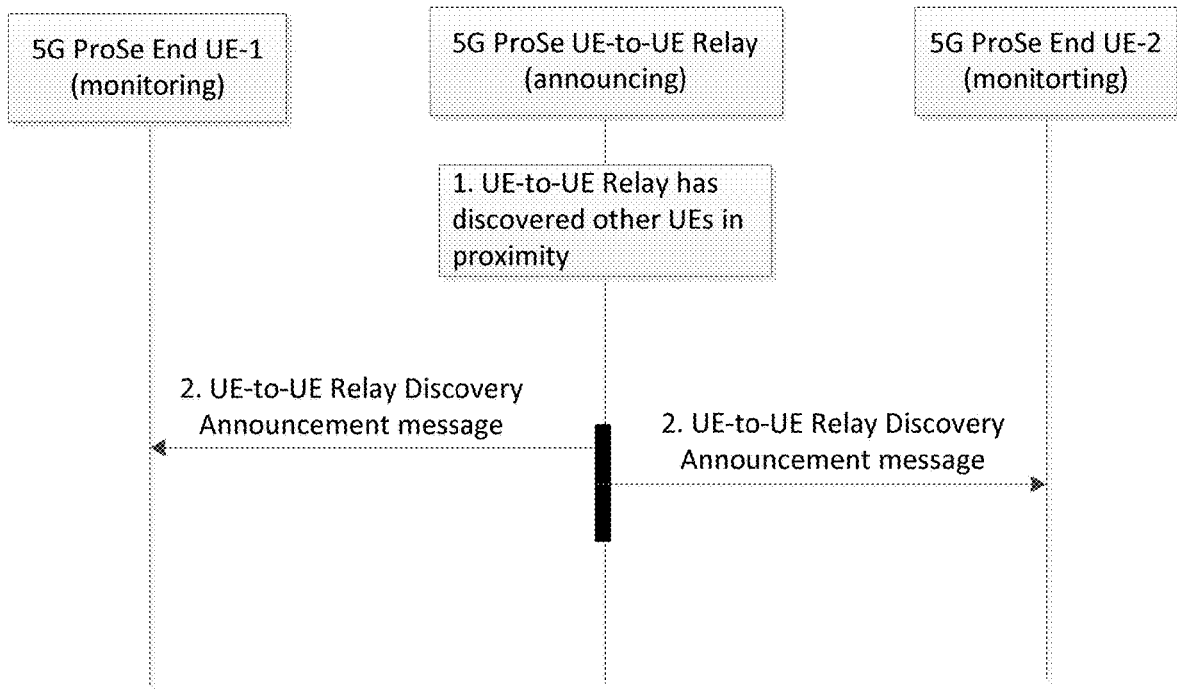
FIG. 6 is a reproduction of Figure 6.3.2.4.2-1 of 3GPP TS 23.304 V18.6.0.

Depicted in Figure 6.3.2.4.2-1 is the procedure for 5G ProSe UE-to-UE Discovery with Model A.

Figure 6.3.2.4.2-1 of 3GPP TS 23.304 V18.6.0, Entitled "5G ProSe UE-to-UE Relay Discovery with Model A" is Reproduced as FIG. 6

1. The 5G ProSe UE-to-UE Relay has discovered other UEs in proximity and obtains the Direct discovery set from other UEs in proximity per RSC. (e.g. via a previous 5G ProSe UE-to-UE Relay Discovery or via secure PC5 connection between 5G ProSe U2U Relay and 5G ProSe End UE (refer to TS 33.503 [29])).
2. The 5G ProSe UE-to-UE Relay sends a UE-to-UE Relay Discovery Announcement message. The UE-to-UE Relay Discovery Announcement message contains the Type of Discovery Message, User Info ID of the 5G ProSe UE-to-UE Relay, RSC and Direct discovery set including list of protected user info (i.e. Application Layer ID) received from the 5G ProSe End UEs supporting the RSC. The UE-to-UE Relay Discovery Announcement message is sent using the Source Layer-2 ID and Destination Layer-2 ID as described in clause 5.8.4. The 5G ProSe UE-to-UE Relay shall only announce user info (i.e. Application Layer ID) of other UEs in proximity that did not include an Announce Prohibited Indication when they were previously discovered.

NOTE: 5G ProSe UE-to-UE Relay announces Direct discovery set from other UEs in proximity only if their PC5 signal strength measured by the 5G ProSe UE-to-UE Relay is above configured signal strength threshold as specified in TS 38.331 [16].

A 5G ProSe End UE monitors announcement messages from a 5G ProSe UE-to-UE Relay. The 5G ProSe End UEs determine the Destination Layer-2 ID for signalling reception as specified in clause 5.1.

6.3.2.4.3 Procedure for 5G ProSe UE-to-UE Relay Discovery with Model B

Depicted in Figure 6.3.2.4.3-1 is the procedure for 5G ProSe UE-to-UE Relay Discovery with Model B.

Figure 7:
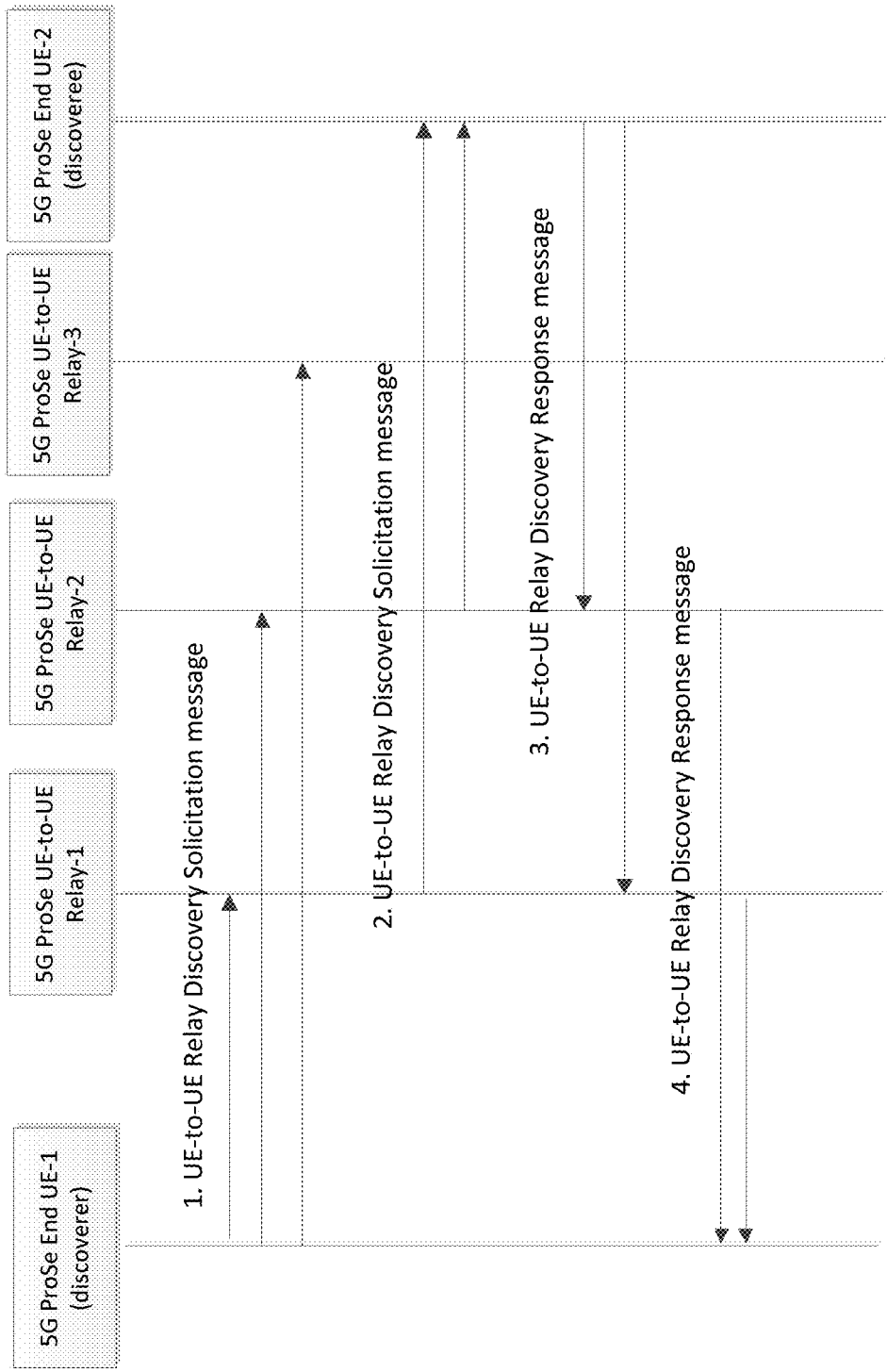
FIG. 7 is a reproduction of Figure 6.3.2.4.3-1 of 3GPP TS 23.304 V18.6.0.

Figure 6.3.2.4.3-1 of 3GPP TS 23.304 V18.6.0, Entitled "5G ProSe UE-to-UE Relay Discovery with Model B", is Reproduced as FIG. 7

1. The discoverer 5G ProSe End UE (UE-1) sends a 5G ProSe UE-to-UE Relay Discovery Solicitation message. The 5G ProSe UE-to-UE Relay Discovery Solicitation message contains the Type of Discovery Message, RSC and the Direct Discovery set which includes the protected user info (i.e. Application Layer ID) of the discoverer 5G ProSe End UE (UE-1) and the discoveree 5G ProSe End UE (UE-2). The 5G ProSe UE-to-UE Relay Discovery Solicitation message is sent using the Source Layer-2 ID and Destination Layer-2 ID as described in clause 5.8.4.

A 5G ProSe UE-to-UE Relay determines the Destination Layer-2 ID for signalling reception as specified in clause 5.1.

The discoverer 5G ProSe End UE may include an Announce Prohibited Indication in the UE-to-UE Relay Discovery Solicitation message. If a 5G ProSe UE-to-UE Relay receives a Relay Discovery Solicitation message with an Announce Prohibited Indication it does not consider the 5G ProSe End UE as discovered during this procedure for inclusion in 5G ProSe UE-to-UE Relay Discovery with Model A, see clause 6.3.2.4.2, step 1.

2. If the RSC contained in the solicitation message matches any of the (pre) configured RSC(s), as specified in clause 5.1.5.1, of a 5G ProSe UE-to-UE Relay, the 5G ProSe UE-to-UE Relay sends a 5G ProSe UE-to-UE Relay Discovery Solicitation message. The 5G ProSe UE-to-UE Relay Discovery Solicitation message contains the Type of Discovery Message, the Direct Discovery set which includes the list of protected user info (i.e. Application Layer ID) of the discoverer 5G ProSe End UE (UE-1) and the discoveree 5G ProSe End UE (UE-2), User Info ID of UE-to-UE Relay, RSC. 5G ProSe UE-to-UE Relay Discovery Solicitation message is sent using the Source Layer-2 ID and Destination Layer-2 ID as described in clause 5.8.4.

A 5G ProSe End UE determines the Destination Layer-2 ID for signalling reception as specified in clause 5.1.

The 5G ProSe UE-to-UE Relay self-selects the Source Layer-2 ID as specified in clause 5.8.4.2.

3. If the RSC contained in the solicitation message matches any of the (pre) configured RSC(s), as specified in clause 5.1.5.1, of the discoveree 5G ProSe End UE (UE-2), and the discoveree 5G ProSe End UE (UE-2) matches the user info (i.e. Application Layer ID) of the discoveree 5G ProSe End UE (UE-2) contained in the solicitation message, then the discoveree 5G ProSe End UE (UE-2) responds to the 5G ProSe UE-to-UE Relay with a 5G ProSe UE-to-UE Relay Discovery Response message. The 5G ProSe UE-to-UE Relay Discovery Response message contains the Type of Discovery Message, RSC, the Direct Discovery set which includes the protected user info (i.e. Application Layer ID) of the discoverer 5G ProSe End UE (UE-1) and the discoveree 5G ProSe End UE (UE-2). The 5G ProSe UE-to-UE Relay Discovery Response message is sent using the Source Layer-2 ID and Destination Layer-2 ID as described in clause 5.8.4. If the discoveree 5G ProSe End UE (UE-2) receives multiple UE-to-UE Relay Discovery Solicitation messages from different 5G ProSe UE-to-UE Relays with the same RSC and the user info (i.e. Application Layer ID) of the discoveree 5G ProSe End UE (UE-2), it may choose to respond or not to a 5G ProSe UE-to-UE Relay (e.g. based on the PC5 signal strength of each message received). The discoveree 5G ProSe End UE may include an Announce Prohibited Indication in the UE-to-UE Relay Discovery Response message. If a 5G ProSe UE-to-UE Relay receives a Relay Discovery Response message with an Announce Prohibited Indication it does not consider the 5G ProSe End UE as discovered during this procedure for inclusion in 5G ProSe UE-to-UE Relay Discovery with Model A, see clause 6.3.2.4.2, step 1.

4. The 5G ProSe UE-to-UE Relay sends a 5G ProSe UE-to-UE Relay Discovery Response message. The 5G ProSe UE-to-UE Relay Discovery Response message contains the Type of Discovery Message, User Info ID of UE-to-UE Relay, RSC, the Direct Discovery set which includes the list of protected user info (i.e. Application Layer ID) of the discoverer 5G ProSe End UE (UE-1) and the discoveree 5G ProSe End UE (UE-2). The 5G ProSe UE-to-UE Relay Discovery Response message is sent using the Source Layer-2 ID and Destination Layer-2 ID as described in clause 5.8.4.

6.3.2.4.4 Candidate 5G ProSe UE-to-UE Relay Discovery

This procedure for candidate 5G ProSe UE-to-UE Relay Discovery to support the negotiated Relay reselection as described in clause 6.7.4 when the discoverer End UE discovers a candidate 5G ProSe UE-to-UE Relay.

The procedure for 5G ProSe UE-to-UE Relay Discovery with Model B (see clause 6.3.2.4.3) is used with the following differences:

Step 1: In the 5G ProSe UE-to-UE Relay Discovery Solicitation message the RSC and the User Info ID of a candidate 5G ProSe UE-to-UE Relay are included in the UE-to-UE Relay Discovery set and the Direct Discovery set is not included. If the 5G ProSe End UE receives the Layer-2 ID of the candidate 5G ProSe UE-to-UE Relay in a Link Modification Request message, it may set the Layer-2 ID of the candidate 5G ProSe UE-to-UE Relay as the Destination Layer-2 ID.

NOTE: The User Info ID of the candidate 5G ProSe UE-to-UE Relay and the user info (i.e. Application Layer ID) of the discoveree 5G ProSe End UE can be distinguished by the 5G ProSe UE-to-UE Relay as different IEs in the message.

Step 2 and step 3 are skipped because Direct Discovery set is absent, and the User Info ID of the candidate 5G ProSe UE-to-UE Relay in the received 5G ProSe UE-to-UE Relay Discovery Solicitation message matches that of the 5G ProSe UE-to-UE Relay.

Step 4: If a 5G ProSe UE-to-UE Relay matches the User Info ID of a candidate 5G ProSe UE-to-UE Relay received in the 5G ProSe UE-to-UE Relay Discovery Solicitation then it sends the 5G ProSe UE-to-UE Relay Discovery Response (with the RSC received in step 1) and does not include the Direct Discovery set.

[ . . . ]

6.4.3 Unicast Mode 5G ProSe Direct Communication
6.4.3.1 Layer-2 Link Establishment Over PC5 Reference Point To perform unicast mode of ProSe Direct communication over PC5 reference point, the UE is configured with the related information as described in clause 5.1.3.

Figure 6.4.3.1-1 shows the layer-2 link establishment procedure for the unicast mode of ProSe Direct communication over PC5 reference point.

Figure 8:
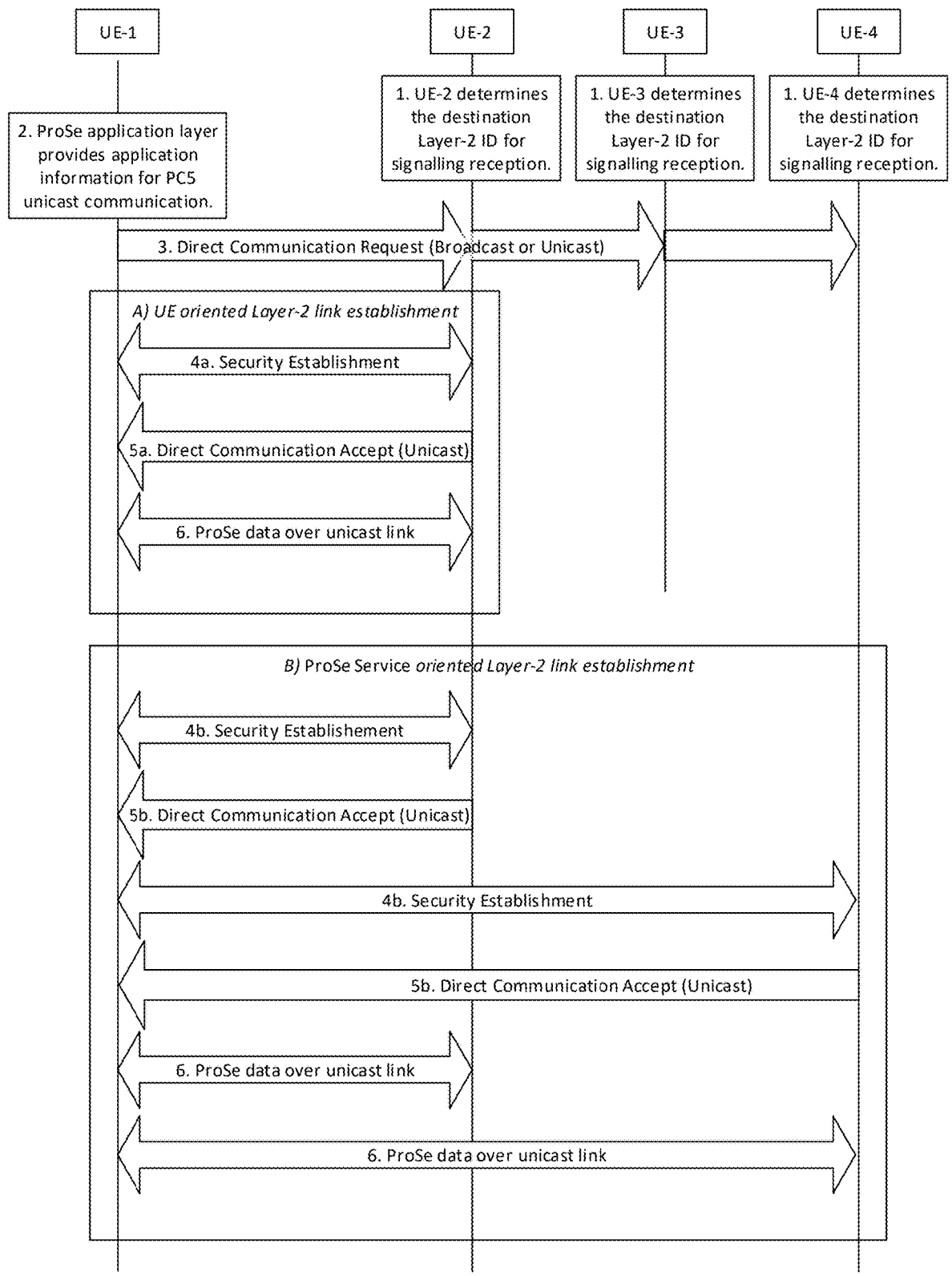
FIG. 8 is a reproduction of Figure 6.4.3.1-1 of 3GPP TS 23.304 V18.6.0.

Figure 6.4.3.1-1 of 3GPP TS 23.304 V18.6.0,
Entitled "Layer-2 Link Establishment Procedure",
is Reproduced as FIG. 8

1. The UE(s) determine the destination Layer-2 ID for signalling reception for PC5 unicast link establishment as specified in clause 5.8.2.4.
2. The ProSe application layer in UE-1 provides application information for PC5 unicast communication. The application information includes the ProSe Service Info, UE's Application Layer ID. The target UE's Application Layer ID may be included in the application information.
   The ProSe application layer in UE-1 may provide ProSe Application Requirements for this unicast communication. UE-1 determines the PC5 QoS parameters and PFI as specified in clause 5.6.1.
   If UE-1 decides to reuse the existing PC5 unicast link as specified in clause 5.3.4, the UE triggers the Layer-2 link modification procedure as specified in clause 6.4.3.4.
3. UE-1 sends a Direct Communication Request message to initiate the unicast layer-2 link establishment procedure. The Direct Communication Request message includes:
   Source User Info: the initiating UE's Application Layer ID (i.e. UE-1's Application Layer ID).
   If the ProSe application layer provided the target UE's Application Layer ID in step 2, the following information is included:
   Target User Info: the target UE's Application Layer ID (i.e. UE-2's Application Layer ID).
   ProSe Service Info: the information about the ProSe identifier(s) requesting Layer-2 link establishment.
   Security Information: the information for the establishment of security.
   NOTE 1: The Security Information and the necessary protection of the Source User Info and Target User Info are defined in TS 33.503 [29].
   The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.
   UE-1 sends the Direct Communication Request message via PC5 broadcast or unicast using the source Layer-2 ID and the destination Layer-2 ID.
   A default PC5 DRX configuration may be used for transmitting and receiving of this message (see TS 38.300 [12]).
4. Security with UE-1 is established as below:
   4a. If the Target User Info is included in the Direct Communication Request message, the target UE, i.e. UE-2, responds by establishing the security with UE-1.
   4b. If the Target User Info is not included in the Direct Communication Request message, the UEs that are interested in using the announced ProSe Service(s) over a PC5 unicast link with UE-1 responds by establishing the security with UE-1.
   NOTE 2: The signalling for the Security Procedure is defined in TS 33.503 [29].
   When the security protection is enabled, UE-1 sends the following information to the target UE:
   If IP communication is used:
     IP Address Configuration: For IP communication, IP address configuration is required for this link and indicates one of the following values:
       "DHCPv4 server" if only IPv4 address allocation mechanism is supported by the initiating UE, i.e., acting as a DHCPv4 server; or
       "IPv6 Router" if only IPV6 address allocation mechanism is supported by the initiating UE, i.e., acting as an IPV6 Router; or
       "DHCPv4 server & IPv6 Router" if both IPv4 and IPV6 address allocation mechanism are supported by the initiating UE; or
       "address allocation not supported" if neither IPv4 nor IPv6 address allocation mechanism is supported by the initiating UE.

Link-Local IPv6 Address: a link-local IPV6 address formed locally based on RFC 4862 if UE-1 does not support the IPV6 IP address allocation mechanism, i.e. the IP Address Configuration indicates "address allocation not supported".

QoS Info: the information about PC5 QoS Flow(s). For each PC5 QoS Flow, the PFI and the corresponding PC5 QOS parameters (i.e. PQI and conditionally other parameters such as MFBR/GFBR, etc.) and optionally the associated ProSe identifier(s).

Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in Figure 6.4.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.) and optionally the associated ProSe identifiers(s).

Optional PC5 QoS Rule(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPV6 address allocation mechanism is supported by the target UE, i.e., acting as an IPV6 Router; or "DHCPv4 server & IPV6 Router" if both IPv4 and IPV6 address allocation mechanism are supported by the target UE; or "address allocation not supported" if neither IPv4 nor IPv6 address allocation mechanism is supported by the target UE.

Link-Local IPV6 Address: a link-local IPv6 address formed locally based on RFC 4862 if the target UE does not support the IPV6 IP address allocation mechanism, i.e. the IP Address Configuration indicates "address allocation not supported" and UE-1 included a link-local IPV6 address in the security establishment in step 4. The target UE shall include a non-conflicting link-local IPv6 address.

If both UEs (i.e. the initiating UE and the target UE) are selected to use link-local IPV6 address, they shall disable the duplicate address detection defined in RFC 4862 [17].

NOTE 3: When either the initiating UE or the target UE indicates the support of IPV6 routing, the corresponding address configuration procedure would be carried out after the establishment of the layer 2 link and the link-local IPV6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Two UEs may negotiate the PC5 DRX configuration in the AS layer and the PC5 DRX parameter values can be configured per pair of source and destination Layer-2 IDs in the AS layer.

6. ProSe data is transmitted over the established unicast link as below:

The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

6.4.3.2 Link Identifier Update for a Unicast Link

Figure 6.4.3.2-1 shows the link identifier update procedure for a unicast link. When privacy requirements are configured for a ProSe Identifier associated with the unicast link, identifiers used for the unicast mode of 5G ProSe communication over PC5 reference point (e.g. Application Layer ID, Source Layer-2 ID and IP address/prefix) shall be changed over time as specified in clauses 5.8.2.1 and 5.8.2.4. A UE may decide to change the identifiers for other reasons, e.g. application layer requirement. This procedure is used to update and exchange new identifiers between the source and the peer UEs for a unicast link before using the new identifiers, to prevent service interruptions. When there are privacy requirements as indicated above, this procedure is executed over a security protected unicast link.

If a UE has multiple unicast links using the same Application Layer IDs or Layer-2 IDs, the UE needs to perform the link identifier update procedure over each of the unicast links.

Figure 9:
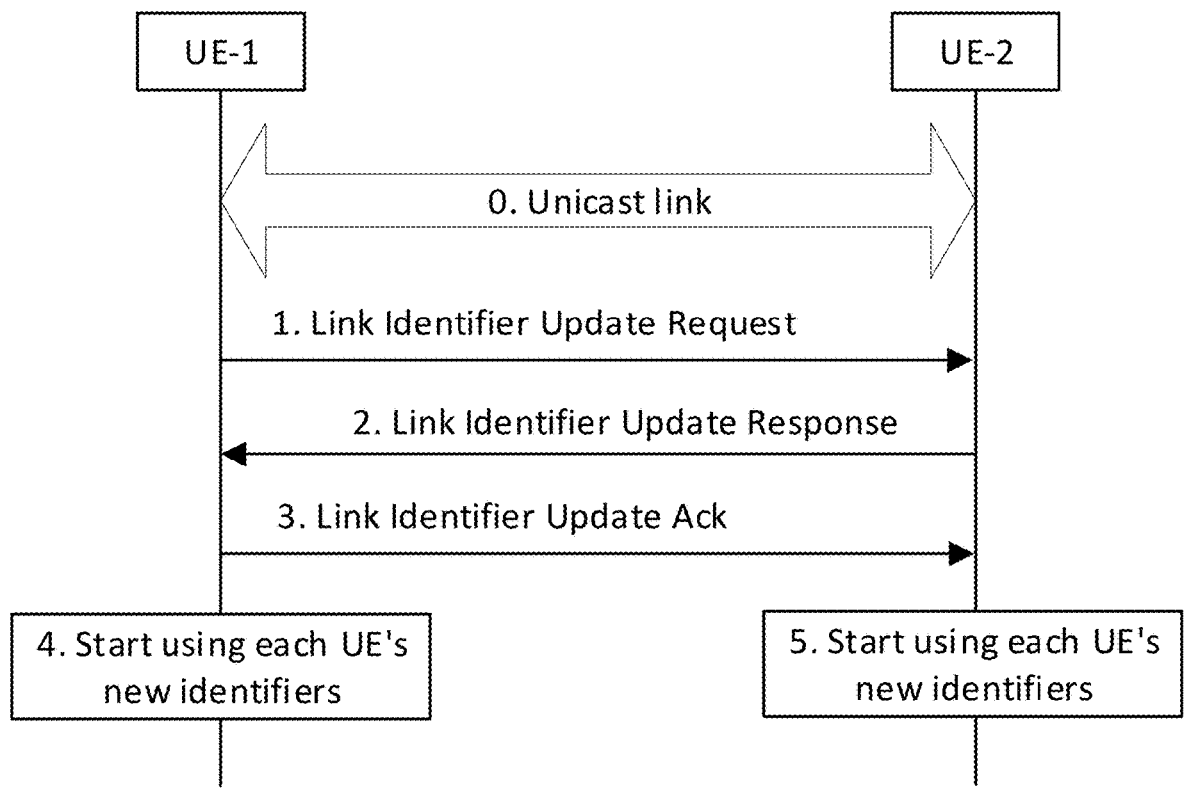
FIG. 9 is a reproduction of Figure 6.4.3.2-1 of 3GPP TS 23.304 V 18.6.0.

Figure 6.4.3.2-1 of 3GPP TS 23.304 V 18.6.0, Entitled "Link Identifier Update Procedure", is Reproduced as FIG. 9

0. UE-1 and UE-2 have a unicast link established as described in clause 6.4.3.1.

1. UE-1 decides to change its identifier(s), e.g. due to the Application Layer ID change or upon expiry of a timer. UE-1 generates its new Layer-2 ID and sends a Link Identifier Update Request message to UE-2 using the old identifiers.

The Link Identifier Update Request message includes the new identifier(s) to use (including the new Layer-2 ID, Security Information, optionally the new Application Layer ID and optionally new IP address/prefix if IP communication is used). The new identifier(s) shall be cyphered to protect privacy if security is configured for the unicast link. After sending the Link Identifier Update Request message, if the UE-1 has data to send, UE-1 keeps sending data traffic to UE-2 with the old identifiers until UE-1 sends the Link Identifier Update Ack message to UE-2.

NOTE 1: The timer is running on per Source Layer-2 ID.

NOTE 2: When one of the two UEs acts as IPv6 router as described in clause 5.5.1.1 and the IP address/prefix also needs to be changed, the corresponding address configuration procedure would be carried out after the Link Identifier update procedure.

2. Upon reception of the Link Identifier Update Request message, UE-2 changes its identifier(s). UE-2 responds with a Link Identifier Update Response message which includes the new identifier(s) to use (including the new Layer-2 ID, Security Information, optionally the new Application Layer ID and optionally a new IP address/prefix if IP communication is used). The new identifier(s) shall be cyphered to protect privacy if security is configured for the unicast link. The Link Identifier Update Response message is sent using the old identifiers. UE-2 continues to receive traffic with the old Layer-2 ID from UE-1 until UE-2 receives traffic with the new Layer-2 ID from UE-1. After sending the Link Identifier Update Response message, UE-2 keeps sending data traffic to UE-1 with the old identifier, if UE-2 has data to send, until UE-2 receives the Link Identifier Update Ack message from UE-1.

3. Upon reception of the Link Identifier Update Response message, UE-1 responds with a Link Identifier Update Ack message. The Link Identifier Update Ack message includes the new identifier(s) from UE-2, as received on the Link Identifier Update Response message. The Link Identifier Update Ack message is sent using the old identifiers. UE-1 continues to receive traffic with the old Layer-2 ID from UE-2 until UE-1 receives traffic with the new Layer-2 ID from UE-2.

4. The ProSe layer of UE-1 passes the PC5 Link Identifier for the unicast link and the updated Layer-2 IDs (i.e. new Layer-2 ID for UE-1 for the source and new Layer-2 ID of UE-2 for the destination) down to the AS layer. This enables the AS layer to update the provided Layer-2 IDs for the unicast link.

UE-1 starts using its new identifiers and UE-2's new identifiers for this unicast link.

5. Upon reception of the Link Identifier Update Ack message, the ProSe layer of UE-2 passes the PC5 Link Identifier for the unicast link and the updated Layer-2 IDs (i.e. new Layer-2 ID of UE-2 for the source and new Layer-2 ID for UE-1 for the destination) down to the AS layer. This enables the AS layer to update the provided Layer-2 IDs for the unicast link. UE-2 starts using its new identifiers and UE-1's new identifiers for this unicast link.

NOTE 3: The Security Information in the above messages also needs to be updated at the same time as the Layer-2 IDs. This is defined in TS 33.503 [29].

[ . . . ]

6.4.3.4 Layer-2 Link Modification for a Unicast Link

Figure 6.4.3.4-1 shows the layer-2 link modification procedure for a unicast link. This procedure is used to:

add new PC5 QoS Flow(s) in the existing PC5 unicast link.

This covers the case for adding new PC5 QoS Flow(s) to the existing ProSe service(s) as well as the case for adding new PC5 QoS Flow(s) to new ProSe service(s).

modify existing PC5 QoS Flow(s) in the existing PC5 unicast link.

This covers the case for modifying the PC5 QoS parameters for existing PC5 QoS Flow(s).

This also covers the case for removing the associated ProSe service(s) from existing PC5 QoS Flow(s) as well as the case for associating new ProSe service(s) with existing PC5 QoS Flow(s).

remove existing PC5 QoS Flow(s) in the existing PC5 unicast link.

Figure 10:
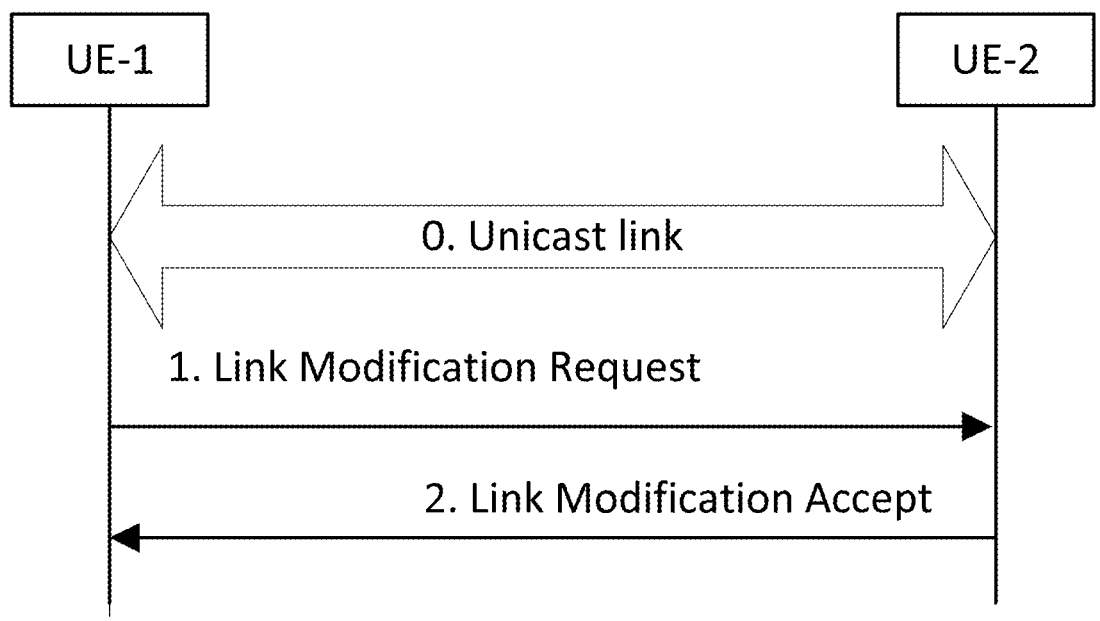
FIG. 10 is a reproduction of Figure 6.4.3.4-1 of 3GPP TS 23.304 V 18.6.0.

Figure 6.4.3.4-1 of 3GPP TS 23.304 V 18.6.0, Entitled "Layer-2 Link Modification Procedure", is Reproduced as FIG. 10

0. UE-1 and UE-2 have a unicast link established as described in clause 6.4.3.1.

1. The ProSe application layer in UE-1 provides application information for PC5 unicast communication. The application information includes the ProSe Service Info and the initiating UE's Application Layer ID. The target UE's Application Layer ID may be included in the application information. If UE-1 decides to reuse the existing PC5 unicast link as specified in clause 5.3.4, so decides to modify the unicast link established with UE-2, UE-1 sends a Link Modification Request to UE-2.

The Link Modification Request message includes:

a) To add new PC5 QoS Flow(s) in the existing PC5 unicast link:

QoS Info: the information about PC5 QoS Flow(s) to be added. For each PC5 QoS Flow, the PFI, the corresponding PC5 QOS parameters (i.e. PQI and conditionally other parameters such as MFBR/GFBR, etc.) and optionally the associated ProSe identifier(s).

Optional PC5 QoS Rule(s).

b) To modify PC5 QOS Flow(s) in the existing PC5 unicast link:

QoS Info: the information about PC5 QoS Flow(s) to be modified. For each PC5 QoS Flow, the PFI, the corresponding PC5 QoS parameters (i.e. PQI and conditionally other parameters such as MFBR/GFBR, etc.) and optionally the associated ProSe identifier(s).

Optional PC5 QoS Rule(s).

c) To remove PC5 QoS Flow(s) in the existing PC5 unicast link:

PFIs.

2. UE-2 responds with a Link Modification Accept message.
   The Link Modification Accept message includes:
      For case a) and case b) described in step 1:
         QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and optionally the associated ProSe identifier(s).
         Optional PC5 QoS Rule(s).
      The ProSe layer of each UE provides information about the unicast link modification to the AS layer. This enables the AS layer to update the context related to the modified unicast link.

[ . . . ]

6.4.3.7 Layer-2 Link Management Over PC5 Reference Point for 5G ProSe UE-to-UE Relay 6.4.3.7.1 Common Part for Layer-2 Link Management Over PC5 Reference Point for 5G ProSe UE-to-UE Relay For the 5G ProSe Communication via 5G ProSe UE-to-UE Relay as described in clause 6.7.1 and clause 6.7.2:
   The Direct Communication Request message over the first hop PC5 reference point includes:
      user info (i.e. Application Layer ID) of source 5G ProSe End UE: the identity of the source 5G ProSe End UE requesting relay operation.
      User Info ID of 5G ProSe UE-to-UE Relay: the identity of the UE-to-UE Relay provided to the source 5G ProSe End UE during 5G ProSe UE-to-UE Relay Discovery procedure.
      user info (i.e. Application Layer ID) of target 5G ProSe End UE: the identity of the target 5G ProSe End UE provided to the source 5G ProSe End UE during UE-to-UE Relay Discovery procedure.
      (optional) Destination Layer-2 ID of target 5G ProSe End UE: the unicast destination Layer-2 ID of the target 5G ProSe End UE determined by the source 5G ProSe End UE as specified in clause 5.8.2.4.
      ProSe Service Info: the information about the ProSe identifier(s) requesting Layer-2 link establishment.
      RSC: the connectivity service provided by the 5G ProSe UE-to-UE Relay as requested by the source 5G ProSe End UE.
      Security Information: the information for the establishment of security for the first hop PC5 link establishment (see TS 33.503 [29]).
   The Direct Communication Request message over the second hop PC5 reference point includes:
      user info (i.e. Application Layer ID) of source 5G ProSe End UE.
      user info (i.e. Application Layer ID) of target 5G ProSe End UE.
      User Info ID of 5G ProSe UE-to-UE Relay.
      ProSe Service Info: the information about the ProSe identifier(s).
      RSC: the connectivity service provided by the 5G ProSe UE-to-UE Relay as requested by the source 5G ProSe End UE.
      Security Information: the information for the establishment of security for the second hop PC5 link establishment (see TS 33.503 [29]).
   The Direct Communication Accept message over the second hop PC5 reference point includes:
      user info (i.e. Application Layer ID) of target 5G ProSe End UE.
   The Direct Communication Accept message over the first hop PC5 reference point includes:
      user info (i.e. Application Layer ID) of target 5G ProSe End UE.
      User Info ID of 5G ProSe UE-to-UE Relay.
   The Link Modification Request message over the first hop PC5 reference point includes:
      user info (i.e. Application Layer ID) of target 5G ProSe End UE: the identity of the target 5G ProSe End UE provided to the source 5G ProSe End UE during UE-to-UE Relay Discovery procedure.
      (optional) Destination Layer-2 ID of target 5G ProSe End UE: the unicast destination Layer-2 ID of the target 5G ProSe End UE determined by the source 5G ProSe End UE as specified in clause 5.8.2.4.
   The Link Modification Request message over the second hop PC5 reference point includes:
      user info (i.e. Application Layer ID) of source 5G ProSe End UE.
      user info (i.e. Application Layer ID) of target 5G ProSe End UE.
   The Link Modification Accept message over the second hop PC5 reference point includes:
      user info (i.e. Application Layer ID) of target 5G ProSe End UE.
   The Link Modification Accept message over the first hop PC5 reference point includes:
      user info (i.e. Application Layer ID) of target 5G ProSe End UE.

6.4.3.7.2 Layer-2 Link Management Over PC5 Reference Point for 5G ProSe Layer-2 UE-to-UE Relay For the 5G ProSe Communication via 5G ProSe Layer-2 UE-to-UE Relay as described in clause 6.7.2, the description in clause 6.4.3.7.1 applies.

The message contents over PC5 reference point for unicast mode 5G ProSe Direct Communication as depicted from clause 6.4.3.1 to clause 6.4.3.5 are same for the end-to-end connection between peer 5G ProSe End UEs.

6.4.3.7.3 Layer-2 Link Management Over PC5 Reference Point for 5G ProSe Layer-3 UE-to-UE Relay For the 5G ProSe Communication via 5G ProSe Layer-3 UE-to-UE Relay as described in clause 6.7.1, the description in clause 6.4.3.7.1 applies with following differences and clarifications:
   In the Security Procedure of the first hop PC5 reference point, the source 5G ProSe Layer-3 End UE provides the IP Address Configuration or Link-Local IPV6 Address and QoS Info of the end-to-end QoS to the 5G ProSe Layer-3 UE-to-UE Relay. If the PC5 link is used for transferring Ethernet traffic, the source 5G ProSe Layer-3 End UE provides its Ethernet MAC address instead of IP related information.
   In the Security Procedure of the second hop PC5 reference point, the 5G ProSe Layer-3 UE-to-UE Relay provides the IP Address Configuration or Link-Local IPV6 Address and QoS Info of the second hop QoS to the target 5G ProSe End UE. If the PC5 link is used for transferring Ethernet traffic, the 5G ProSe Layer-3 UE-to-UE Relay provides the Ethernet MAC address of the source 5G ProSe Layer-3 End UE instead of IP related information.
   The Direct Communication Accept message over the second hop PC5 reference point additionally includes IP Address Configuration or Link-Local IPV6 Address and QoS Info of the second hop QoS. If the PC5 link is used for transferring Ethernet traffic, the target 5G ProSe Layer-3 End UE provides its Ethernet MAC address instead of IP related information.

The 5G ProSe Layer-3 UE-to-UE Relay decides the QoS Info of the first hop QoS with considering the received second hop QoS, the Direct Communication Accept message over the first hop PC5 reference point additionally includes IP Address Configuration or Link-Local IPV6 Address, QoS Info of the first hop QoS and may include IP address of the target 5G ProSe End UE. If the PC5 link is used for transferring Ethernet traffic, 5G ProSe Layer-3 UE-to-UE Relay provides the Ethernet MAC address of the target 5G ProSe Layer-3 End UE instead of IP related information.

For adding new end-to-end QoS flow or modifying existing end-to-end QoS flow, in the Link Modification Request message over the first hop PC5 reference point, the source 5G ProSe End UE additionally includes QoS Info of the end-to-end QoS as described in the clause 6.4.3.4. For removing end-to-end QoS flows(s), in the Link Modification Request message over the first hop PC5 reference point, the source 5G ProSe End UE includes PFI(s) of the QoS flow(s) of the first hop as described in the clause 6.4.3.4. If the PC5 link is used for transferring Ethernet traffic, the source 5G ProSe Layer-3 End UE may provide its Ethernet MAC address.

For adding new end-to-end QoS flow or modifying existing end-to-end QoS flow, in the Link Modification Request message over the second hop PC5 reference point, the 5G ProSe Layer-3 UE-to-UE Relay additionally includes QoS Info of the second hop QoS to the target 5G ProSe End UE. For removing end-to-end QoS flow(s), in the Link Modification Request message over the second hop PC5 reference point, the 5G ProSe Layer-3 UE-to-UE Relay includes PFI(s) of the QoS flow(s) of the second hop. If the PC5 link is used for transferring Ethernet traffic, the 5G ProSe Layer-3 UE-to-UE Relay provides the Ethernet MAC address of the source 5G ProSe Layer-3 End UE.

For adding new end-to-end QoS flow or modifying existing end-to-end QoS flow, the Link Modification Accept message over the second hop PC5 reference point additionally includes QoS Info of the second hop QoS. If the PC5 link is used for transferring Ethernet traffic, the target 5G ProSe Layer-3 End UE may provide its Ethernet MAC address.

For adding new end-to-end QoS flow or modifying existing end-to-end QoS flow, the 5G ProSe Layer-3 UE-to-UE Relay decides the QoS Info of the first hop QoS with considering the received second hop QoS, the Link Modification Accept message over the first hop PC5 reference point additionally includes QoS Info of the first hop QoS and may include IP address of the target 5G ProSe End UE. If the PC5 link is used for transferring Ethernet traffic, 5G ProSe Layer-3 UE-to-UE Relay provides the Ethernet MAC address of the target 5G ProSe Layer-3 End UE instead of IP related information.

When the PC5 link between a 5G ProSe Layer-3 End UE and the 5G ProSe Layer-3 UE-to-UE Relay is released, the 5G ProSe Layer-3 UE-to-UE Relay may initiate the PC5 link release to the peer 5G ProSe Layer-3 End UE(s) or notify the peer 5G ProSe Layer-3 End UE(s) the peer PC5 link is released.

6.4.3.7.4 Layer-2 Link Management Over PC5 Reference Point for 5G ProSe UE-to-UE Relay Communication with Integrated Discovery This clause is for the 5G ProSe UE-to-UE Relay Communication with integrated Discovery procedure as described in clause 6.7.3.

The Direct Communication Request message over the first hop PC5 reference point includes:
- user info (i.e. Application Layer ID) of source 5G ProSe End UE.
- (optional) user info (i.e. Application Layer ID) of target 5G ProSe End UE: the identity of the target 5G ProSe End UE if provided from the ProSe application layer.
- (optional) Destination Layer-2 ID of target 5G ProSe End UE: the unicast destination Layer-2 ID of the target 5G ProSe End UE determined by the source 5G ProSe End UE as specified in clause 5.8.2.4.
- ProSe Service Info: the information about the ProSe identifier(s) requesting Layer-2 link establishment.
- RSC: the connectivity service provided by the 5G ProSe UE-to-UE Relay as requested by the source 5G ProSe End UE.
- Relay_indication: indicates whether the Direct Communication Request message can be forwarded by a 5G ProSe UE-to-UE Relay.
- Security Information: the information for the establishment of security for the first hop PC5 link establishment (see TS 33.503 [29]).

The Direct Communication Request message over the second hop PC5 reference point includes:
- user info (i.e. Application Layer ID) of source 5G ProSe End UE.
- User Info ID of 5G ProSe UE-to-UE Relay.
- (optional) user info of target 5G ProSe End UE.
- ProSe Service Info: the information about the ProSe identifier(s).
- RSC: the connectivity service provided by the 5G ProSe UE-to-UE Relay as requested by the source 5G ProSe End UE.
- Security Information: the information for the establishment of security for the second hop PC5 link establishment (see TS 33.503 [29]).

The Direct Communication Accept message over the second hop PC5 reference point includes:
- user info (i.e. Application Layer ID) of target 5G ProSe End UE.

The Direct Communication Accept message over the first hop PC5 reference point includes:
- user info (i.e. Application Layer ID) of target 5G ProSe End UE.
- User Info ID of 5G ProSe UE-to-UE Relay.

For the 5G ProSe Communication via 5G ProSe Layer-3 UE-to-UE Relay, additional clarifications are as following:
- In the Security Procedure of the second hop PC5 reference point, the 5G ProSe Layer-3 UE-to-UE Relay provides the IP Address Configuration or Link-Local IPV6 Address to the target 5G ProSe End UE.
- The Direct Communication Accept message over the second hop PC5 reference point additionally includes IP Address Configuration or Link-Local IPV6 Address (if IP communication is used), Ethernet MAC address of target 5G ProSe End UE (if Ethernet communication is used). QoS Info is not included in the Security Procedure or Direct Communication Accept message of the second hop PC5 reference point.
- In the Security Procedure of the first hop PC5 reference point, the source 5G ProSe End UE provides the IP Address Configuration, Link-Local IPV6 Address and QoS Info of the end-to-end QoS to the 5G ProSe Layer-3 UE-to-UE Relay.

The 5G ProSe Layer-3 UE-to-UE Relay provides the QoS info of the second hop QoS to the target 5G ProSe End UE using the Layer-2 link modification as described in the clause 6.4.3.4.

The 5G ProSe Layer-3 UE-to-UE Relay decides the QoS Info of the first hop QoS with considering the received second hop QoS from the target 5G ProSe End UE, the Direct Communication Accept message over the first hop PC5 reference point additionally includes IP Address Configuration or Link-Local IPV6 Address, QoS Info of the first hop QoS and may include IP address of the target 5G ProSe End UE (if IP communication is used) or Ethernet MAC address of target 5G ProSe End UE (if Ethernet communication is used).

For the 5G ProSe Communication via 5G ProSe Layer-2 UE-to-UE Relay, the message contents over PC5 reference point for unicast mode 5G ProSe Direct Communication as depicted from clause 6.4.3.1 to clause 6.4.3.5 are same for the end-to-end connection between peer 5G ProSe End UEs.

[ . . . ]

6.7 5G ProSe UE-to-UE Relay Communication
6.7.1 5G ProSe Communication Via 5G ProSe Layer-3 UE-to-UE Relay
6.7.1.1 Layer-2 Link Establishment for PC5 Communication Via 5G ProSe Layer-3 UE-to-UE Relay Figure 6.7.1.1-1 shows the procedure for Layer-2 link establishment via 5G ProSe Layer-3 UE-to-UE Relay.

Figure 11:
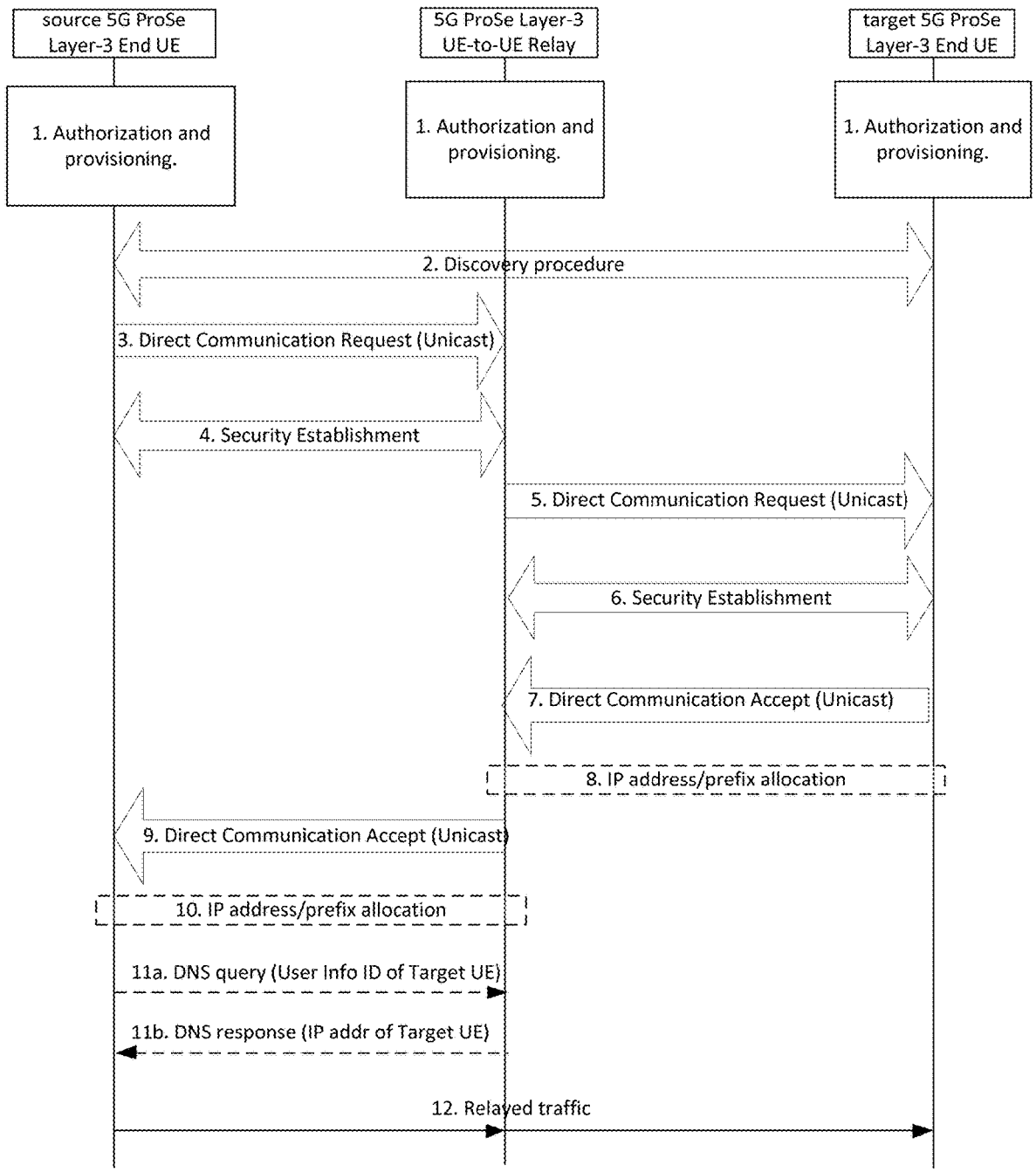
FIG. 11 is a reproduction of Figure 6.7.1.1-1 of 3GPP TS 23.304 V 18.6.0.

Figure 6.7.1.1-1 of 3GPP TS 23.304 V 18.6.0, Entitled "Layer-2 Link Establishment Via 5G ProSe Layer-3 UE-to-UE Relay", is Reproduced as FIG. 11

1. Service authorization and provisioning are performed for source 5G ProSe Layer-3 End UE, target 5G ProSe Layer-3 End UE and 5G ProSe Layer-3 UE-to-UE Relay as described in clause 6.2.
2. The source 5G ProSe Layer-3 End UE performs discovery of a 5G ProSe Layer-3 UE-to-UE Relay as described in clause 6.3.2.4.
3. The source 5G ProSe Layer-3 End UE sends a Direct Communication Request message to initiate the unicast Layer-2 link establishment procedure with the 5G ProSe Layer-3 UE-to-UE Relay. The parameters included in the Direct Communication Request message are described in clause 6.4.3.7.

The Source Layer-2 ID of the Direct Communication Request message is self-assigned by the source 5G ProSe Layer-3 End UE and the Destination Layer-2 ID is set to the Source Layer-2 ID of the discovery message of the 5G ProSe Layer-3 UE-to-UE Relay.

The source 5G ProSe Layer-3 End UE gets application information and optional ProSe Application Requirements from ProSe application layer, and determines the end-to-end QoS parameters as described in clause 5.6.3.1.
4. If the User Info ID of 5G ProSe Layer-3 UE-to-UE Relay in the Direct Communication Request message matches the 5G ProSe UE-to-UE Relay's User Info ID and the RSC in the Direct Communication Request matches one RSC that the relay is (pre) configured with, as specified in clause 5.1.5.1, the 5G ProSe Layer-3 UE-to-UE Relay responds by establishing the security with the source 5G ProSe Layer-3 End UE.

When the security protection is enabled, the source 5G ProSe Layer-3 End UE sends the parameters as described in clause 6.4.3.7 to the 5G ProSe Layer-3 UE-to-UE Relay.

If the Ethernet MAC address of source 5G ProSe Layer-3 End UE is already used by another 5G ProSe Layer-3 End UE, then the 5G ProSe Layer-3 UE-to-UE Relay rejects the direct link establishment indicating that the MAC address is not unique.

The Source Layer-2 ID used for the security establishment procedure is self-assigned by the 5G ProSe Layer-3 UE-to-UE Relay and the Destination Layer-2 ID is set to the Source Layer-2 ID of the received Direct Communication Request message.

The 5G ProSe Layer-3 UE-to-UE Relay shall choose different Source Layer-2 IDs for PC5 links of different types of traffic, i.e., IP traffic, Ethernet traffic and Unstructured traffic.

If the PC5 link is used for transferring Unstructured traffic, the 5G ProSe Layer-3 UE-to-UE Relay shall choose different Source Layer-2 IDs for different pair of source and target 5G ProSe Layer-3 End UEs.

Upon receiving the security establishment procedure messages, the source 5G ProSe Layer-3 End UE obtains the 5G ProSe Layer-3 UE-to-UE Relay's Layer-2 ID for future communication, for signalling and data traffic for this unicast link.
5. After the Security Establishment procedure in step 4 is completed, the 5G ProSe Layer-3 UE-to-UE Relay decides whether to use an existing unicast Layer-2 link between itself and the target 5G ProSe End UE for the required service. If there is no existing unicast Layer-2 link of the required RSC with the target 5G ProSe Layer-3 End UE, the 5G ProSe Layer-3 UE-to-UE Relay sends a Direct Communication Request message to initiate the unicast Layer-2 link establishment procedure with the target 5G ProSe Layer-3 End UE. The parameters included in the Direct Communication Request message are described in clause 6.4.3.7.

The Source Layer-2 ID of the Direct Communication Request message is self-assigned by the 5G ProSe Layer-3 UE-to-UE Relay and the Destination Layer-2 ID may be broadcast or unicast Layer-2 ID. Unicast Layer-2 ID is used only if the Layer-2 ID of the target 5G ProSe Layer-3 End UE associated with the user info (i.e. Application Layer ID) is known to the 5G ProSe Layer-3 UE-to-UE Relay.

The 5G ProSe Layer-3 UE-to-UE Relay shall choose different Source Layer-2 IDs for PC5 links of different types of traffic, i.e., IP traffic, Ethernet traffic and Unstructured traffic. If the PC5 link is used for transferring Unstructured traffic, the 5G ProSe Layer-3 UE-to-UE Relay shall choose different Source Layer-2 IDs for different pair of source and target 5G ProSe Layer-3 End UEs.
6. If the RSC included in the Direct Communication Request matches the target UE's RSC that the target UE is (pre) configured with as specified in clause 5.1.5.1 and if the user info included in the Direct Communication Request matches the target UE's user info, the target 5G ProSe Layer-3 End UE responds by establishing the security with the 5G ProSe Layer-3 UE-to-UE Relay. When the security protection is enabled, the 5G ProSe Layer-3 UE-to-UE Relay sends the parameters as described in clause 6.4.3.7 to the target 5G ProSe Layer-3 End UE.

The Source Layer-2 ID used for the security establishment procedure is self-assigned by the target 5G ProSe Layer-3 End UE and the Destination Layer-2 ID is set to the Source Layer-2 ID of the received Direct Communication Request message.

Upon receiving the security establishment procedure messages, the 5G ProSe Layer-3 UE-to-UE Relay obtains the target 5G ProSe Layer-3 End UE's Layer-2 ID for future communication, for signalling and data traffic for this unicast link.

7. The target 5G ProSe Layer-3 End UE sends a Direct Communication Accept message to the 5G ProSe Layer-3 UE-to-UE Relay that has successfully established security with. The parameters included in the Direct Communication Accept message are described in clause 6.4.3.7.

NOTE: The 5G ProSe Layer-3 UE-to-UE Relay can detect that the Ethernet MAC address of target 5G ProSe Layer-3 End UE is already used by another 5G ProSe Layer-3 End UE when it receives the Direct Communication Accept message.

8. For IP traffic, IPV6 prefix or IPv4 address is allocated for the target 5G ProSe Layer-3 End UE as defined in clause 5.5.1.4.

9. After receiving the Direct Communication Accept message from the target 5G ProSe Layer-3 End UE, the 5G ProSe Layer-3 UE-to-UE Relay sends a Direct Communication Accept message to the source 5G ProSe Layer-3 End UE that has successfully established security with. The parameters included in the Direct Communication Accept message are described in clause 6.4.3.7.

10. For IP traffic, IPv6 prefix or IPv4 address is allocated for the source 5G ProSe Layer-3 End UE as defined in clause 5.5.1.4.

11. For IP communication, the 5G ProSe Layer-3 UE-to-UE Relay may store an association of user info (i.e. Application Layer ID) and the IP address of target 5G ProSe Layer-3 End UE into its DNS entries and the 5G ProSe Layer-3 UE-to-UE Relay may act as a DNS server to other UEs. The source 5G ProSe Layer-3 End UE may send a DNS query to the 5G ProSe Layer-3 UE-to-UE Relay to request IP address of target 5G ProSe Layer-3 End UE after step 10 if the IP address of target 5G ProSe Layer-3 End UE is not received in step 9 and the 5G ProSe Layer-3 UE-to-UE Relay returns the IP address of the target 5G ProSe Layer-3 End UE to the source 5G ProSe Layer-3 End UE.

For Ethernet communication, the 5G ProSe Layer-3 UE-to-UE Relay maintains the association between PC5 links and Ethernet MAC addresses received from the 5G ProSe Layer-3 End UE.

For Unstructured traffic communication, for each pair of source and target 5G ProSe Layer-3 End UEs, the 5G ProSe Layer-3 UE-to-UE Relay maintains the 1:1 mapping between the PC5 link with source 5G ProSe Layer-3 End UE and the PC5 link with target 5G ProSe Layer-3 End UE.

12. The source 5G ProSe Layer-3 End UE communicates with the target 5G ProSe Layer-3 End UE via the 5G ProSe Layer-3 UE-to-UE Relay.

In the case of one source 5G ProSe Layer-3 End UE communicates with multiple target 5G ProSe Layer-3 End UEs, the PC5 link between the source 5G ProSe Layer-3 End UE and the 5G ProSe Layer-3 UE-to-UE Relay can be shared for multiple target 5G ProSe Layer-3 End UEs per RSC while the PC5 links may be established individually between the 5G ProSe Layer-3 UE-to-UE Relay and target 5G ProSe Layer-3 End UEs per RSC. For the shared PC5 link, the Layer-2 link modification procedure shall be used, replacing the step 3 to 4 and 9 to 10 of the procedure in Figure 6.7.1.1-1. The parameters used in the Layer-2 link modification procedure are described in clause 6.4.3.7.

In the case of multiple source 5G ProSe Layer-3 End UEs communicate with one target 5G ProSe Layer-3 End UE, the PC5 link between the 5G ProSe Layer-3 UE-to-UE Relay and the target 5G ProSe Layer-3 End UE can be shared per RSC while the PC5 links may be established individually between the source 5G ProSe Layer-3 End UEs and the 5G ProSe Layer-3 UE-to-UE Relay per RSC. For the shared PC5 link, the Layer-2 link modification procedure shall be used, replacing the step 5 to 8 of the procedure in Figure 6.7.1.1-1. The parameters used in the Layer-2 link modification procedure are described in clause 6.4.3.7.

6.7.1.2 Link Identifier Update for PC5 Communication Via 5G ProSe Layer-3 UE-to-UE Relay The Link Identifier Update procedure as defined in clause 6.4.3.2 is reused between source 5G ProSe Layer-3 End UE and 5G ProSe Layer-3 UE-to-UE Relay to perform a link identifier update. When the IP address/prefix is changed, the new one is shared between source 5G ProSe Layer-3 End UE and target 5G ProSe Layer-3 End UE as depicted in Figure 6.7.1.2-1.

Figure 12:
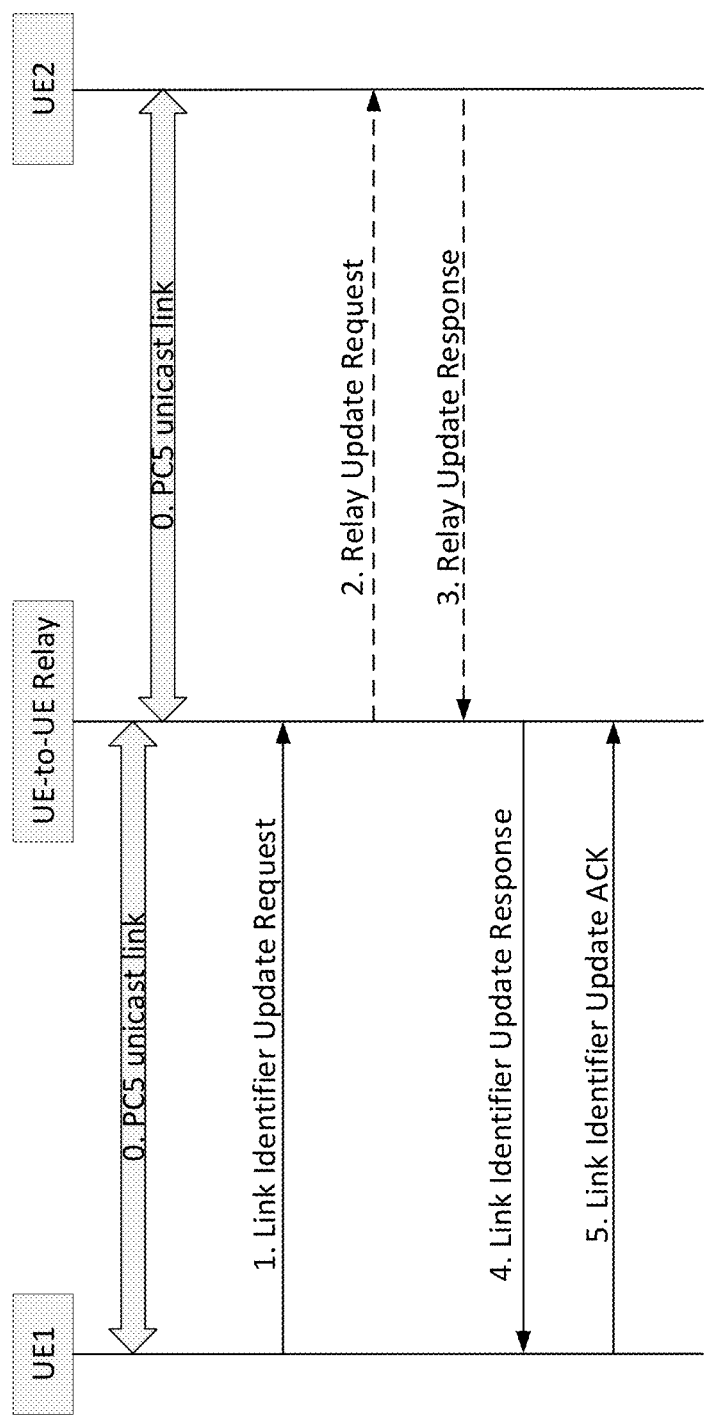
FIG. 12 is a reproduction of Figure 6.7.1.2-1 of 3GPP TS 23.304 V 18.6.0.

Figure 6.7.1.2-1 of 3GPP TS 23.304 V 18.6.0, Entitled "Link Identifier Update and IP Address/Prefix Sharing Via 5G ProSe Layer-3 UE-to-UE Relay", is Reproduced as FIG. 12

0. A PC5 link is established between a source 5G ProSe Layer-3 End UE (i.e. UE1) and a 5G ProSe Layer-3 UE-to-UE Relay (i.e. UE-to-UE Relay). Another PC5 link is established between the UE-to-UE Relay and the target 5G ProSe Layer-3 End UE (i.e. UE2). IP data may be exchanged between UE1 and UE2 via the UE-to-UE Relay over the PC5 links. During the link establishment, UE1 informs the UE-to-UE Relay that the link requires privacy.

1. As stated in clause 6.4.3.2, according to the privacy requirement, UE1 may trigger link identifier update procedure. UE1 sends a Link Identifier Update Request message to the UE-to-UE Relay including the following parameters:

its new Layer-2 ID, new security information, new Application layer ID (if provided by the upper layer).
    If UE1's IP address/prefix needs to be changed:
        if UE 1's IP address/prefix is allocated by the UE-to-UE Relay, UE1 includes "new IP address needed" indication.
        if UE1 self-assign its IP address/prefix, UE1 includes its new IP address/prefix.
        its peer UEs information (e.g. UE2's IP address, UE2's Application layer ID), allowing the UE-to-UE Relay to inform UE1's peer UEs (e.g. UE2) about UE1's new allocated IP address/prefix.

2. UE-to-UE Relay self-assigns a new L2 ID, new security information and possibly new IP address/prefix for PC5 link with UE1.

a. If a "new IP address needed" indication is received, UE-to-UE Relay assigns a new IP address/prefix to UE1 and saves it locally.
    Based on peer UE's information, UE-to-UE Relay then sends a PC5 Relay Update Request message to each peer UE (e.g. UE2), including: UE1's old IP address/ prefix, UE1's old and new Application layer ID, UE1's new IP address/prefix.
3. UE2 receives the PC5 Relay Update Request message and saves UE1's new IP address/prefix. UE2 sends a PC5 Relay Update Response message to the UE-to-UE Relay including all parameters received on the PC5 Relay Update Request message.

UE2 continues to receive IP data with UE1's old IP address (transit packets sent prior to UE1's receiving its new IP address) until an IP packet using UE1's new IP address is received. At this point, UE2 starts using UE1's new IP address and may forget UE1's old IP address.
4. UE-to-UE Relay sends a Link Identifier Update Response message to UE1 including UE1's new IP address/prefix, UE-to-UE Relay's new Layer-2 ID, new security information and possibly new IP address/prefix and/or new Application layer ID.
5. UE1 saves its new IP address/prefix and UE-to-UE Relay's new parameters and sends a Link Identifier Update ACK message to the UE-to-UE Relay, including its new IP address received on the Link Identifier Update Response message. UE1 and UE-to-UE Relay start using the new Layer-2 IDs and new security information for PC5 communication. UE1 starts using its new IP address for IP data exchange with UE2.

[ . . . ]

6.7.1.4 Layer-2 Link Modification for PC5 Communication Via 5G ProSe Layer-3 UE-to-UE Relay Figure 6.7.1.4-1 shows the Layer-2 link modification procedure via Layer-3 UE-to-UE Relay. This procedure is used to add/modify/remove PC5 QOS Flow(s) in the existing PC5 unicast link as described in clause 6.4.3.7.3.

Figure 13:
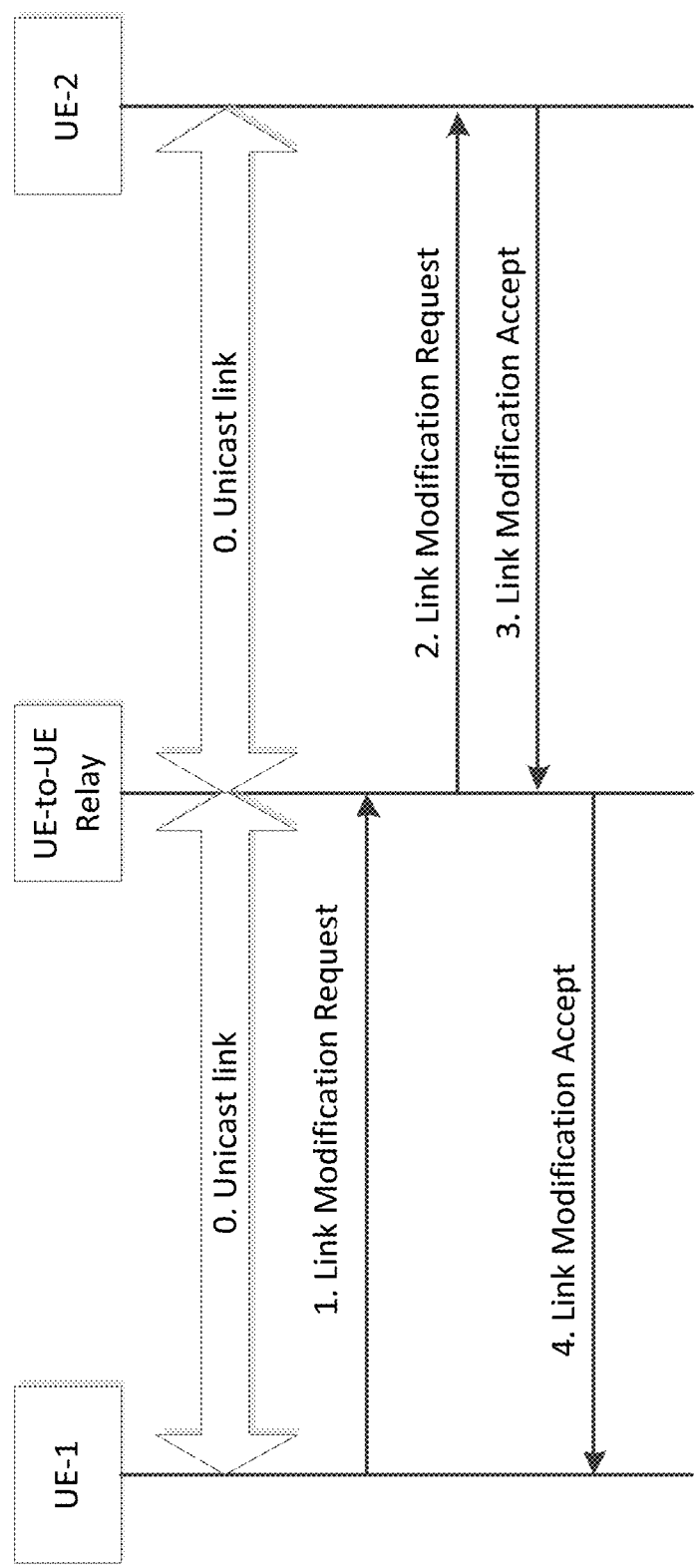
FIG. 13 is a reproduction of Figure 6.7.1.4-1 of 3GPP TS 23.304 V 18.6.0.

Figure 6.7.1.4-1 of 3GPP TS 23.304 V 18.6.0, Entitled "Layer-2 Link Modification Procedure Via Layer-3 UE-to-UE Relay", is Reproduced as FIG. 13

0. UE-1 and UE-to-UE Relay and UE-to-UE Relay and UE-2 have a unicast link established as described in clause 6.7.1.1.
1. UE-1 sends a Link Modification Request to UE-to-UE Relay as described in clause 6.4.3.7.3.
2. Upon reception of the Link Modification Request message from UE-1, the UE-to-UE Relay sends a Link Modification Request to UE-2 as described in clause 6.4.3.7.3.
3. UE-2 responds with a Link Modification Accept message to the UE-to-UE Relay as described in clause 6.4.3.7.3.
4. Upon reception of the Link Modification Accept message from UE-2, the UE-to-UE Relay responds with a Link Modification Accept message to the UE-1 as described in clause 6.4.3.7.3.

[ . . . ]

6.7.2 5G ProSe Communication Via 5G ProSe Layer-2 UE-to-UE Relay

This procedure applies to 5G ProSe Layer-2 UE-to-UE Relay.

Figure 14:
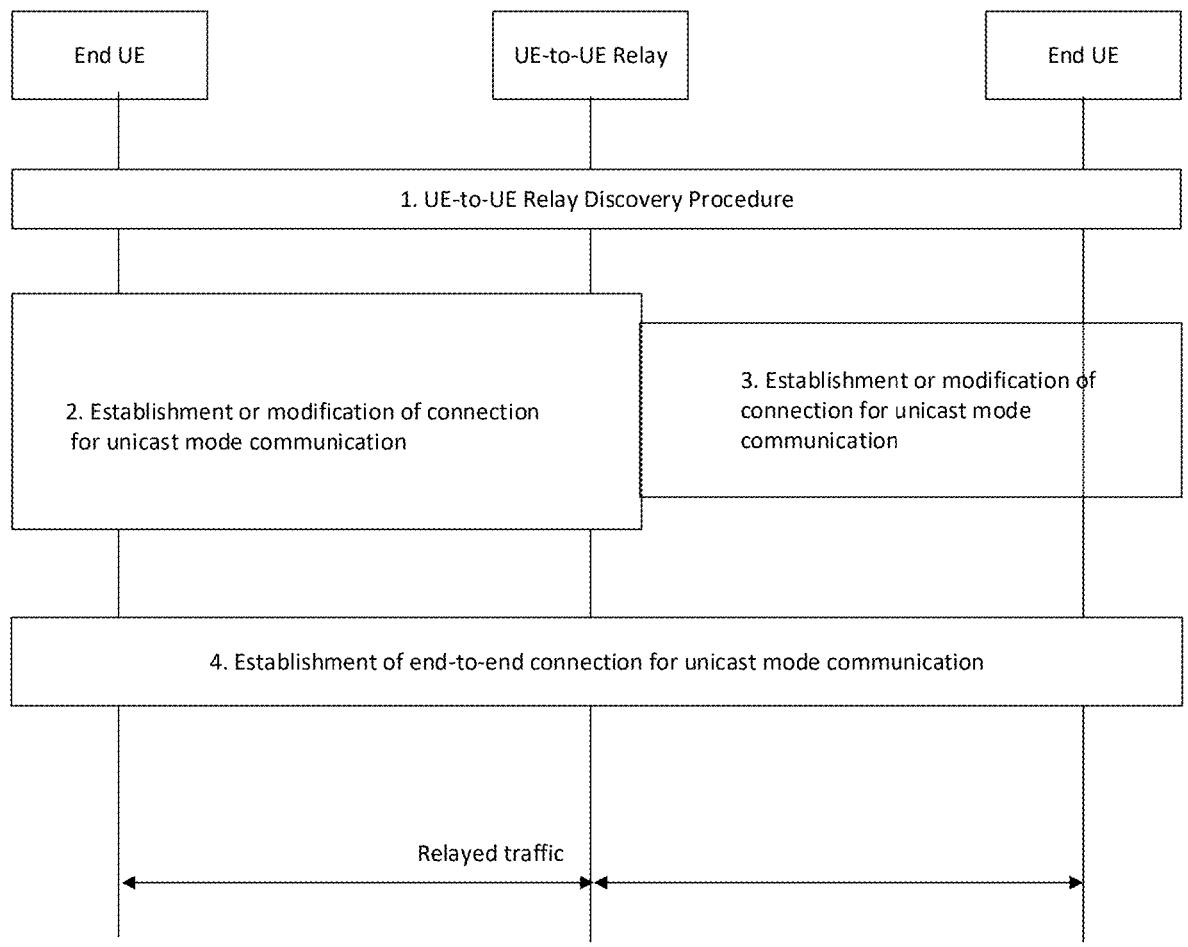
FIG. 14 is a reproduction of Figure 6.7.2-1 of 3GPP TS 23.304 V 18.6.0.

Figure 6.7.2-1 of 3GPP TS 23.304 V 18.6.0, Entitled "5G ProSe Communication Via 5G ProSe Layer-2 UE-to-UE Relay", is Reproduced as FIG. 14

Service authorization and provisioning has been performed for the 5G ProSe Layer-2 UE-to-UE Relay and the 5G ProSe End UEs as described in clause 6.2 before this procedure.

1. Model A or Model B 5G ProSe UE-to-UE Relay Discovery as described in clause 6.3.2.4 is performed and a source 5G ProSe End UE selects a suitable 5G ProSe Layer-2 UE-to-UE Relay for the communication with a target 5G ProSe End UE.
2. The source 5G ProSe End UE decides whether to use an existing PC5 link with the 5G ProSe UE-to-UE Relay for the required service. If an existing PC5 link is used then the Layer-2 link modification procedure as specified in clause 6.4.3.7 is used towards a 5G ProSe UE-to-UE Relay, otherwise a Layer-2 link establishment procedure is used towards a 5G ProSe UE-to-UE Relay.

This procedure is towards the selected 5G ProSe UE-to-UE Relay and for Layer-2 link establishment, the security establishment is performed before step 3 is initiated.

NOTE: The source 5G ProSe Layer-2 End UE does not initiate any Layer-2 link establishment or Layer-2 link modification procedure towards the same 5G ProSe Layer-2 UE-to-UE Relay for a different target 5G ProSe Layer-2 End UE unless the current Layer-2 link establishment or Layer-2 link modification procedure has been completed including reception of the PC5-RRC message from the 5G ProSe Layer-2 UE-to-UE Relay as specified in TS 38.300 [12]. Therefore, the source 5G ProSe Layer-2 End UE can recognize the target 5G ProSe Layer-2 End UE of the Layer-2 ID provided by the 5G ProSe Layer-2 UE-to-UE Relay.

3. The 5G ProSe Layer-2 UE-to-UE Relay decides whether to use an existing PC5 link between the 5G ProSe UE-to-UE Relay and the target 5G ProSe End UE for the required service and initiates Layer-2 link establishment procedure or Layer-2 link modification procedure as specified in clause 6.4.3.7 with the target 5G ProSe End UE.

If the Layer-2 link establishment procedure is performed towards the target 5G ProSe End UE then either a broadcast or a unicast Layer-2 ID is used as the Destination Layer-2 ID. A Unicast Layer-2 ID is used if the Layer-2 ID of the target 5G ProSe Layer-2 End UE associated with the user info (i.e. Application Layer ID) of target 5G ProSe Layer-2 End UE is known to the 5G ProSe Layer-2 UE-to-UE Relay.

If the Layer-2 link modification procedure is performed towards the target 5G ProSe End UE, it uses the unicast Layer-2 ID of target 5G ProSe End UE as the Destination Layer-2 ID. The 5G ProSe Layer-2 UE-to-UE Relay sends a Direct Communication Accept message or Link Modification Accept message to the source 5G ProSe End UE after step 3 is completed.

4. The source 5G ProSe End UE establishes an end-to-end connection for unicast mode communication with the target 5G ProSe End UE as described in clause 6.4.3.7.

The data and End-to-End PC5-S signalling are transferred between the source 5G ProSe End UE and the target 5G ProSe End UE via the 5G ProSe Layer-2 UE-to-UE Relay. The 5G ProSe Layer-2 UE-to-UE Relay forwards all the data traffic and End-to-End PC5-S signalling between the source 5G ProSe End UE and the target 5G ProSe End UE, as specified in TS 38.300 [12].

6.7.3 5G ProSe UE-to-UE Relay Communication with Integrated Discovery 6.7.3.1 General 5G ProSe Communication via 5G ProSe UE-to-UE Relay with integrated Discovery is supported. For 5G ProSe UEto-UE Relay Communication with integrated Discovery, when a UE allows a UE-to-UE relay to be involved in the Direct Communication Request to the other UE, the UE indicates it by including a relay_indication in the broadcasted Direct Communication Request message.

When a UE-to-UE relay receives a Direct Communication Request including a relay_indication, it decides whether to forward the message according to e.g. Relay Service Code if there is any, Application ID, operator policy per Relay Service Code, signal strength and local policy.

6.7.3.2 Procedure for Communication Via Layer-3 UE-to-UE Relay

Figure 15:
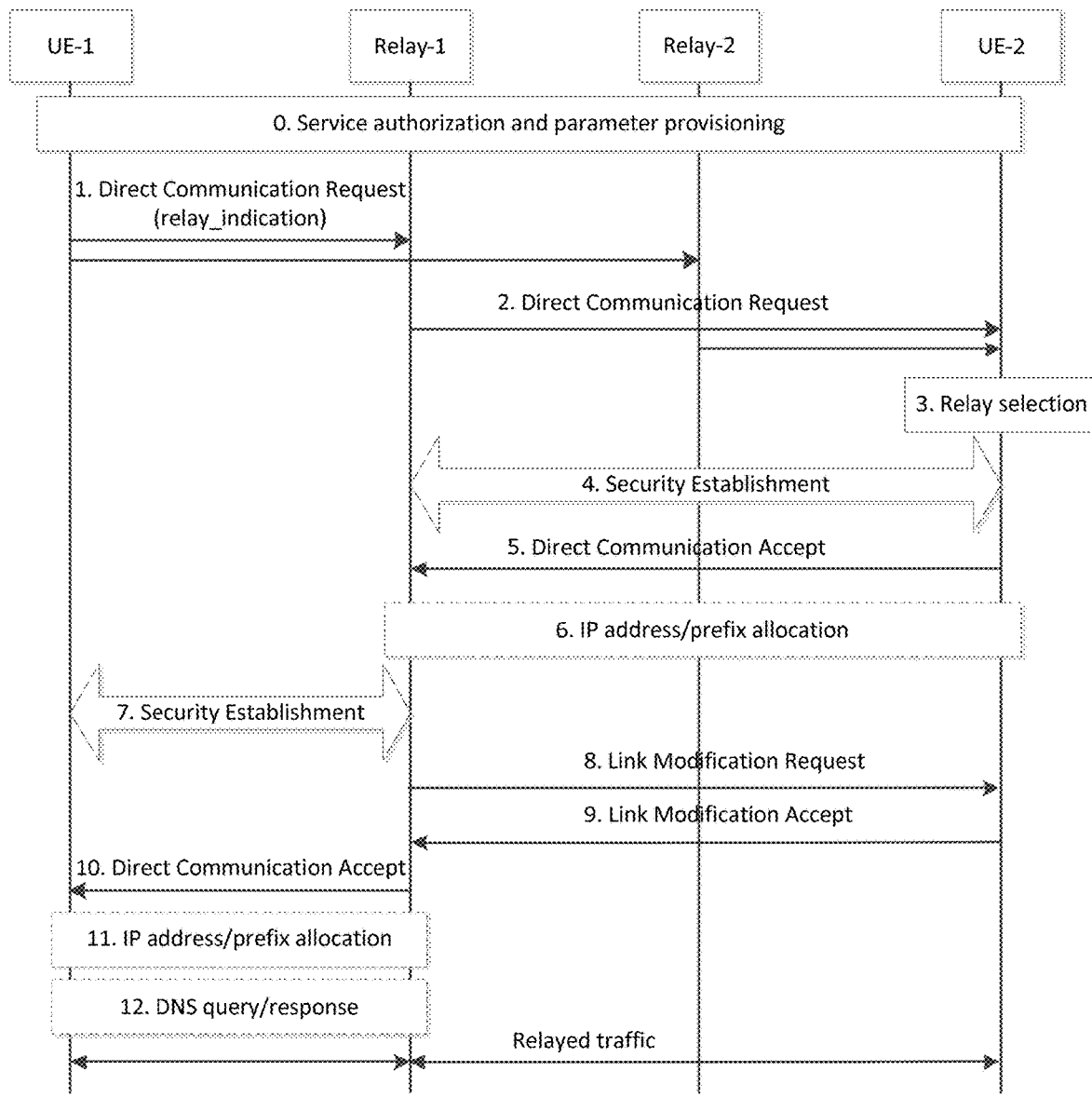
FIG. 15 is a reproduction of Figure 6.7.3.2-1 of 3GPP TS 23.304 V 18.6.0.

Figure 6.7.3.2-1 of 3GPP TS 23.304 V 18.6.0, Entitled "5G ProSe UE-to-UE Relay Communication with Integrated Discovery Via Layer-3 UE-to-UE Relay", is Reproduced as FIG. 15

0. 5G ProSe End UEs are authorized and provisioned with parameters to use the service provided by the 5G ProSe UE-to-UE Relays. 5G ProSe UE-to-UE Relays are authorized and provisioned with parameters to provide service of relaying traffic among 5G ProSe End UEs.
1. The source 5G ProSe End UE (i.e. UE-1) wants to establish a unicast communication with the target 5G ProSe End UE (i.e. UE-2) and broadcasts a Direct Communication Request. The parameters included in the Direct Communication Request message are described in clause 6.4.3.7.

The relay_indication in the Direct Communication Request is used to indicate whether 5G ProSe UE-to-UE Relay can forward the Direct Communication Request message or not. It is also used to limit the number of hops of 5G ProSe UE-to-UE Relay by removing relay_indication in the Direct Communication Request message from the 5G ProSe UE-to-UE Relay.

The Source Layer-2 ID and Destination Layer-2 ID used for the Direct Communication Request message are defined in clause 5.8.5.

The source 5G ProSe End UE gets application information and optional ProSe Application Requirements from ProSe application layer, and determines the end-to-end QoS parameters as described in clause 5.6.3.1.

NOTE 1: The data type of relay_indication can be determined in Stage 3.
2. When receiving Direct Communication Request with relay_indication from UE-1, the 5G ProSe UE-to-UE Relay (i.e. Relay-1 and Relay-2) may decide to participate in the procedure and broadcast a Direct Communication Request message in its proximity without relay_indication. The parameters included in the Direct Communication Request message are described in clause 6.4.3.7.

The Source Layer-2 ID and Destination Layer-2 ID used for the Direct Communication Request message are defined in clause 5.8.5.
3. When UE-2 receives a Direct Communication Request from one or multiple 5G ProSe UE-to-UE Relays, UE-2 select a 5G ProSe UE-to-UE Relay which UE-2 will respond. UE-2 may select the 5G ProSe UE-to-UE Relay according to e.g. the signal strength, local policy, operator policy per Relay Service Code if any.
4. The security establishment happens between UE-2 and the selected 5G ProSe UE-to-UE Relay (here Relay-1), if needed.

If the existing PC5 link can be reused, Link Modification Request and Link Modification Accept messages are used.

NOTE 2: The conflict between Link Modification Request and Direct Communication Request can be determined in Stage 3.
5. UE-2 replies Direct Communication Accept message to Relay-1. The parameters included in the Direct Communication Accept message are described in clause 6.4.3.7.
6. For IP traffic, IPv6 prefix or IPv4 address is allocated for the target 5G ProSe Layer-3 End UE as defined in clause 5.5.1.4.
7. Security establishment happens between UE-1 and Relay-1, if needed.
8. For 5G ProSe UE-to-UE Relay Communication with integrated Discovery, after receiving QoS Info of the end-to-end QoS from UE-1, Relay-1 provides the QoS info of the second hop QoS to UE-2 with Link Modification Request message.
9. For 5G ProSe UE-to-UE Relay Communication with integrated Discovery, UE-2 responds with a Link Modification Accept message.
10. Relay-1 responds with Direct Communication Accept to the UE-1. The parameters included in the Direct Communication Accept message are described in clause 6.4.3.7.
11. For IP traffic, IPv6 prefix or IPv4 address is allocated for the source 5G ProSe Layer-3 End UE as defined in clause 5.5.1.4.
12. For IP communication, the 5G ProSe Layer-3 UE-to-UE Relay may store an association of user info (i.e. Application Layer ID) and the IP address of target 5G ProSe Layer-3 End UE into its DNS entries and the 5G ProSe Layer-3 UE-to-UE Relay may act as a DNS server to other UEs. The source 5G ProSe Layer-3 End UE may send a DNS query to the 5G ProSe Layer-3 UE-to-UE Relay to request IP address of target 5G ProSe Layer-3 End UE after step 11 if the IP address of target 5G ProSe Layer-3 End UE is not received in step 10 and the 5G ProSe Layer-3 UE-to-UE Relay returns the IP address of the target 5G ProSe Layer-3 End UE to the source 5G ProSe Layer-3 End UE.

For Ethernet communication, the 5G ProSe Layer-3 UE-to-UE Relay is acting as an Ethernet switch by maintaining the association between PC5 links and Ethernet MAC addresses received from the 5G ProSe Layer-3 End UE.

For Unstructured traffic communication, for each pair of source and target 5G ProSe Layer-3 End UEs, the 5G ProSe Layer-3 UE-to-UE Relay maintains the 1:1 mapping between the PC5 link with source 5G ProSe Layer-3 End UE and the PC5 link with target 5G ProSe Layer-3 End UE.

The source 5G ProSe Layer-3 End UE communicates with the target 5G ProSe Layer-3 End UE via the 5G ProSe Layer-3 UE-to-UE Relay.

6.7.3.3 Procedure for Communication Via Layer-2 UE-to-UE Relay

Figure 16:
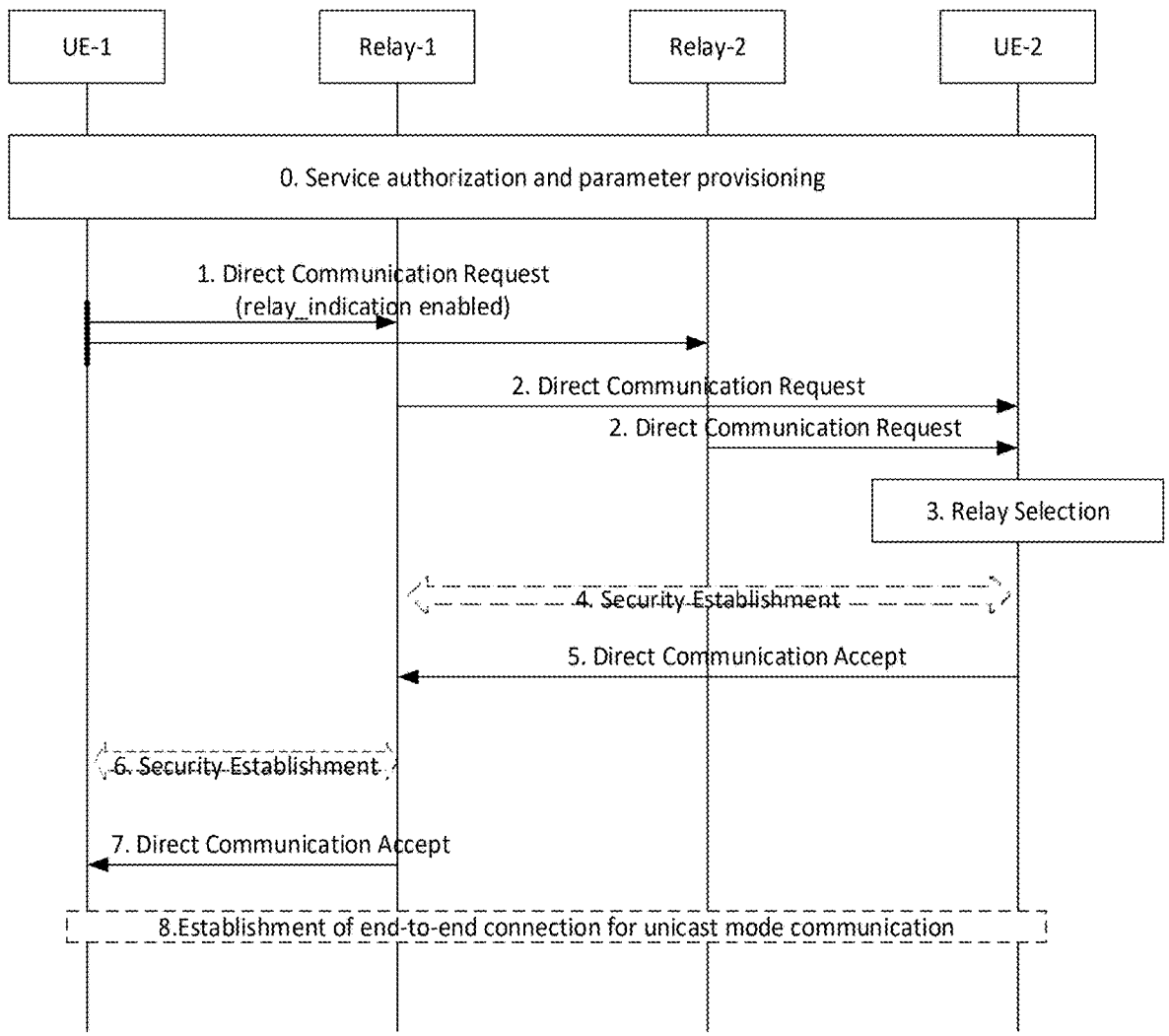
FIG. 16 is a reproduction of Figure 6.7.3.3-1 of 3GPP TS 23.304 V 18.6.0.

Figure 6.7.3.3-1 of 3GPP TS 23.304 V 18.6.0, Entitled "5G ProSe UE-to-UE Relay Communication with Integrated Discovery Via Layer-2 UE-to-UE Relay", is Reproduced as FIG. 16

0-5. It is the same as steps 0-5 of Figure 6.7.3.2-1.
6. It is the same as step 7 of Figure 6.7.3.2-1.
7. It is the same as step 10 of Figure 6.7.3.2-1.

The parameters included in the above messages are described in clause 6.4.3.7.4.

8. For 5G ProSe UE-to-UE Relay Communication via Layer-2 UE-to-UE Relay, UE-1 establishes an end-to-end connection for unicast mode communication with UE-2.

3GPP TS 24.554 introduced the following concepts:

7.2.2 5G ProSe Direct Link Establishment Procedure 7.2.2.1 General

Depending on the type of the 5G ProSe direct link establishment procedure (i.e., UE oriented layer-2 link establishment or ProSe service oriented layer-2 link establishment in 3GPP TS 23.304 [2]), the 5G ProSe direct link establishment procedure is used to establish a 5G ProSe direct link between two UEs or to establish multiple 5G ProSe direct links between the UE and multiple target UEs. The UE sending the request message is called the "initiating UE" and the other UE is called the "target UE". If the request message does not indicate the specific target UE (i.e., target user info is not included in the request message) and multiple target UEs are interested in the ProSe application(s) indicated in the request message, then the initiating UE shall handle corresponding response messages received from those target UEs. The maximum number of 5G ProSe direct links established in a UE at a time shall not exceed an implementation-specific maximum number of established 5G ProSe direct links.

NOTE 1: The recommended maximum number of established 5G ProSe direct links is 8.

When the 5G ProSe direct link establishment procedure for a 5G ProSe layer-3 remote UE completes successfully and if there is a PDU session established for relaying the traffic of the 5G ProSe remote UE, the 5G ProSe layer-3 UE-to-network relay UE shall perform the remote UE report procedure as specified in 3GPP TS 24.501 [11].

NOTE 2: A single PC5 unicast link is established between a 5G ProSe layer-2 UE-to-network relay UE and a 5G ProSe layer-2 remote UE for supporting PDU sessions of the 5G ProSe layer-2 remote UE, as specified in 3GPP TS 38.300 [21].

7.2.2.2 5G ProSe Direct Link Establishment Procedure Initiation by Initiating UE The initiating UE shall meet the following pre-conditions before initiating this procedure:

a) the UE receives
  1) a request from upper layers to transmit the packet for ProSe application over PC5;
  2) a request from lower layers to trigger 5G ProSe direct link establishment;
  3) a PROSE DIRECT LINK ESTABLISHMENT REQUEST message in case of 5G ProSe UE-to-UE relay, to trigger 5G ProSe direct link establishment; or
  4) a PROSE DIRECT LINK MODIFICATION REQUEST message in case of 5G ProSe UE-to-UE relay, to trigger 5G ProSe direct link establishment;

b) the communication mode is unicast mode (e.g., pre-configured as specified in clause 5.2.4 or indicated by upper layers);

c) the link layer identifier for the initiating UE (i.e., layer-2 ID used for unicast communication) is available (e.g., pre-configured or self-assigned) and is not being used by other existing 5G ProSe direct links within the initiating UE;

d) the link layer identifier for the destination UE (i.e., the unicast layer-2 ID of the target UE or the broadcast layer-2 ID) is available to the initiating UE (e.g., pre-configured, obtained as specified in clause 5.2, known via prior ProSe direct communication or indicated by lower layers);

NOTE 1: In the case where different ProSe applications are mapped to distinct default destination layer-2 IDs, when the initiating UE intends to establish a single unicast link that can be used for more than one ProSe identifiers, the UE can select any of the default destination layer-2 ID for unicast initial signalling.

e) the initiating UE is either authorised for 5G ProSe direct communication over PC5 in NR-PC5 in the serving PLMN, has a valid authorization for 5G ProSe direct communication over PC5 in NR-PC5 when not served by NG-RAN, is authorized to use a 5G ProSe UE-to-network relay UE, is authorized to use a 5G ProSe UE-to-UE relay UE or is authorized to act as a 5G ProSe UE-to-UE relay UE. The UE considers that it is not served by NG-RAN if the following conditions are met:

1) not served by NG-RAN for ProSe direct communication over PC5;
  2) in limited service state as specified in 3GPP TS 23.122 [14], if the reason for the UE being in limited service state is one of the following;
    i) the UE is unable to find a suitable cell in the selected PLMN as specified in 3GPP TS 38.304 [15];
    ii) the UE received a REGISTRATION REJECT message or a SERVICE REJECT message with the 5GMM cause #11 "PLMN not allowed" as specified in 3GPP TS 24.501 [11];
    iii) the UE received a REGISTRATION REJECT message or a SERVICE REJECT message with the 5GMM cause #7 "5GS services not allowed" as specified in 3GPP TS 24.501 [11]; or
    iv) the UE does not have a valid USIM, the 5G ProSe direct link establishment procedure is for direct communication between the 5G ProSe remote UE and the 5G ProSe UE-to-network relay UE, and the RSC is specific for emergency services; or
  3) in limited service state as specified in 3GPP TS 23.122 for reasons other than i), ii), iii) or iv) above and located in a geographical area for which the UE is provisioned with "non-operator managed" radio parameters as specified in clause 5.2;

f) there is no existing 5G ProSe direct link for the pair of peer application layer IDs, or there is an existing 5G ProSe direct link for the pair of peer application layer IDs and:
  1) the network layer protocol of the existing 5G ProSe direct link is not identical to the network layer protocol required by the upper layer in the initiating UE for this ProSe application;
  2) the security policy (either signalling security policy or user plane security policy) corresponding to the ProSe identifier is not compatible with the security policy of the existing 5G ProSe direct link; or
  3) in case of the 5G ProSe direct link establishment procedure is for direct communication between the 5G ProSe layer-3 remote UE and the 5G ProSe layer-3 UE-to-network relay UE, the existing 5G ProSe direct link for the peer UE is established with a different RSC or established not for direct communication between the 5G ProSe layer-3 remote UE and the 5G ProSe layer-3 UE-to-network relay UE;

4) in case of the 5G ProSe direct link establishment procedure is for direct communication between the 5G ProSe layer-2 remote UE and the 5G ProSe layer-2 UE-to-network relay UE, the existing 5G ProSe direct link for the peer UE is established not for direct communication between the 5G ProSe layer-2 remote UE and the 5G ProSe layer-2 UE-to-network relay UE;

5) in case of the 5G ProSe direct link establishment procedure is for direct communication between the source 5G ProSe layer-3 end UE and the 5G ProSe layer-3 UE-to-UE relay UE, the initiating UE acts as the source 5G ProSe end UE, the existing 5G ProSe direct link for the peer UE is established with a different RSC or established not for direct communication between the source 5G ProSe layer-3 end UE and the 5G ProSe layer-3 UE-to-UE relay UE;

6) in case of the 5G ProSe direct link establishment procedure is for direct communication between the 5G ProSe UE-to-UE relay UE and the target 5G ProSe end UE without integrated discovery, the initiating UE acts as the 5G ProSe UE-to-UE relay UE, the 5G ProSe direct link security mode control procedure between the source 5G ProSe end UE and the initiating UE has been successfully completed, and there is no 5G ProSe direct link established between the initiating UE and the target 5G ProSe end UE with the RSC received in PROSE DIRECT LINK ESTABLISHMENT REQUEST message for 5G ProSe UE-to-UE relay;

7) in case of the 5G ProSe direct link establishment procedure is for direct communication between the 5G ProSe layer-3 UE-to-UE relay UE and the target 5G ProSe layer-3 end UE, the initiating UE acting as the 5G ProSe layer-3 UE-to-UE relay UE receives a PROSE DIRECT LINK ESTABLISHMENT REQUEST message including the relay indication, and there is no 5G ProSe direct link established between the initiating UE and the target 5G ProSe end UE with the RSC received in PROSE DIRECT LINK ESTABLISHMENT REQUEST message for 5G ProSe UE-to-UE relay; or 8) in case of the 5G ProSe direct link establishment procedure is for direct communication between the 5G ProSe layer-3 UE-to-UE relay UE and the target 5G ProSe layer-3 end UE, the initiating UE acting as the 5G ProSe layer-3 UE-to-UE relay UE receives a PROSE DIRECT LINK MODIFICATION REQUEST message to establish 5G ProSe UE-to-UE relay communication with an additional 5G ProSe layer-3 end UE as specified in clause 7.2.3.2, and there is no 5G ProSe direct link established between the initiating UE and the additional target 5G ProSe end UE with the RSC received in PROSE DIRECT LINK MODIFICATION REQUEST message for 5G ProSe UE-to-UE relay;

g) the number of established 5G ProSe direct links is less than the implementation-specific maximum number of established 5G ProSe direct links allowed in the UE at a time; and h) timer T5088 is not associated with the link layer identifier for the destination UE or timer T5088 associated with the link layer identifier for the destination UE has already expired or stopped.

After receiving the service data or request from the upper layers, the initiating UE shall derive the PC5 QOS parameters and assign the PQFI(s) for the PC5 QoS flows(s) to be established as specified in clause 7.2.7.

If the 5G ProSe direct link establishment procedure is for direct communication between the 5G ProSe remote UE and the 5G ProSe UE-to-network relay UE, then the UE shall apply the DUCK or DUSK used for UE-to-network relay discovery along with the UTC-based counter for encrypting:
  a) the relay service code; and
  b) the UP-PRUK ID or CP-PRUK ID, if available,
as specified in clause 6.3.5.2 of 3GPP TS 33.503 [34], and the UE shall use the security protected relay service code and the security protected UP-PRUK ID or security protected CP-PRUK ID for creating a PROSE DIRECT LINK ESTABLISHMENT REQUEST message.
  NOTE 2: If the UE is neither configured with DUCK nor DUSK, the relay service code and the UP-PRUK ID or CP-PRUK ID are not encrypted.

If the 5G ProSe direct link establishment procedure is for direct communication between the 5G ProSe end UE and the 5G ProSe UE-to-UE relay UE, then the UE shall apply the DUCK or DUSK associated with the relay service code along with the UTC-based counter for encrypting:
  a) the relay service code; and
  b) the UP-PRUK ID or CP-PRUK ID, if available and the UE does not act as a 5G ProSe UE-to-UE relay UE,
as specified in clause 6.3.5.2 of 3GPP TS 33.503 [34], and the UE shall use the security protected relay service code and, if available and the UE does not act as a 5G ProSe UE-to-UE relay UE, the security protected UP-PRUK ID or security protected CP-PRUK ID for creating a PROSE DIRECT LINK ESTABLISHMENT REQUEST message.
  NOTE 2A: If the UE is neither configured with DUCK nor DUSK, the relay service code and the UP-PRUK ID or CP-PRUK ID are not encrypted.

If the 5G ProSe direct link establishment procedure is for ProSe identifier of ranging and sidelink positioning, then the UE shall apply the DUCK or DUSK used for ranging and sidelink positioning UE discovery along with the UTC-based counter for encrypting:
  a) the ProSe identifier of ranging and sidelink positioning; and
  b) the SLPK ID, if available,
as specified in 3GPP TS 33.533 [55], and the UE shall use the security protected ProSe identifier of ranging and sidelink positioning and the security protected SLPK ID for creating a PROSE DIRECT LINK ESTABLISHMENT REQUEST message.
  NOTE 2B: If the UE is neither configured with DUCK nor DUSK, the ProSe identifier of ranging and sidelink positioning and the SLPK ID are not encrypted.

In order to initiate the 5G ProSe direct link establishment procedure, the initiating UE shall create a PROSE DIRECT LINK ESTABLISHMENT REQUEST message. The initiating UE:
  a) shall include the source user info set to the initiating UE's application layer ID received from upper layers, or set to the user info of the source 5G ProSe end UE if the 5G ProSe direct link establishment procedure is for 5G ProSe direct communication between the 5G ProSe end UE and the 5G ProSe UE-to-UE relay UE;
  b) shall include the ProSe identifier(s) received from upper layer if the 5G ProSe direct link establishment procedure is not for 5G ProSe direct communication between the 5G ProSe remote UE and the 5G ProSe UE-to-network relay UE;
  c) shall include the target user info set to the target UE's application layer ID if received from upper layers or if known based on the unicast layer-2 ID of target UE (i.e. destination layer-2 ID) as described in clause 5.8.2.4 of 3GPP TS 23.304 [3], to the user info ID of the 5G ProSe UE-to-network relay UE obtained during the 5G ProSe UE-to-network relay discovery procedure if the initiating UE is acting as a 5G ProSe remote UE, or to the user info of the target 5G ProSe end UE if:
  1) the initiating UE is acting as the source 5G ProSe end UE and the user info of the target 5G ProSe end UE is obtained during the 5G ProSe UE-to-UE relay discovery procedure or received from upper layers in case of 5G ProSe direct link establishment with integrated discovery; or
  2) the initiating UE is acting as the 5G ProSe UE-to-UE relay UE and the user info of the target 5G ProSe end UE is obtained in the PROSE DIRECT LINK ESTABLISHMENT REQUEST message or PROSE DIRECT LINK MODIFICATION REQUEST message from the source 5G ProSe end UE;
ca) shall include the UE-to-UE relay UE user info set to the user info ID of the 5G ProSe UE-to-UE relay UE:
  1) if obtained during the 5G ProSe UE-to-UE relay discovery procedure and the 5G ProSe direct link establishment procedure is for 5G ProSe direct communication between the source 5G ProSe end UE and the 5G ProSe UE-to-UE relay UE; or
  2) if the initiating UE is acting as the 5G ProSe UE-to-UE relay UE and user info ID is configured at configuration parameters for 5G ProSe UE-to-UE relay as specified in clause 5.2.7;
cb) shall include the target end UE layer-2 ID set to the layer-2 ID of the target 5G ProSe end UE, if the initiating UE is acting as the source 5G ProSe end UE and the layer-2 ID of the target 5G ProSe end UE is available in the source 5G ProSe end UE via the previous direct communication;
d) if the 5G ProSe direct link is neither for direct communication between the 5G ProSe remote UE and the 5G ProSe UE-to-network relay UE, nor for direct communication between the 5G ProSe end UE and the 5G ProSe UE-to-UE relay UE using the security procedure with network assistance:
  1) shall include the key establishment information container if the UE PC5 unicast signalling integrity protection policy is set to "Signalling integrity protection required" or "Signalling integrity protection preferred" and may include the key establishment information container if the UE PC5 unicast signalling integrity protection policy is set to "Signalling integrity protection not needed";
NOTE 3: The key establishment information container is provided by upper layers.
e) shall include:
  1) a Nonce_1, if the direct communication is neither between the 5G ProSe remote UE and the 5G ProSe UE-to-network relay UE nor between the 5G ProSe end UE and the 5G ProSe UE-to-UE relay UE and the direct communication is not for ProSe identifier of ranging and sidelink positioning, or if the direct communication is between the 5G ProSe remote UE and the 5G ProSe UE-to-network relay UE or between the source 5G ProSe end UE and the 5G ProSe UE-to-UE relay UE and the security procedure over control plane is used as specified in 3GPP TS 33.503 [34];
  2) a $K_{NRP}$ freshness parameter 1, if the direct communication is between the 5G ProSe remote UE and the 5G ProSe UE-to-network relay UE or between the source 5G ProSe end UE and the 5G ProSe UE-to-UE relay UE and the security procedure over user plane is used as specified in 3GPP TS 33.503 [34]; or
  3) a $K_{SLP}$ freshness parameter 1, if the direct communication is for ProSe identifier of ranging and sidelink positioning as specified in 3GPP TS 33.533 [55];
  set to the 128-bit nonce value generated by the initiating UE for the purpose of session key establishment over this 5G ProSe direct link if the UE PC5 unicast signalling integrity protection policy is set to "Signalling integrity protection required" or "Signalling integrity protection preferred";
NOTE 4: The Nonce_1 IE in the PROSE DIRECT LINK ESTABLISHMENT REQUEST message is used to hold the value of Nonce_1 or $K_{NRP}$ freshness parameter 1.
f) shall include its UE security capabilities indicating the list of algorithms that the initiating UE supports for the security establishment of this 5G ProSe direct link;
g) shall include the MSB of $K_{NRP\text{-}sess}$ ID chosen by the initiating UE as specified in 3GPP TS 33.503 if:
  1) the direct communication is not for ProSe identifier of ranging and sidelink positioning;
  2) the direct communication is not between the target 5G ProSe end UE and the 5G ProSe UE-to-UE relay UE using the security procedure with network assistance; and
  3) the UE PC5 unicast signalling integrity protection policy is set to "Signalling integrity protection required" or "Signalling integrity protection preferred";
NOTE 5: If the direct communication is neither between the 5G ProSe remote UE and the 5G ProSe UE-to-network relay UE, nor between the 5G ProSe end UE and the 5G ProSe UE-to-UE relay UE using the security procedure with network assistance, the $K_{NRP\text{-}sess}$ ID holds the ID that corresponds to $K_{NRP\text{-}sess}$. If the direct communication is between the 5G ProSe remote UE and the 5G ProSe UE-to-network relay UE, or between the 5G ProSe end UE and the 5G ProSe UE-to-UE relay UE using the security procedure with network assistance, the $K_{NRP\text{-}sess}$ ID holds the ID that corresponds to $K_{NRP\text{-}sess}$ (if security procedure over user plane is used) or $K_{relay\text{-}sess}$ (if security procedure over control plane is used).
g1) shall include the MSB of $K_{SLP\text{-}sess}$ ID chosen by the initiating UE as specified in 3GPP TS 33.533 if:
  1) the direct communication is for ProSe identifier of ranging and sidelink positioning;
  2) the direct communication is not between the target 5G ProSe end UE and the 5G ProSe UE-to-UE relay UE using the security procedure with network assistance; and
  3) the UE PC5 unicast signalling integrity protection policy is set to "Signalling integrity protection required" or "Signalling integrity protection preferred";
h) may include a $K_{NRP}$ ID if the initiating UE has an existing $K_{NRP}$ for the target UE and the direct communication is neither between the 5G ProSe remote UE and the 5G ProSe UE-to-network relay UE nor between the 5G ProSe end UE and the 5G ProSe UE-to-UE relay UE using the security procedure with network assistance;
i) shall include its UE PC5 unicast signalling security policy. In the case where the different ProSe applications are mapped to the different PC5 unicast signalling security policies, when the initiating UE intends to establish a single unicast link that can be used for more than one ProSe application, each of the signalling security polices of those ProSe applications shall be compatible, e.g., "Signalling integrity protection not needed" and "Signalling integrity protection required" are not compatible. In case the 5G ProSe direct link establishment procedure is for direct communication between 5G ProSe remote UE and 5G ProSe UE-to-network relay UE, and the RSC is not specific for emergency services, the Signalling integrity protection policy shall be set to "Signalling integrity protection required". In case the 5G ProSe direct link establishment procedure is for direct communication between 5G ProSe remote UE and 5G ProSe UE-to-network relay UE, the RSC is specific for emergency services, and the initiating UE has a valid USIM, the Signalling integrity protection policy shall be set to "Signalling integrity protection preferred". In case the 5G ProSe direct link establishment procedure is for direct communication between 5G ProSe remote UE and 5G ProSe UE-to-network relay UE, the RSC is specific for emergency services, and the initiating UE does not have a valid USIM, the Signalling integrity protection policy shall be set to "Signalling integrity protection not needed";

j) shall include the Relay service code IE set to:
  1) the relay service code of the target relay UE if the 5G ProSe direct link establishment procedure is for direct communication between the 5G ProSe remote UE and the 5G ProSe UE-to-network relay UE; or
  2) the relay service code indicating the connectivity service requested by the source 5G ProSe end UE if the 5G ProSe direct link establishment procedure is for direct communication between the (source or target) 5G ProSe end UE and the 5G ProSe UE-to-UE relay UE;

k) shall include the UTC-based counter LSB set to the four least significant bits of the UTC-based counter if the 5G ProSe direct link establishment procedure is for direct communication between the 5G ProSe remote UE and the 5G ProSe UE-to-network relay UE or between the 5G ProSe end UE and the 5G ProSe UE-to-UE relay UE;

l) shall include the UE identity IE set to the SUCI of the initiating UE if:
  1) the 5G ProSe direct link establishment procedure is for direct communication between the 5G ProSe remote UE and the 5G ProSe UE-to-network relay UE or between the source 5G ProSe end UE and the 5G ProSe UE-to-UE relay UE;
  2) the RSC is not specific for emergency services or the initiating UE has a valid USIM; and
  3) the security for 5G ProSe UE-to-network relay or 5G ProSe UE-to-UE relay uses the security procedure over control plane and the initiating UE does not have a valid CP-PRUK as specified in 3GPP TS 33.503 [34], or, the security for 5G ProSe UE-to-network relay or 5G ProSe UE-to-UE relay uses the security procedure over user plane and the initiating UE does not have a valid UP-PRUK as specified in 3GPP TS 33.503 [34];

la) shall include the UE identity IE set to the PEI of the initiating UE if:
  1) the 5G ProSe direct link establishment procedure is for direct communication between the 5G ProSe remote UE and the 5G ProSe UE-to-network relay UE;
  2) the RSC is specific for emergency services; and
  3) the initiating UE does not have a valid USIM;

m) shall include the User security key ID IE set to:
  1) UP-PRUK ID of the initiating UE if:
    i) the 5G ProSe direct link establishment procedure is for direct communication between the 5G ProSe remote UE and the 5G ProSe UE-to-network relay UE or for direct communication between the source 5G ProSe end UE and the 5G ProSe UE-to-UE relay UE;
    ii) the initiating UE has a valid UP-PRUK; and
    iii) the security for 5G ProSe UE-to-network relay or 5G ProSe UE-to-UE relay uses the security procedure over user plane as specified in 3GPP TS 33.503 [34];
  2) CP-PRUK ID of the initiating UE that is associated with the relay service code of the target UE if:
    i) the 5G ProSe direct link establishment procedure is for direct communication between the 5G ProSe remote UE and the 5G ProSe UE-to-network relay UE or for direct communication between the source 5G ProSe end UE and the 5G ProSe UE-to-UE relay UE;
    ii) the initiating UE has a valid CP-PRUK is associated with the relay service code of the target UE; and
    iii) the security for 5G ProSe UE-to-network relay or 5G ProSe UE-to-UE relay uses the security procedure over control plane as specified in 3GPP TS 33.503 [34]; or
  3) SLPK ID of the initiating UE that is associated with the ProSe identifier of ranging and sidelink positioning if:
    i) the 5G ProSe direct link establishment procedure is for direct communication for ProSe identifier of ranging and sidelink positioning; and
    ii) the initiating UE has a valid SLPK is associated with the ProSe identifier of ranging and sidelink positioning;

n) shall include the HPLMN ID of the initiating UE, if the UP-PRUK ID of the initiating UE is included and is not in NAI format (see 3GPP TS 33.503 [34]);

o) shall include the MIC IE set to the calculated MIC value as specified in clause 6.3.5.3 of 3GPP TS 33.503 if the 5G ProSe direct link establishment procedure is for direct communication between the 5G ProSe remote UE and the 5G ProSe UE-to-network relay UE or between the 5G ProSe end UE and the 5G ProSe UE-to-UE relay UE and the UE has the DUIK;

o1) shall include the MIC IE set to the calculated MIC value as specified in 3GPP TS 33.533 if the 5G ProSe direct link establishment procedure is for ProSe identifier of ranging and sidelink positioning and the UE has the DUIK; and p) shall include the relay indication which indicates that the PROSE DIRECT LINK ESTABLISHMENT REQUEST message can be forwarded by a 5G ProSe UE-to-UE relay UE, if the 5G ProSe direct link establishment procedure is for direct communication between the source 5G ProSe end UE and 5G ProSe UE-to-UE relay UE with integrated discovery;

After the PROSE DIRECT LINK ESTABLISHMENT REQUEST message is generated, the initiating UE shall pass this message to the lower layers for transmission along with the source layer-2 ID and destination layer-2 ID as follows:

a) if the 5G ProSe direct communication is in a consequence of 5G ProSe direct discovery as defined in clause 6.2.14, clause 6.2.15, clause 8.2.1, clause 8a.2.1, or clause 6.2 in 3GPP TS 24.514 [56]:
self-assign a source layer-2 ID, and
1) the destination layer-2 ID set to the target end UE layer-2 ID if received in the PROSE DIRECT LINK ESTABLISHMENT REQUEST message or PROSE DIRECT LINK MODIFICATION REQUEST message from the source 5G ProSe end UE and if the initiating UE is acting as the 5G ProSe UE-to-UE relay UE; or
2) otherwise, the destination layer-2 ID set to the source layer-2 ID in the received PROSE PC5 DISCOVERY message for discovery announcement or discovery response;

b) if the initiating UE is acting as the source 5G ProSe end UE and the 5G ProSe direct link establishment procedure is for direct communication between the source 5G ProSe end UE and 5G ProSe UE-to-UE relay UE with integrated discovery:
self-assign a source layer-2 ID, and set the destination layer-2 ID to the broadcast destination layer-2 ID configured as specified in clause 5.2.4;

c) if the initiating UE is acting as the 5G ProSe UE-to-UE relay UE and the 5G ProSe direct link establishment procedure is for direct communication between the 5G ProSe UE-to-UE relay UE and target 5G ProSe end UE with integrated discovery:
self-assign a source layer-2 ID, and set the destination layer-2 ID to:
1) the target end UE layer-2 ID, if received in the PROSE DIRECT LINK ESTABLISHMENT REQUEST message from the source 5G ProSe end UE; otherwise
2) the broadcast destination layer-2 ID configured as specified in clause 5.2.4; or d) otherwise:
self-assign a source layer-2 ID, and the destination layer-2 ID set to the destination layer-2 ID used for unicast initial signalling as specified in clause 5.2.4, NOTE 6: The UE implementation ensures that any value of the self-assigned source layer-2 ID in a), b), c) and d) is different from any other self-assigned source layer-2 ID(s) in use for 5G ProSe direct discovery as specified in clause 6.2.14, clause 6.2.15, clause 8.2.1 and clause 8a.2.1, and is different from any other provisioned destination layer-2 ID(s) as specified in clause 5.2.

NOTE 6A: The UE implementation ensures that any value of the self-assigned source layer-2 ID in a), b) and c) is different from any self-assigned source layer-2 ID(s) in use for 5G ProSe direct communication of a data unit type different from the data unit type of the 5G ProSe direct link being established, if the 5G ProSe direct link establishment procedure is for 5G ProSe direct communication between the 5G ProSe layer-3 UE-to-UE relay UE and the target 5G ProSe layer-3 end UE.

NOTE 6B: The UE implementation ensures that any value of the self-assigned source layer-2 ID in a), b) and c) is different from any other self-assigned source layer-2 ID(s) in use for 5G ProSe direct communication for Unstructured traffic and a different pair of the user info of the source 5G ProSe end UE and the user info of the target 5G ProSe end UE, if the 5G ProSe direct link establishment procedure is for 5G ProSe direct communication between the 5G ProSe layer-3 UE-to-UE relay UE and the target 5G ProSe layer-3 end UE and for Unstructured traffic.

NOTE 7: It is possible for the initiating UE to reuse the initiating UE's layer-2 ID used in previous 5G ProSe direct link with the same peer UE, except when the 5G ProSe direct link establishment procedure is for 5G ProSe direct communication between the 5G ProSe layer-3 UE-to-UE relay UE and the target 5G ProSe layer-3 end UE for Unstructured traffic and a different pair of the user info of the source 5G ProSe end UE and the user info of the target 5G ProSe end UE, and except when the 5G ProSe direct link establishment procedure is for 5G ProSe direct communication between the 5G ProSe layer-3 UE-to-UE relay UE and the target 5G ProSe layer-3 end UE for a data unit type different than the data unit type of the previous 5G ProSe direct link. and start timer T5080.

NOTE 8: A default PC5 DRX configuration is used for transmitting the PROSE DIRECT LINK ESTABLISHMENT REQUEST message as specified in 3GPP TS 38.300 [21].

The UE shall not send a new PROSE DIRECT LINK ESTABLISHMENT REQUEST message to the same target UE identified by the same application layer ID while timer T5080 is running. If the target user info IE is not included in the PROSE DIRECT LINK ESTABLISHMENT REQUEST message (i.e., ProSe application oriented 5G ProSe direct link establishment procedure), the initiating UE shall handle multiple PROSE DIRECT LINK ESTABLISHMENT ACCEPT messages, if any, received from different target UEs for the establishment of multiple 5G ProSe direct links before the expiry of timer T5080.

NOTE 9: In order to ensure successful 5G ProSe direct link establishment, T5080 should be set to a value larger than the sum of T5089 and T5092.

Figure 17:
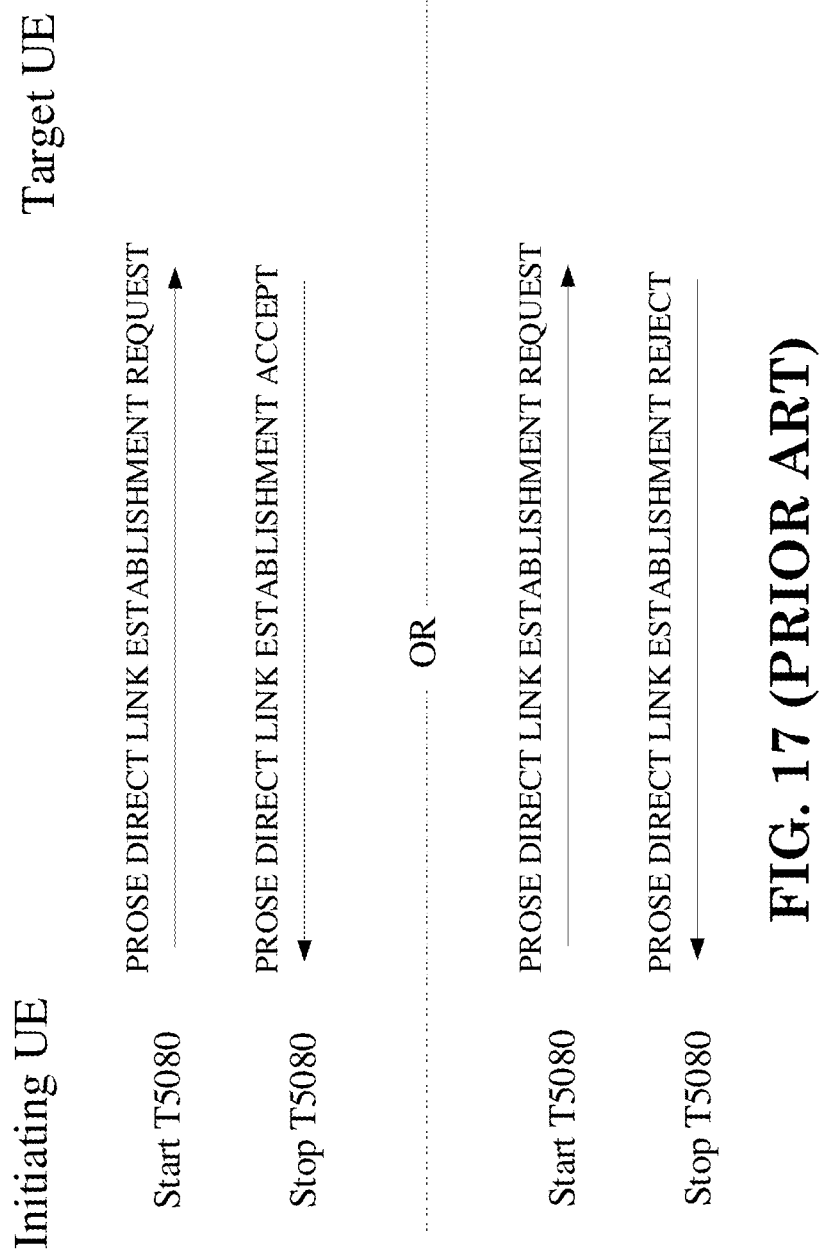
FIG. 17 is a reproduction of Figure 7.2.2.2.1 of 3GPP TS 24.554 V18.4.0.

Figure 7.2.2.2.1 of 3GPP TS 24.554 V18.4.0, Entitled "UE Oriented 5G ProSe Direct Link Establishment Procedure", is Reproduced as FIG. 17

Figure 18:
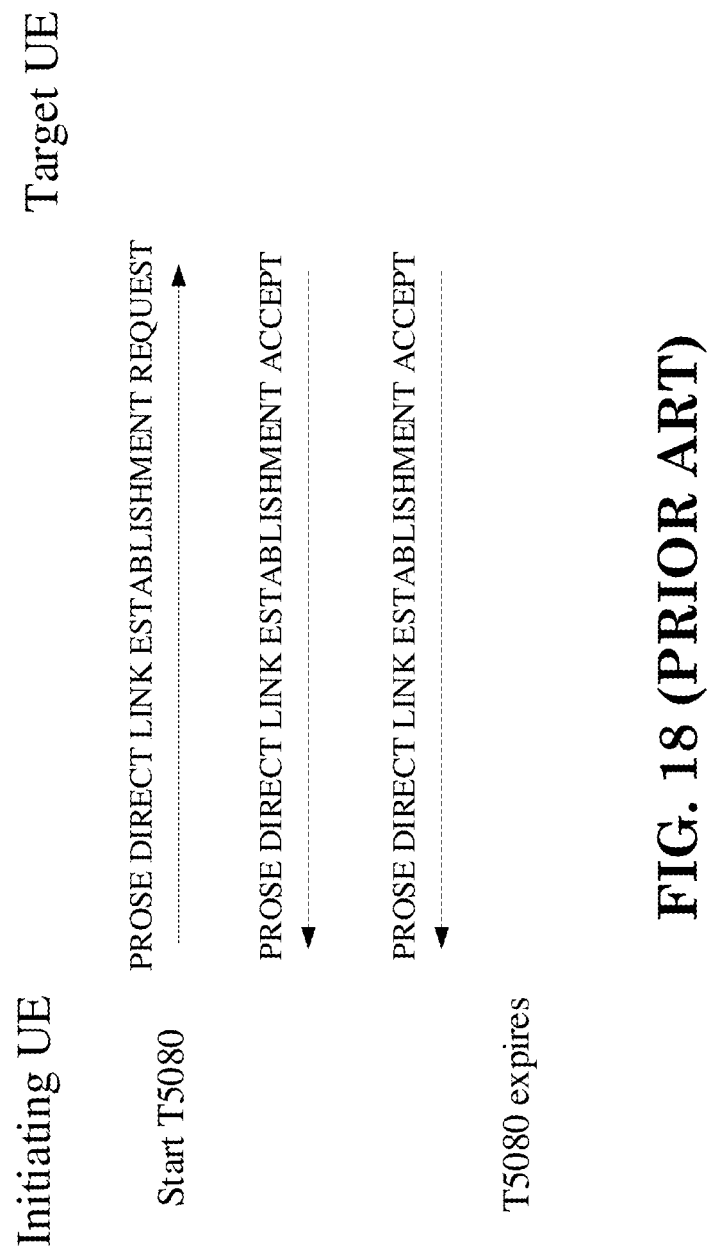
FIG. 18 is a reproduction of Figure 7.2.2.2.2 of 3GPP TS 24.554 V18.4.0.

Figure 7.2.2.2.2 of 3GPP TS 24.554 V18.4.0, Entitled "ProSe Service Oriented 5G ProSe Direct Link Establishment Procedure", is Reproduced as FIG. 18

7.2.2.3 5G ProSe Direct Link Establishment Procedure Accepted by the Target UE

Upon receipt of a PROSE DIRECT LINK ESTABLISHMENT REQUEST message, if the target UE accepts this request, the target UE shall uniquely assign a PC5 link identifier, create a 5G ProSe direct link context.

NOTE 1: A default PC5 DRX configuration is used for receiving the PROSE DIRECT LINK ESTABLISHMENT REQUEST message as specified in 3GPP TS 38.300 [21].

If the PROSE DIRECT LINK ESTABLISHMENT REQUEST message is for 5G ProSe direct communication between the 5G ProSe remote UE and the 5G ProSe UE-to-network relay UE, the target UE shall verify the MIC field in the received PROSE DIRECT LINK ESTABLISHMENT REQUEST with the DUIK, if any, and decrypts the encrypted:

a) relay service code; and
b) UP-PRUK ID or CP-PRUK ID, if received,
using the DUCK or DUSK used for 5G ProSe UE-to-network relay discovery (see clause 6.3.5.2 of 3GPP TS 33.503 [34]), and verifies if the relay service code matches with the one that the target UE has sent during 5G ProSe UE-to-network relay discovery procedure. To retrieve the DUIK for integrity verification and retrieve the DUCK or DUSK for decryption, the target UE shall use the Destination Layer-2 ID of the received PROSE DIRECT LINK ESTABLISHMENT REQUEST message. The target UE shall match the destination layer-2 ID with the source layer-2 ID stored in the maintained association for the UE-to-network relay discovery procedure as described in clause 8.2.1.2.2.2 and clause 8.2.1.3.2.2. For the matched source layer-2 ID, the target UE shall use the associated relay service code to identify the provisioned DUIK, DUCK or DUSK.

NOTE 2: If the UE is neither configured with DUCK nor DUSK, the relay service code and the UP-PRUK ID or CP-PRUK ID are not encrypted.

If the PROSE DIRECT LINK ESTABLISHMENT REQUEST message is for 5G ProSe direct communication between the 5G ProSe end UE and the 5G ProSe UE-to-UE relay UE, the target UE shall verify the MIC field in the received PROSE DIRECT LINK ESTABLISHMENT REQUEST with the DUIK, if any, and decrypts the encrypted:
a) relay service code; and
b) UP-PRUK ID or CP-PRUK ID, if received,
using the DUCK or DUSK used for 5G ProSe UE-to-UE relay discovery (see clause 6.3.5.2 of 3GPP TS 33.503 [34]), and verifies if the relay service code matches with the one that the target UE has sent during 5G ProSe UE-to-UE relay discovery procedure.

NOTE 2A: If the UE is neither configured with DUCK nor DUSK, the relay service code and the UP-PRUK ID or CP-PRUK ID are not encrypted.

If the PROSE DIRECT LINK ESTABLISHMENT REQUEST message is for ProSe identifier of ranging and sidelink positioning, the target UE shall verify the MIC field in the received PROSE DIRECT LINK ESTABLISHMENT REQUEST with the DUIK, if any, and decrypts the encrypted:
a) the ProSe identifier of ranging and sidelink positioning; and
b) the SLPK ID, if available,
using the DUCK or DUSK used for ranging and sidelink positioning UE discovery, and verifies if the ProSe identifier of ranging and sidelink positioning matches with the one that the target UE has sent during ranging and sidelink positioning UE discovery.

NOTE 2B: If the UE is neither configured with DUCK nor DUSK, the ProSe identifier of ranging and sidelink positioning and the SLPK ID are not encrypted.

If the target UE is acting as the target 5G ProSe end UE and the 5G ProSe direct link establishment procedure is for direct communication between the 5G ProSe UE-to-UE relay UE and target 5G ProSe end UE with integrated discovery, the target UE upon reception of the PROSE DIRECT LINK ESTABLISHMENT REQUEST messages which contain the same source user info, ProSe identifier(s) and relay service code as received from multiple 5G ProSe UE-to-UE relay UEs, selects one of the 5G ProSe UE-to-UE relay UEs via which to communicate with the source 5G ProSe end UE as specified in TS 23.304, clause 6.7.3.2.

If the 5G ProSe direct link establishment procedure is neither for direct communication between the 5G ProSe remote UE and the 5G ProSe UE-to-network relay UE, nor for direct communication between the 5G ProSe end UE and the 5G ProSe UE-to-UE relay UE using the security procedure with network assistance, and the 5G ProSe direct link establishment procedure is not for direct communication for ProSe identifier of ranging and sidelink positioning, the target UE may initiate 5G ProSe direct link authentication procedure as specified in clause 7.2.12 and shall initiate 5G ProSe direct link security mode control procedure as specified in clause 7.2.10.

If the 5G ProSe direct link establishment procedure is for direct communication between the 5G ProSe remote UE and the 5G ProSe UE-to-network relay UE, or for direct communication between the source 5G ProSe end UE and the 5G ProSe UE-to-UE relay UE using the security procedure with network assistance, upon reception of the PROSE DIRECT LINK ESTABLISHMENT REQUEST messages, and the initiating UE is identified by a SUCI, a CP-PRUK ID or a UP-PRUK ID, the target UE shall proceed with either:
a) the authentication and key agreement procedure as specified in clause 5.5.4 of 3GPP TS 24.501 if the security procedure over control plane as specified in 3GPP TS 33.503 is used; or
b) the key request procedure as specified in clause 8.2.10.2.4 if the security procedure over user plane as specified in 3GPP TS 33.503 is used;
and if:
a) the security procedure over control plane or the security procedure over user plane as specified in 3GPP TS 33.503 is completed successfully; or
b) the security procedure over control plane or the security procedure over user plane as specified in 3GPP TS 33.503 fails, the RSC is specific for emergency services, and providing 5G ProSe direct link for emergency services without 5G ProSe direct link security is required by the target UE's configuration;
shall initiate 5G ProSe direct link security mode control procedure as specified in clause 7.2.10.

NOTE 3: The target UE's configuration that indicates whether providing 5G ProSe direct link for emergency services without 5G ProSe direct link security is required or not is set based on the regulation and the operator policy. It is up to implementation how this information is known in the target UE.

If the 5G ProSe direct link establishment procedure is for direct communication between the 5G ProSe UE-to-UE relay UE and the target 5G ProSe end UE using the security procedure with network assistance, upon reception of the PROSE DIRECT LINK ESTABLISHMENT REQUEST messages, the target UE shall proceed with 5G ProSe direct link security request procedure as specified in clause 8a.2.10.

If the 5G ProSe direct link establishment procedure is for direct communication for ProSe identifier of ranging and sidelink positioning, the target UE shall proceed with the SLP key request procedure as specified in clause 8.3.1.1.2 in 3GPP TS 24.514 [56], and shall initiate 5G ProSe direct link security mode control procedure as specified in clause 7.2.10.

If the 5G ProSe direct link establishment procedure is for direct communication between the 5G ProSe remote UE and the 5G ProSe UE-to-network relay UE, the RSC is specific for emergency services, the initiating UE is identified by a PEI, and providing 5G ProSe direct link for emergency services without 5G ProSe direct link security is required by the target UE's configuration, the target UE shall initiate 5G ProSe direct link security mode control procedure as specified in clause 7.2.10.

The target UE shall set the source layer-2 ID and the destination layer-2 ID as specified in clause 7.2.12 and clause 7.2.10, and store the corresponding source layer-2 ID for unicast communication and the destination layer-2 ID for unicast communication in the 5G ProSe direct link context.

If:
- a) the target user info IE is included in the PROSE DIRECT LINK ESTABLISHMENT REQUEST message and this IE includes the target UE's application layer ID; or
- b) the target user info IE is not included in the PROSE DIRECT LINK ESTABLISHMENT REQUEST message and the target UE is interested in the ProSe application(s) identified by the ProSe identifier IE in the PROSE DIRECT LINK ESTABLISHMENT REQUEST message;

then the target UE shall:
- a) if the direct communication is neither between the 5G ProSe remote UE and the 5G ProSe UE-to-network relay UE, nor for direct communication between the 5G ProSe end UE and the 5G ProSe UE-to-UE relay UE using the security procedure with network assistance. The 5G ProSe direct link establishment procedure is not for direct communication for ProSe identifier of ranging and sidelink positioning:
  1) identify an existing $K_{NRP}$ based on the $K_{NRP}$ ID included in the PROSE DIRECT LINK ESTABLISHMENT REQUEST message; or
  2) if $K_{NRP}$ ID is not included in the PROSE DIRECT LINK ESTABLISHMENT REQUEST message, the target UE does not have an existing $K_{NRP}$ for the $K_{NRP}$ ID included in PROSE DIRECT LINK ESTABLISHMENT REQUEST message or the target UE wishes to derive a new $K_{NRP}$, derive a new $K_{NRP}$. This may require performing one or more 5G ProSe direct link authentication procedures as specified in clause 7.2.12;
- b) if the direct communication is between the 5G ProSe remote UE and the 5G ProSe UE-to-network relay UE or between the 5G ProSe end UE and the 5G ProSe UE-to-UE relay UE, the initiating UE is identified by a SUCI or a CP-PRUK ID, and the security procedure over control plane as specified in 3GPP TS 33.503 is used, request a new $K_{NR\_ProSe}$ according to the security procedure over user plane as specified in 3GPP TS 33.503 [34];
- c) if the direct communication is between the 5G ProSe remote UE and the 5G ProSe UE-to-network relay UE or between the 5G ProSe end UE and the 5G ProSe UE-to-UE relay UE, the initiating UE is identified by a SUCI or a UP-PRUK ID, and the security procedure over user plane as specified in 3GPP TS 33.503 is used, request a new $K_{NRP}$ according to the security procedure over user plane; and
- NOTE 4: How many times the 5G ProSe direct link authentication procedure needs to be performed to derive a new $K_{NRP}$ depends on the authentication method used.
- d) if the direct communication is between the 5G ProSe remote UE and the 5G ProSe UE-to-network relay UE, the RSC is specific for emergency services, the initiating UE is identified by a PEI, and providing 5G ProSe direct link for emergency services without 5G ProSe direct link security is required by the target UE's configuration, generate a new $K_{NRP}$ in an implementation defined way.
- e) if the 5G ProSe direct link establishment procedure is for direct communication for ProSe identifier of ranging and sidelink positioning, request a new $K_{SLP}$ according to the security procedure as specified in 3GPP TS 33.533 [55].

If the direct communication is between the 5G ProSe remote UE and the 5G ProSe UE-to-network relay UE, the RSC is specific for emergency services, the security procedure over control plane or the security procedure over user plane as specified in 3GPP TS 33.503 fails, and providing 5G ProSe direct link for emergency services without 5G ProSe direct link security is required by the target UE's configuration, the target UE shall generate a new $K_{NR\_ProSe}$ or $K_{NRP}$ in an implementation defined way.

After an existing $K_{NRP}$ or $K_{SLP}$ was identified or a new $K_{NRP}$ or $K_{SLP}$ was derived, or after a new $K_{NRP}$ or $K_{NR\_ProSe}$ or $K_{SLP}$ is received or a new $K_{NR\_ProSe}$ or $K_{NRP}$ were generated, the target UE shall initiate a 5G ProSe direct link security mode control procedure as specified in clause 7.2.10. Upon successful completion of the 5G ProSe direct link security mode control procedure, in order to determine whether the PROSE DIRECT LINK ESTABLISHMENT REQUEST message can be accepted or not, in case of IP communication, the target UE checks whether there is at least one common IP address configuration option supported by both the initiating UE and the target UE.

If the direct communication is between the 5G ProSe remote UE and the 5G ProSe UE-to-network relay UE, the RSC is specific for emergency services, the security procedure over control plane or the security procedure over user plane as specified in 3GPP TS 33.503 fail, and providing 5G ProSe direct link for emergency services without 5G ProSe direct link security is required by the target UE's configuration, before sending the PROSE DIRECT LINK ESTABLISHMENT ACCEPT message to the 5G ProSe remote UE, the target UE shall perform the 5G ProSe direct link remote identity procedure to fetch PEI.

Before sending the PROSE DIRECT LINK ESTABLISHMENT ACCEPT message to the 5G ProSe remote UE, the target UE acting as a 5G ProSe layer-3 UE-to-network relay UE initiates the UE requested PDU session establishment procedure as specified in 3GPP TS 24.501 if:
1) the PDU session for relaying the service associated with the RSC has not been established yet; or
2) the PDU session for relaying the service associated with the RSC has been established but the PDU session type is Unstructured.

If the target UE accepts the 5G ProSe direct link establishment procedure, the target UE shall create a PROSE DIRECT LINK ESTABLISHMENT ACCEPT message. The target UE:
- a) shall include the source user info set to the target UE's application layer ID received from upper layers, or set to the user info of the target 5G ProSe end UE if the 5G ProSe direct link establishment procedure is for 5G ProSe direct communication between the 5G ProSe end UE and the 5G ProSe UE-to-UE relay UE;
- aa) shall include the UE-to-UE relay UE user info set to the user info ID of the 5G ProSe UE-to-UE relay UE if the 5G ProSe direct link establishment procedure is for 5G ProSe direct communication between the source 5G ProSe end UE and the 5G ProSe UE-to-UE relay UE;
- b) shall include PQFI(s), the corresponding PC5 QoS parameters and optionally the ProSe identifier(s) that the target UE accepts, if the target UE is not acting as a 5G ProSe layer-2 UE-to-network relay UE and the 5G ProSe direct link establishment procedure is not with integrated discovery;

c) may include the PC5 QOS rule(s) if the target UE is not acting as a 5G ProSe layer-2 UE-to-network relay UE and the 5G ProSe direct link establishment procedure is not with integrated discovery;

d) shall include an IP address configuration IE set to one of the following values if IP communication is used and the target UE is not acting as a 5G ProSe layer-2 UE-to-network relay UE, 5G ProSe layer-2 UE-to-UE relay UE or 5G ProSe layer-3 UE-to-UE relay UE using the security procedure with network assistance:
  1) "DHCPv4 server" if only IPv4 address allocation mechanism is supported by the target UE, i.e., acting as a DHCPv4 server;
  2) "IPv6 router" if only IPV6 address allocation mechanism is supported by the target UE, i.e., acting as an IPV6 router;
  3) "DHCPv4 server & IPV6 Router" if both IPv4 and IPV6 address allocation mechanism are supported by the target UE; or
  4) "address allocation not supported" if neither IPv4 nor IPv6 address allocation mechanism is supported by the target UE and the target UE is not acting as a 5G ProSe layer-3 UE-to-network relay UE;

NOTE 5: The UE doesn't include an IP address configuration IE nor a link local IPV6 address IE if Ethernet or Unstructured data unit type is used for communication.

e) shall include a link local IPV6 address IE formed locally based on IETF RFC 4862 if IP address configuration IE is set to "address allocation not supported", the received PROSE DIRECT LINK SECURITY MODE COMPLETE message included a link local IPV6 address IE and the target UE is not acting as a 5G ProSe layer-2 UE-to-network relay UE, 5G ProSe layer-3 UE-to-network relay UE, or 5G ProSe layer-2 UE-to-UE relay UE or 5G ProSe layer-3 UE-to-UE relay UE using the security procedure with network assistance;

f) shall include the configuration of UE PC5 unicast user plane security protection based on the agreed user plane security policy, as specified in 3GPP TS 33.503 [34]. If the direct communication is between the 5G ProSe remote UE and the 5G ProSe UE-to-network relay UE, the RSC is specific for emergency services, and:
  1) the security procedure over control plane or the security procedure over user plane as specified in 3GPP TS 33.503 fails; or
  2) the initiating UE is identified by a PEI;
  the target UE shall include the user plane integrity protection configuration set to "off" and the user plane ciphering configuration set to "off";

g) if the 5G ProSe direct link establishment procedure is for 5G ProSe direct communication between the source or target 5G ProSe layer-3 end UE and the 5G ProSe layer-3 UE-to-UE relay UE, and for Ethernet traffic, shall include the MAC address of the target 5G ProSe layer-3 end UE; and h) may include a target 5G ProSe layer-3 end UE IP address IE set to the IP address of the target 5G ProSe layer-3 end UE, if the 5G ProSe direct link establishment procedure is for 5G ProSe direct communication between the source 5G ProSe layer-3 end UE and the 5G ProSe layer-3 UE-to-UE relay UE, and the data unit type for the communication is IP.

After the PROSE DIRECT LINK ESTABLISHMENT ACCEPT message is generated, the target UE shall pass this message to the lower layers for transmission along with the initiating UE's layer-2 ID for unicast communication and the target UE's layer-2 ID for unicast communication and shall start timer T5090 if:
  a) at least one of ProSe identifiers for the 5G ProSe direct links satisfies the privacy requirements as specified in clause 5.2.4; or
  b) T5090 is configured as specified in clause 5.2.5.

NOTE 6: Two UEs negotiate the PC5 DRX configuration in the AS layer, and the PC5 DRX parameter values are configured per pair of source and destination Layer-2 IDs in the AS layer, as specified in 3GPP TS 38.300 [21].

After sending the PROSE DIRECT LINK ESTABLISHMENT ACCEPT message, the target UE shall provide the following information along with the layer-2 IDs to the lower layer, which enables the lower layer to handle the coming PC5 signalling or traffic data:
  a) the PC5 link identifier self-assigned for this 5G ProSe direct link;
  b) PQFI(s) and its corresponding PC5 QoS parameters, if available;
  c) an indication of activation of the PC5 unicast user plane security protection for the 5G ProSe direct link, if applicable; and
  d) an indication of emergency services for the 5G ProSe direct link if the 5G ProSe direct link is established with the RSC specific for emergency services between the 5G ProSe layer-2 remote UE and the 5G ProSe layer-2 UE-to-network relay UE.

If the target UE accepts the 5G ProSe direct link establishment request and the 5G ProSe direct link is established not for 5G ProSe direct communication between the 5G ProSe remote UE and the 5G ProSe UE-to-network relay UE and not for 5G ProSe direct communication between the 5G ProSe end UE and the 5G ProSe UE-to-UE relay UE, then the target UE may perform the PC5 QoS flow establishment over 5G ProSe direct link as specified in clause 7.2.7. If the 5G ProSe direct link is established for 5G ProSe direct communication between the 5G ProSe layer-3 remote UE and the 5G ProSe layer-3 UE-to-network relay UE, then the target UE may perform the PC5 QoS flow establishment over 5G ProSe direct link as specified in clause 8.2.6. If the 5G ProSe direct link is established for 5G ProSe direct communication between the 5G ProSe layer-3 end UE and the 5G ProSe layer-3 UE-to-UE relay UE, then the target UE may perform the PC5 QoS flow establishment over 5G ProSe direct link as specified in clause 8a.2.7.

7.2.2.4 5G ProSe Direct Link Establishment Procedure Completion by the Initiating UE If the Target user info IE is included in the PROSE DIRECT LINK ESTABLISHMENT REQUEST message, upon receipt of the PROSE DIRECT LINK ESTABLISHMENT ACCEPT message, the initiating UE shall stop timer T5080. If the Target user info IE is not included in the PROSE DIRECT LINK ESTABLISHMENT REQUEST message the initiating UE may keep the timer T5080 running and continue to handle multiple response messages (i.e., the PROSE DIRECT LINK ESTABLISHMENT ACCEPT message) from multiple target UEs.

For each of the PROSE DIRECT LINK ESTABLISHMENT ACCEPT message received, the initiating UE shall uniquely assign a PC5 link identifier and create a 5G ProSe direct link context for each of the 5G ProSe direct link(s). Then the initiating UE shall store the source layer-2 ID and the destination layer-2 ID used in the transport of this message provided by the lower layers in the 5G ProSe direct link context(s) to complete the establishment of the 5G ProSe direct link with the target UE(s). From this time onward the initiating UE shall use the established link(s) for ProSe direct communication over PC5 and additional PC5 signalling messages to the target UE(s).

If the initiating UE is acting as the 5G ProSe UE-to-UE relay UE and the 5G ProSe direct link establishment procedure is for direct communication between the 5G ProSe UE-to-UE relay UE and target 5G ProSe end UE with integrated discovery, the initiating UE upon receipt of the PROSE DIRECT LINK ESTABLISHMENT ACCEPT message from the target 5G ProSe end UE, shall initiate the 5G ProSe direct link security mode control procedure with the source 5G ProSe end UE, and the initiating UE upon successful completion of the 5G ProSe direct link security mode control procedure with the source 5G ProSe end UE, shall create a PROSE DIRECT LINK ESTABLISHMENT ACCEPT message as specified in clause 7.2.2.3 to send to the source 5G ProSe end UE. If the target user info IE is not included in the PROSE DIRECT LINK ESTABLISHMENT REQUEST message, the initiating UE acting as the 5G ProSe UE-to-UE relay UE may initiate the 5G ProSe direct link security mode control procedure with the source 5G ProSe end UE after handling multiple response messages (i.e., the PROSE DIRECT LINK ESTABLISHMENT ACCEPT message) from multiple target end UEs.

After receiving the PROSE DIRECT LINK ESTABLISHMENT ACCEPT message, the initiating UE shall provide the following information along with the layer-2 IDs to the lower layer, which enables the lower layer to handle the coming PC5 signalling or traffic data:
 a) the PC5 link identifier self-assigned for this 5G ProSe direct link;
 b) PQFI(s) and its corresponding PC5 QoS parameters, if available; and
 c) an indication of activation of the PC5 unicast user plane security protection for the 5G ProSe direct link, if applicable.

The initiating UE shall start timer T5090 if:
 a) at least one of ProSe identifiers for the 5G ProSe direct links satisfies the privacy requirements as specified in clause 5.2.4; or
 b) T5090 is configured as specified in clause 5.2.5.

In addition, the initiating UE may perform the PC5 QoS flow establishment over 5G ProSe direct link as specified in clause 7.2.7.

Upon expiry of the timer T5080, if the PROSE DIRECT LINK ESTABLISHMENT REQUEST message did not include the Target user info IE and the initiating UE received at least one PROSE DIRECT LINK ESTABLISHMENT ACCEPT message, it is up to the UE implementation to consider the 5G ProSe direct link establishment procedure as complete or to restart the timer T5080. If the 5G ProSe direct link establishment procedure is triggered by a PROSE DIRECT LINK MODIFICATION REQUEST message from the source 5G ProSe layer-3 end UE as specified in clause 7.2.3.2, upon receipt of the PROSE DIRECT LINK ESTABLISHMENT ACCEPT message, the initiating UE shall send a PROSE DIRECT LINK MODIFICATION ACCEPT message to the source 5G ProSe layer-3 end UE as specified in clause 7.2.3.3, if the initiating UE acts as the 5G ProSe layer-3 UE-to-UE relay UE.

If the 5G ProSe direct link establishment procedure is for 5G ProSe direct communication between the 5G ProSe layer-3 UE-to-UE relay UE and the target 5G ProSe layer-3 end UE, for Ethernet traffic, and the initiating UE acting as the 5G ProSe layer-3 UE-to-UE relay UE detects that the MAC address of the target 5G ProSe layer-3 end UE in the PROSE DIRECT LINK ESTABLISHMENT ACCEPT message is not unique, i.e., the MAC address of the target 5G ProSe layer-3 end UE was also provided by another 5G ProSe layer-3 end UE in an existing ProSe 5G direct link, the 5G ProSe layer-3 UE-to-UE relay UE shall perform 5G ProSe direct link release procedure as specified in clause 7.2.6.

[ . . . ]

7.2.4 5G ProSe Direct Link Identifier Update Procedure 7.2.4.1 General

The 5G ProSe direct link identifier update procedure is used to update and exchange the new identifiers (e.g., application layer ID, layer-2 ID, security information and IP address/prefix) between two UEs for a 5G ProSe direct link before using the new identifiers. The UE sending the PROSE DIRECT LINK IDENTIFIER UPDATE REQUEST message is called the "initiating UE" and the other UE is called the "target UE".

7.2.4.2 5G ProSe Direct Link Identifier Update Procedure Initiation by Initiating UE The initiating UE shall initiate the procedure if:
 a) the initiating UE receives a request from upper layers to change the application layer ID and there is an existing 5G ProSe direct link associated with this application layer ID; or
 b) the privacy timer (see clause 5.2.4 and clause 5.2.5) of the initiating UE's layer-2 ID expires for an existing 5G ProSe direct link.

The initiating UE shall meet the following pre-conditions before initiating this procedure:
 a) the timer T5091 is not running; and
 b) the initiating UE is not performing the 5G ProSe direct link re-keying procedure initiated by the target UE.

If the 5G ProSe direct link identifier update procedure is triggered by a change of the initiating UE's application layer ID, the initiating UE shall create a PROSE DIRECT LINK IDENTIFIER UPDATE REQUEST message. In this message, the initiating UE:
 a) shall include the initiating UE's new application layer ID received from upper layer;
 b) shall include the initiating UE's new layer-2 ID assigned by itself;
 c) shall include the new MSB of $K_{NRP\text{-}sess}$ ID;
 d) shall include the initiating UE's new IP address/prefix, if IP communication is used, IP address/prefix of the initiating UE needs to be changed and is allocated by the initiating UE, the 5G ProSe direct link is not for 5G ProSe direct communication between 5G ProSe layer-2 remote UE and 5G ProSe layer-2 UE-to-network relay UE, and the target UE is not a 5G ProSe layer-3 UE-to-UE relay UE;
 e) shall include the initiating UE's new IP address/prefix, if IP communication is used, IP address/prefix of the initiating UE needs to be changed and is allocated by the initiating UE, and the target UE is a 5G ProSe layer-3 UE-to-UE relay UE;
 f) shall include the IP address/prefix needed indication if IP communication is used, the target UE is a 5G ProSe layer-3 UE-to-UE relay UE, and IP address/prefix of the initiating UE needs to be changed and is allocated by the 5G ProSe UE-to-UE relay UE; and
 g) shall include the list of target end UE IP address(es)/ prefix(es), or the list of target end UE user info, or both, if IP communication is used, the initiating UE's IP address/prefix needs to be changed, and the target UE is a 5G ProSe layer-3 UE-to-UE relay UE.

If the 5G ProSe direct link identifier update procedure is triggered by the expiry of the initiating UE's privacy timer T5090 as specified in clause 5.2.4 and clause 5.2.5, the initiating UE shall create a PROSE DIRECT LINK IDENTIFIER UPDATE REQUEST message. In this message, the initiating UE:

a) shall include the initiating UE's new layer-2 ID assigned by itself;
b) shall include the new MSB of $K_{NRP\text{-}sess}$ ID;
c) may include the initiating UE's new application layer ID if received from upper layer;
d) shall include the initiating UE's new IP address/prefix, if IP communication is used, IP address/prefix of the initiating UE needs to be changed and is allocated by the initiating UE, the 5G ProSe direct link is not for 5G ProSe direct communication between 5G ProSe layer-2 remote UE and 5G ProSe layer-2 UE-to-network relay UE, and the target UE is not a 5G ProSe layer-3 UE-to-UE relay UE;
e) shall include the initiating UE's new IP address/prefix if IP communication is used, IP address/prefix of the initiating UE needs to be changed and is allocated by the initiating UE, and the target UE is a 5G ProSe layer-3 UE-to-UE relay UE;
f) shall include the IP address/prefix needed indication if IP communication is used, the target UE is a 5G ProSe layer-3 UE-to-UE relay UE, and IP address/prefix of the initiating UE needs to be changed and is allocated by the 5G ProSe layer-3 UE-to-UE relay UE; and
g) shall include the list of target end UE IP address(es)/prefix(es), or the list of target end UE user info, or both, if IP communication is used, IP address/prefix of the initiating UE needs to be changed and the target UE is a 5G ProSe layer-3 UE-to-UE relay UE.

After the PROSE DIRECT LINK IDENTIFIER UPDATE REQUEST message is generated, the initiating UE shall pass this message to the lower layers for transmission along with the initiating UE's old layer-2 ID for 5G ProSe direct communication and the target UE's layer-2 ID for 5G ProSe direct communication and start timer T5082. The UE shall not send a new PROSE DIRECT LINK IDENTIFIER UPDATE REQUEST message to the same target UE while timer T5082 is running.

Figure 19:
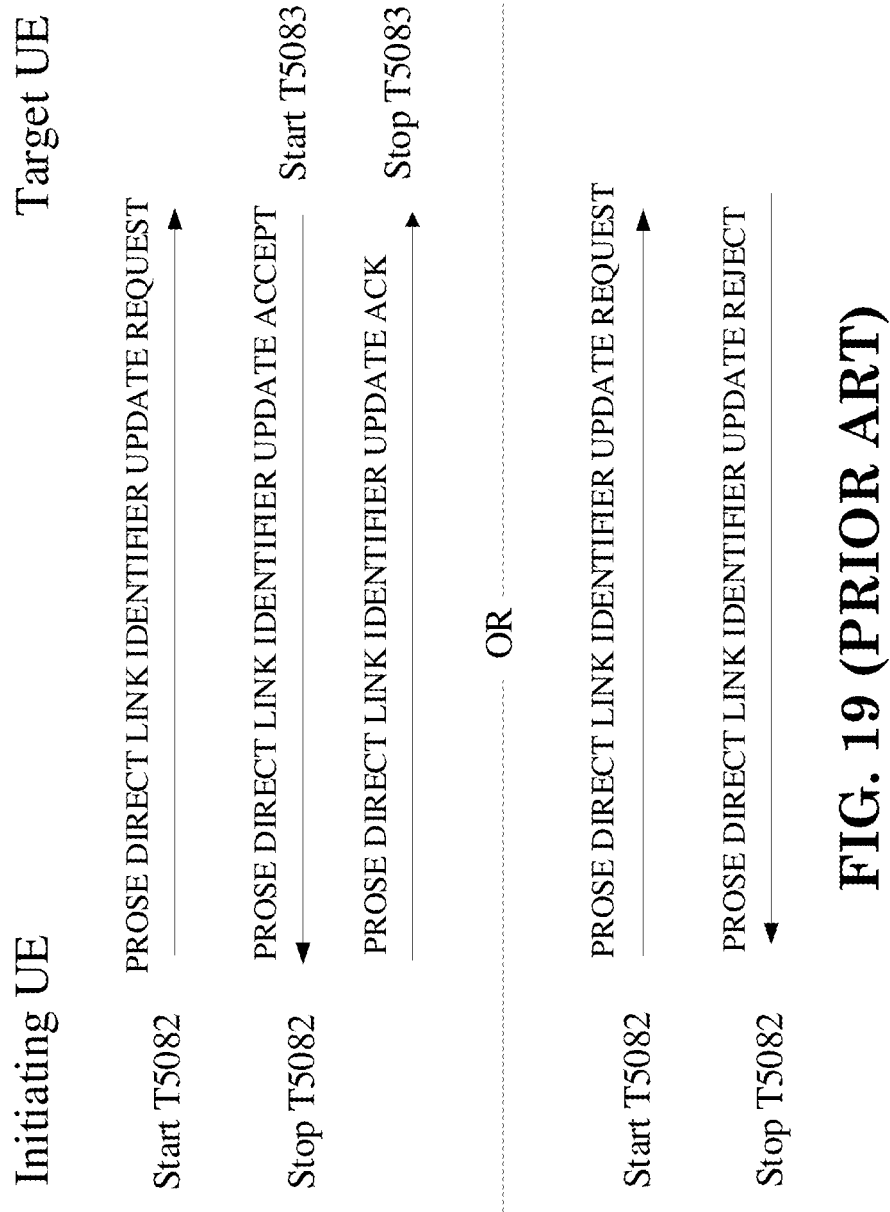
FIG. 19 is a reproduction of Figure 7.2.4.2.1 of 3GPP TS 24.554 V18.4.0.

Figure 7.2.4.2.1 of 3GPP TS 24.554 V18.4.0, Entitled "5G ProSe Direct Link Identifier Update Procedure", is Reproduced as FIG. 19

7.2.4.3 5G ProSe direct link identifier update procedure accepted by the target UE Upon receipt of a PROSE DIRECT LINK IDENTIFIER UPDATE REQUEST message, if the target UE determines:

a) the 5G ProSe direct link associated with this request message is still valid; and
b) the timer T5083 for the 5G ProSe direct link identified by this request message is not running, then the target UE accepts this request and responds with a PROSE DIRECT LINK IDENTIFIER UPDATE ACCEPT message.

If the target UE is a 5G ProSe layer-3 UE-to-UE relay UE and IP address/prefix needed indication is received in the PROSE DIRECT LINK IDENTIFIER UPDATE REQUEST message from the initiating UE, the target UE assigns a new IP address/prefix to the initiating UE.

If the target UE is a 5G ProSe layer-3 UE-to-UE relay UE, the 5G ProSe layer-3 UE-to-UE relay UE shall initiate the 5G ProSe UE to UE relay update procedure as specified in clause 7.2.13.

The target UE shall create the PROSE DIRECT LINK IDENTIFIER UPDATE ACCEPT message. In this message, the target UE:

a) shall include the target UE's new layer-2 ID assigned by itself;
b) shall include the new LSB of $K_{NRP\text{-}sess}$ ID;
c) shall include the initiating UE's new MSB of $K_{NRP\text{-}sess}$ ID;
d) shall include the initiating UE's new layer-2 ID;
e) shall include the target UE's new application layer ID if received from upper layer if the target UE is not a 5G ProSe layer-3 UE-to-UE relay UE;
f) shall include the initiating UE's new IP address/prefix if received from the initiating UE and IP communication is used or if IP address/prefix needed indication is received from the initiating UE and IP communication is used;
g) shall include the initiating UE's new application layer ID if received from the initiating UE; and
h) shall include the target UE's new IP address/prefix if IP communication is used, the target UE's IP address/prefix needs to be changed, and the 5G ProSe direct link is not for 5G ProSe direct communication between 5G ProSe layer-2 remote UE and 5G ProSe layer-2 UE-to-network relay UE.

After the PROSE DIRECT LINK IDENTIFIER UPDATE ACCEPT message is generated, the target UE shall pass this message to the lower layers for transmission along with the initiating UE's old layer-2 ID for 5G ProSe direct communication and the target UE's old layer-2 ID for 5G ProSe direct communication and start timer T5083. The UE shall not send a new PROSE DIRECT LINK IDENTIFIER UPDATE ACCEPT message to the same initiating UE while timer T5083 is running. Before target UE receives the traffic using the new layer-2 IDs, the target UE shall continue to receive the traffic with the old layer-2 IDs (i.e., initiating UE's old layer-2 ID and target UE's old layer-2 ID) from initiating UE.

Before target UE receives the PROSE DIRECT LINK IDENTIFIER UPDATE ACK message from initiating UE, the target UE shall keep sending traffic to the initiating UE using the old layer-2 IDs (i.e., initiating UE's old layer-2 ID for 5G ProSe direct communication and target UE's old layer-2 ID for 5G ProSe direct communication).

7.2.4.4 5G ProSe Direct Link Identifier Update Procedure Acknowledged by the Initiating UE Upon receipt of the PROSE DIRECT LINK IDENTIFIER UPDATE ACCEPT message, the initiating UE shall save its new IP address/prefix if received on the PROSE DIRECT LINK IDENTIFIER UPDATE ACCEPT message, shall stop timer T5082 and respond with a PROSE DIRECT LINK IDENTIFIER UPDATE ACK message. In this message, the initiating UE:

a) shall include the target UE's new layer-2 ID;
b) shall include the target UE's new LSB of $K_{NRP\text{-}sess}$ ID;
c) shall include the target UE's new application layer ID, if received;
d) shall include the target UE's new IP address/prefix, if received; and
e) shall include the initiating UE's new IP address/prefix, if received on the PROSE DIRECT LINK IDENTIFIER UPDATE ACCEPT message.

After the PROSE DIRECT LINK IDENTIFIER UPDATE ACK message is generated, the initiating UE shall pass this message to the lower layers for transmission along with the initiating UE's old layer-2 ID for 5G ProSe direct communication and the target UE's old layer-2 ID for 5G ProSe direct communication and shall stop timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5.

Upon sending the PROSE DIRECT LINK IDENTIFIER UPDATE ACK message, the initiating UE shall update the associated 5G ProSe direct link context with the new identifiers and pass the new layer-2 IDs (i.e., initiating UE's new layer-2 ID for 5G ProSe direct communication and target UE's new layer-2 ID for 5G ProSe direct communication) along with the PC5 link identifier down to the lower layer. Then the initiating UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data. The initiating UE shall continue to receive traffic with the old layer-2 IDs (i.e., initiating UE's old layer-2 ID for 5G ProSe direct communication and target UE's old layer-2 ID for 5G ProSe direct communication) from the target UE until it receives traffic with the new layer-2 IDs (i.e., initiating UE's new layer-2 ID and target UE's new layer-2 ID) from the target UE.

7.2.4.5 5G ProSe Direct Link Identifier Update Procedure Completion by the Target UE Upon receipt of the PROSE DIRECT LINK IDENTIFIER UPDATE ACK message, the target UE shall update the associated 5G ProSe direct link context with the new identifiers, pass the new layer-2 IDs (i.e., initiating UE's new layer-2 ID and target UE's new layer-2 ID) down to the lower layer, stop timer T5083 and timer T5090 if running and start a timer T5090 as configured if at least one of ProSe identifiers for the 5G ProSe direct link satisfying the privacy requirements as specified in clause 5.2.4 or if satisfying the privacy requirements as specified in clause 5.2.5. Then the target UE shall use the new layer-2 IDs (i.e., initiating UE's new layer-2 ID for 5G ProSe direct communication and target UE's new layer-2 ID for 5G ProSe direct communication) to transmit the PC5 signalling message and PC5 user plane data.

7.2.4.6 5G ProSe Direct Link Identifier Update Procedure not Accepted by the Target UE If the PROSE DIRECT LINK IDENTIFIER UPDATE REQUEST message cannot be accepted, the target UE shall send a PROSE DIRECT LINK IDENTIFIER UPDATE REJECT message. The PROSE DIRECT LINK IDENTIFIER UPDATE REJECT message contains a PC5 signalling protocol cause IE set to one of the following cause values:
3 conflict of layer-2 ID for 5G ProSe direct communication is detected;
16 unknown target UE's IP address/prefix or target UE's Application layer ID; or
111 protocol error, unspecified.

For a received PROSE DIRECT LINK IDENTIFIER UPDATE REQUEST message from a layer-2 ID (for 5G ProSe direct communication), if the target UE already has an existing link using this layer-2 ID or is currently processing a PROSE DIRECT LINK IDENTIFIER UPDATE REQUEST message from the same layer-2 ID, but with user info different from the user info IE included in this new incoming message, the target UE shall send a PROSE DIRECT LINK IDENTIFIER UPDATE REJECT message with PC5 signalling protocol cause value #3 "conflict of layer-2 ID for 5G ProSe direct communication is detected".

NOTE: After receiving the PROSE DIRECT LINK IDENTIFIER UPDATE REJECT message, whether the initiating UE initiates the 5G ProSe direct link release procedure or initiates another 5G ProSe direct link identifier update procedure with a new layer-2 ID depends on UE implementation.

For a received PROSE DIRECT LINK IDENTIFIER UPDATE REQUEST message from a source 5G ProSe end UE, if the target UE is a 5G ProSe layer-3 UE-to-UE relay UE and receives the PC5 signalling protocol cause value #17 "unknown initiating end UE's IP address/prefix or initiating UE's Application layer ID" from the target 5G ProSe end UE in the PROSE UE TO UE RELAY UPDATE REJECT message as specified in clause 7.2.13.5, the target UE sends a PROSE DIRECT LINK IDENTIFIER UPDATE REJECT message with PC5 signalling protocol cause value #16 "unknown target UE's IP address/prefix or target UE's Application layer ID".

For other reasons causing the failure of link identifier update, the target UE shall send a PROSE DIRECT LINK IDENTIFIER UPDATE REJECT message with PC5 signalling protocol cause value #111 "protocol error, unspecified".

Upon receipt of the PROSE DIRECT LINK IDENTIFIER UPDATE REJECT message, the initiating UE shall stop timer T5082 and abort this 5G ProSe direct link identifier update procedure.

7.2.4.7 Abnormal Cases 7.2.4.7.1 Abnormal Cases at the Initiating UE

The following abnormal cases can be identified:
a) If timer T5082 expires, the initiating UE shall retransmit the PROSE DIRECT LINK IDENTIFIER UPDATE REQUEST message and restart timer T5082. After reaching the maximum number of allowed retransmissions, the initiating UE shall abort the 5G ProSe direct link identifier update procedure and may notify the upper layer that the target UE is unreachable.
NOTE 1: The maximum number of allowed retransmissions is UE implementation specific.
NOTE 2: After reaching the maximum number of allowed retransmissions, whether the initiating UE releases this 5G ProSe direct link depends on its implementation.
b) For the same 5G ProSe direct link, if the initiating UE receives a PROSE DIRECT LINK IDENTIFIER UPDATE REQUEST message during the 5G ProSe direct link identifier update procedure, the initiating UE shall stop the timer T5082 and abort the 5G ProSe direct link identifier update procedure. Following handling is implementation dependent, e.g., the initiating UE waits for an implementation dependent time for initiating a new 5G ProSe direct link identifier update procedure, if still needed.
NOTE 3: The implementation dependent timer value needs to be set to avoid further collisions (e.g., random timer value).
c) For the same 5G ProSe direct link, if the initiating UE receives a PROSE DIRECT LINK REKEYING REQUEST message after initiating the 5G ProSe direct link identifier update procedure, the initiating UE shall ignore the PROSE DIRECT LINK REKEYING REQUEST message and proceed with the 5G ProSe direct link identifier update procedure.
d) For the same 5G ProSe direct link, if the initiating UE receives a PROSE DIRECT LINK RELEASE REQUEST message after the initiation of 5G ProSe direct link identifier update procedure, the initiating UE shall stop the timer T5082 and abort the 5G ProSe direct link identifier update procedure and proceed with the 5G ProSe direct link release procedure.

e) After sending the PROSE DIRECT LINK IDENTIFIER UPDATE ACK message to the target UE, if another PROSE DIRECT LINK IDENTIFIER UPDATE ACCEPT message from the target UE is received before the traffic from the target UE with the new layer-2 IDs is received, the initiating UE shall retransmit the PROSE DIRECT LINK IDENTIFIER UPDATE ACK message along with the initiating UE's old layer-2 ID and the target UE's old layer-2 ID.

NOTE 4: It is up to implementation to handle the failure of traffic delivery for new layer-2 IDs if such traffic has been sent before the initiating UE retransmits the PROSE DIRECT LINK IDENTIFIER UPDATE ACK message.

f) After sending the PROSE DIRECT LINK IDENTIFIER UPDATE ACK message to the target UE, if the initiating UE keeps receiving traffic from the target UE with the old layer-2 IDs and traffic from the target UE with the new layer-2 IDs is not received during an implementation specific time which is greater than the value of timer T5083, the initiating UE shall abort the 5G ProSe direct link identifier update procedure and may release the 5G ProSe direct link.

7.2.4.7.2 Abnormal Cases at the Target UE

The following abnormal cases can be identified:

a) If timer T5083 expires, the target UE shall retransmit the PROSE DIRECT LINK IDENTIFIER UPDATE ACCEPT message and restart timer T5083. After reaching the maximum number of allowed retransmissions, the target UE shall abort the 5G ProSe direct link identifier update procedure and may notify the upper layer that the initiating UE is unreachable.

NOTE 1: The maximum number of allowed retransmissions is UE implementation specific.

NOTE 2: After reaching the maximum number of allowed retransmissions, whether the target UE releases this 5G ProSe direct link depends on its implementation.

b) If PROSE DIRECT LINK IDENTIFIER UPDATE REQUEST is received when the timer T5083 is running, the target UE shall stop the timer T5083 and abort the ongoing 5G ProSe direct link identifier update procedure. The target UE shall handle the new PROSE DIRECT LINK IDENTIFIER UPDATE REQUEST as specified in clause 7.2.4.3.

c) For the same 5G ProSe direct link, if the target UE receives a PROSE DIRECT LINK RELEASE REQUEST message during the 5G ProSe direct link identifier update procedure, the target UE shall stop the timer T5083, abort the 5G ProSe direct link identifier update procedure and proceed with the 5G ProSe direct link release procedure.

[ . . . ]

7.2.13 5G ProSe UE-to-UE Relay Update Procedure 7.2.13.1 General

The 5G ProSe UE-to-UE relay update procedure is used to update the target 5G ProSe end UE(s) with the source 5G ProSe end UE's new IP address/prefix, or new application layer ID, or both during a 5G ProSe direct link identifier update procedure between the source 5G ProSe end UE and the 5G ProSe layer-3 UE-to-UE relay UE. The 5G ProSe layer-3 UE-to-UE relay UE initiates the 5G ProSe UE-to-UE relay update procedure with each target end UE as indicated by the source 5G ProSe end UE during the 5G ProSe direct link identifier update procedure. The 5G ProSe layer-3 UE-to-UE relay UE is called the initiating UE in this procedure and the target 5G ProSe end UE is called target UE.

7.2.13.2 5G ProSe UE-to-UE Relay Update Procedure Initiation by Initiating UE

The initiating UE shall initiate the 5G ProSe UE-to-UE relay update procedure with the target UE, if the initiating UE receives a PROSE DIRECT LINK IDENTIFIER UPDATE REQUEST message from the source 5G ProSe end UE as part of 5G ProSe direct link identifier update procedure. The initiating UE retrieves the target UEs' entry from its local table based on the target 5G ProSe end UE(s) user info received in the PROSE DIRECT LINK IDENTIFIER UPDATE REQUEST message. The initiating UE initiates the 5G ProSe relay update procedure with each 5G ProSe target end UE.

In order to initiate the 5G ProSe UE-to-UE relay update procedure, the initiating UE shall create a PROSE UE TO UE RELAY UPDATE REQUEST message. In this message, the initiating UE:

a) shall include the initiating UE's new layer-2 ID assigned by itself;

b) shall include the new MSB of $K_{NRP\text{-}sess}$ ID;

c) shall include the source 5G ProSe end UE's old IP address/prefix, if the source 5G ProSe end UE's IP address/prefix has changed or is to be changed (i.e. allocated by the initiating UE);

d) shall include the source 5G ProSe end UE's old application layer ID, if the source 5G ProSe end UE's application layer ID has changed;

e) shall include the source 5G ProSe end UE's new application layer ID, if the new application layer ID of the source 5G ProSe end UE is received in the PROSE DIRECT LINK IDENTIFIER UPDATE REQUEST message; and f) shall include the source 5G ProSe end UE's new IP address/prefix, if the new IP address/prefix of the source 5G ProSe end UE is received in the PROSE DIRECT LINK IDENTIFIER UPDATE REQUEST message, or if the IP address/prefix needed indication is received in the PROSE DIRECT LINK IDENTIFIER UPDATE REQUEST message and new IP address/prefix of the source 5G ProSe end UE is allocated by the initiating UE.

The initiating UE shall pass this message to the lower layers for transmission along with the initiating UE's old layer-2 ID for 5G ProSe direct communication and the target UE's layer-2 ID for 5G ProSe direct communication and start timer T5097. The initiating UE shall not send a new PROSE UE TO UE RELAY UPDATE REQUEST message to the same target UE while timer T5097 is running.

Figure 20:
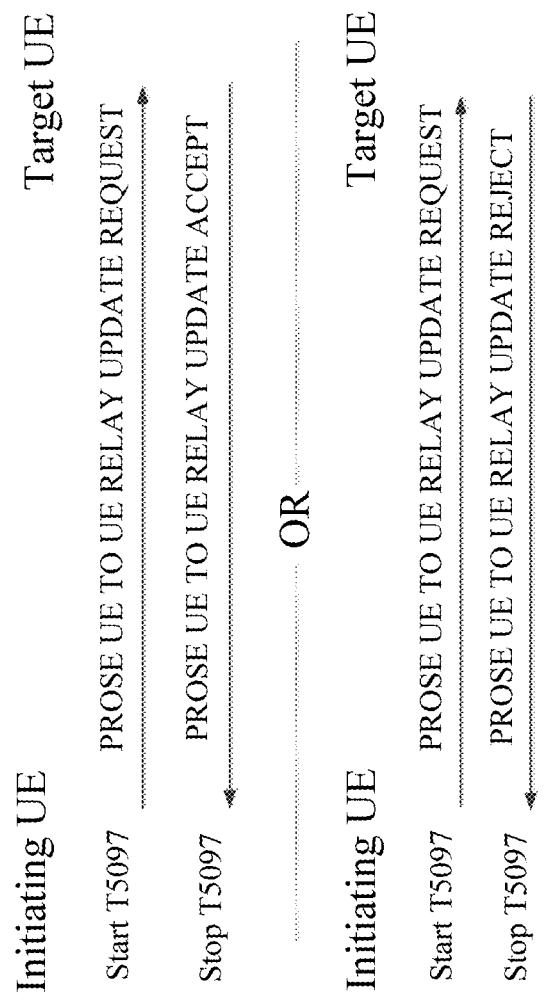
FIG. 20 is a reproduction of Figure 7.2.13.2.1 of 3GPP TS 24.554 V18.4.0.

Figure 7.2.13.2.1 of 3GPP TS 24.554 V18.4.0, Entitled "5G ProSe Direct Relay Update Procedure", is Reproduced as FIG. 20

7.2.13.3 5G ProSe UE-to-UE Relay Update Procedure Accepted by the Target UE

Upon receipt of a PROSE UE TO UE RELAY UPDATE REQUEST message, if the target UE determines the 5G ProSe direct link associated with this request message is still valid, then the target UE accepts this request.

If the target UE determines that the PROSE UE TO UE RELAY UPDATE REQUEST message can be accepted, the target UE shall replace the original source 5G ProSe end UE's IP address/prefix with the new source 5G ProSe end UE's IP address/prefix for unicast communication if received in the message. The target UE shall replace the original source 5G ProSe end UE's Application ID with the new source 5G ProSe end UE's Application ID for unicast communication if received in the PROSE UE TO UE RELAY UPDATE REQUEST message. The target UE shall create a PROSE UE TO UE RELAY UPDATE ACCEPT message. In this message, the target UE:
  a) shall include the target UE's new layer-2 ID assigned by itself;
  b) shall include the new LSB of $K_{NRP\text{-}sess}$ ID;
  c) shall include the initiating UE's new MSB of $K_{NRP\text{-}sess}$ ID;
  d) shall include the initiating UE's new layer-2 ID;
  e) shall include the source 5G ProSe end UE's old IP address/prefix, if received from the initiating UE;
  f) shall include the source 5G ProSe end UE's old application layer ID, if received from the initiating UE;
  g) shall include the source 5G ProSe end UE's new application layer ID, if received from the initiating UE; and
  h) shall include the source 5G ProSe end UE's new IP address/prefix, if received from the initiating UE.

After the PROSE UE TO UE RELAY UPDATE ACCEPT message is generated, the target UE shall pass this message to the lower layers for transmission along with the target UE's old layer-2 ID for 5G ProSe direct communication and the initiating UE's old layer-2 ID for 5G ProSe direct communication.

Before the target UE receives the traffic using the new layer-2 IDs, the target UE shall continue to receive the traffic with the old layer-2 IDs (i.e., initiating UE's old layer-2 ID and target UE's old layer-2 ID) from the initiating UE.

Before the target UE receives the traffic using the new IP address/prefixs, the target UE shall continue to receive the traffic with the old IP address/prefixs (i.e., source 5G ProSe end UE's old IP address/prefix and target 5G ProSe end UE's old IP address/prefix) from the source 5G ProSe end UE.

7.2.13.4 5G ProSe UE-to-UE Relay Update Procedure Completion by the Initiating UE Upon receiving a PROSE UE TO UE RELAY UPDATE ACCEPT message, if the initiating UE determines that the PROSE UE TO UE RELAY UPDATE ACCEPT message can be accepted, the initiating UE shall stop timer T5097.

If more than one target 5G ProSe end UE is included on the received PROSE UE TO UE RELAY UPDATE REQUEST message, the initiating UE may wait for the responses from all target UEs before stopping timer T5097.

7.2.13.5 5G ProSe UE-to-UE Relay Update Procedure not Accepted by the Target UE

If the PROSE UE TO UE RELAY UPDATE REQUEST message cannot be accepted, the target UE shall create a PROSE UE TO UE RELAY UPDATE REJECT message. In this message, the target UE shall include a PC5 signalling protocol cause IE indicating one of the following cause values:
  #17: unknown initiating end UE's IP address/prefix or initiating UE's Application layer ID;

After the PROSE UE TO UE RELAY UPDATE REJECT message is generated, the target UE shall pass this message to the lower layers for transmission along with initiating UE's layer-2 ID for unicast communication and the target UE's layer-2 ID for unicast communication.

Upon receipt of the PROSE UE TO UE RELAY UPDATE REJECT message, the initiating UE shall stop timer T5097 and shall continue the ongoing procedure that triggered the initiation of the 5G ProSe UE-to-UE relay update procedure indicating the failing target UE(s) to the source 5G ProSe end UE as specified in clause 7.2.4.6.

7.2.13.6 Abnormal Cases 7.2.13.6.1 Abnormal Cases at the Initiating UE
  a) Timer T5097 expires.
    The initiating UE shall retransmit the PROSE UE TO UE RELAY UPDATE REQUEST message and restart timer T5097. After reaching the maximum number of allowed retransmissions, the initiating UE shall abort the 5G ProSe UE-to-UE relay update procedure and shall continue the ongoing procedure that triggered the initiation of the 5G ProSe UE-to-UE relay update procedure indicating the failing target end UE(s) to the source 5G ProSe end UE as specified in clause 7.2.4.6.
  NOTE 1: The maximum number of allowed retransmissions is UE implementation specific.

[ . . . ]

10.3.18 ProSe Direct Link Identifier Update Request 10.3.18.1 Message Definition This message is sent by a UE to another peer UE to initiate the direct link identifier update procedure. See table 10.3.18.1.1.
  Message type: PROSE DIRECT LINK IDENTIFIER UPDATE REQUEST
  Significance: dual
  Direction: UE to peer UE Table 10.3.18.1.1 of 3GPP TS 24.554 V18.4.0, Entitled "PROSE DIRECT LINK IDENTIFIER UPDATE REQUEST Message Content", is Reproduced as FIG. 21

10.3.18.2 Source User Info
This IE is included when the UE receives a new application layer ID.

10.3.18.3 Source Link Local IPv6 Address
This IE is included when the link local IPV6 address changes at the UE and the 5G ProSe direct link is not for 5G ProSe direct communication between 5G ProSe layer-2 remote UE and 5G ProSe layer-2 UE-to-network relay UE.

10.3.18.4 IP Address/Prefix Needed Indication
This IE is included when the initiating UE acting as a 5G ProSe layer-3 end UE needs a new IP address/prefix to be allocated by the 5G ProSe layer-3 UE-to-UE relay UE.

10.3.18.5 Void 10.3.18.6 List of Target End UE User Info
This IE is included when the UE acting as a 5G ProSe layer-3 end UE changes its IP address/prefix and its peer UE(s) (i.e. target 5G ProSe End UE(s)) need to be informed of this new IP address/prefix.

10.3.18.7 List of Target IP Addresses
This IE is included when the UE acting as a 5G ProSe layer-3 end UE changes its IP address/prefix and its peer UE(s) (i.e. target 5G ProSe End UE(s)) need to be informed of this new IP address/prefix.

10.3.18.8 Source End UE IP Address
This IE is included when the UE acting as a 5G ProSe layer-3 end UE changes its IP address/prefix.

[ . . . ]

10.3.21 ProSe Direct Link Identifier Update Reject 10.3.21.1 Message Definition

This message is sent by the target UE to initiating UE to indicate that the link identifier update request is not accepted. See table 10.3.21.1.1.
  Message type: PROSE DIRECT LINK IDENTIFIER UPDATE REJECT
  Significance: dual
  Direction: UE to peer UE Table 10.3.21.1.1 of 3GPP TS 24.554 V18.4.0, Entitled "PROSE DIRECT LINK IDENTIFIER UPDATE REJECT Message Content", is Reproduced as FIG. 22

[ . . . ]

10.3.28 ProSe UE to UE Relay Update Request
10.3.28.1 Message Definition
This message is sent by a 5G ProSe layer-3 UE-to-UE relay UE which is handling communication between a source end UE and a target end UE to initiate the relay update procedure. See table 10.3.28.1.1.
  Message type: PROSE UE TO UE RELAY UPDATE REQUEST
  Significance: dual
  Direction: UE to peer UE Table 10.3.28.1.1 of 3GPP TS 24.554 V18.4.0, Entitled "PROSE UE TO UE RELAY UPDATE REQUEST Message Content", is Reproduced as FIG. 23

10.3.28.2 Old Source End UE IP Address
This IE shall be included if IP communication is used and the IP address changes at the source end UE.
10.3.28.3 New Source End UE IP Address
This IE shall be included if IP communication is used and the IP address changes at the source end UE.
10.3.28.4 Old Source End UE User Info
This IE shall be included if the source end UE application layer ID changes.
10.3.28.5 New Source End UE User Info
This IE shall be included if the source end UE application layer ID changes.
10.3.28.6 Old Source End UE User Info
This IE is included when the 5G ProSe layer-3 UE-to-UE relay UE receives the Source user info IE in the PROSE DIRECT LINK IDENTIFIER UPDATE REQUEST message. This IE contains the initiating UE's user info associated to the direct link with the 5G ProSe layer-3 UE-to-UE relay UE.
10.3.28.7 New Source End UE User Info
This IE is included when the 5G ProSe layer-3 UE-to-UE relay UE receives the Source user info IE in the PROSE DIRECT LINK IDENTIFIER UPDATE REQUEST message. This IE contains the new initiating UE's user info specified in the Source user info IE in the PROSE DIRECT LINK IDENTIFIER UPDATE REQUEST message.
10.3.29 ProSe UE to UE Relay Update Accept
10.3.29.1 Message Definition
This message is sent by the target end UE to 5G ProSe layer-3 UE-to-UE relay UE to complete the relay update procedure. See table 10.3.29.1.1.
  Message type: PROSE UE TO UE RELAY UPDATE ACCEPT
  Significance: dual
  Direction: UE to peer UE Table 10.3.29.1.1 of 3GPP TS 24.554 V18.4.0, Entitled "PROSE UE TO UE RELAY UPDATE ACCEPT Message Content", is Reproduced as FIG. 24

10.3.29.2 Old Source End UE IP Address
This IE shall be included if the 5G ProSe target end UE receives the Old source end UE IP address IE in the PROSE UE TO UE RELAY UPDATE REQUEST message.
10.3.29.3 New Source End UE IP Address
This IE shall be included if the 5G ProSe target end UE receives the New source end UE IP address IE in the PROSE UE TO UE RELAY UPDATE REQUEST message.
10.3.29.4 Old Source End UE User Info
This IE shall be included if the 5G ProSe target end UE receives the Old Source end UE user info IE in the PROSE UE TO UE RELAY UPDATE REQUEST message.
10.3.29.5 New Source End UE User Info
This IE shall be included if the 5G ProSe target end UE receives the New source end UE user info IE in the PROSE UE TO UE RELAY UPDATE REQUEST message.
10.3.29.6 Old Source End UE User Info
This IE is included when the Target UE receives the Old Source user info IE in the PROSE UE TO UE RELAY UPDATE REQUEST message.
10.3.29.7 New Source End UE User Info
This IE is included when the Target UE receives the New Source user info IE in the PROSE UE TO UE RELAY UPDATE REQUEST message.

[ . . . ]

10.3.33 ProSe UE to UE Relay Update Reject
10.3.33.1 Message Definition
This message is sent by the target 5G ProSe end UE to 5G ProSe layer-3 UE-to-UE relay UE to reject the relay update procedure. See table 10.3.33.1.1.
  Message type: PROSE UE TO UE RELAY UPDATE REJECT
  Significance: dual
  Direction: UE to peer UE Table 10.3.33.1.1 of 3GPP TS 24.554 V18.4.0, Entitled "PROSE UE TO UE RELAY UPDATE REJECT Message Content", is Reproduced as FIG. 25

[ . . . ]

3GPP TS 23.304 describes support of UE-to-UE Relay. That is, a relay UE may be used to support communication between two (Layer-2 or Layer-3) ProSe End UEs in case these two UEs cannot communicate with each other directly. A UE-to-UE Relay UE establishes one PC5 link with each of the two ProSe End UEs containing a source ProSe end UE (e.g. on first PC5 hop) and a target ProSe end UE (e.g. on second PC5 hop) for forwarding traffic of the concerned ProSe service(s) between the two ProSe End UEs. If a source ProSe End UE would like to communicate with multiple target ProSe End UEs, the ($1^{st}$ hop) PC5 link between the source ProSe End UE and the ProSe UE-to-UE relay UE can be shared for multiple target ProSe End UEs while the ($2^{nd}$ hop) PC5 links may be established individually between the ProSe UE-to-UE relay UE and target ProSe End UEs.

For establishing the PC5 links, the layer-2 link establishment procedure not integrated discovery as specified in clause 6.7.1 in 3GPP TS 23.304 or the layer-2 link establishment procedure integrated discovery as specified in clause 6.7.3 in 3GPP TS 23.304 may be used (i.e. the former one may be used if the layer-2 link establishment procedure is initiated toward a relay UE or a source end UE has selected a specific relay UE, and the later one may be used if the layer-2 link establishment procedure is initiated toward any relay UE or the source end UE has not discovered any relay UE yet). For the shared PC5 link, the Layer-2 link modification procedure shall be used. According to 3GPP TS 23.304, a PC5 link may be associated with a relay service code and can support one or more services/applications identified by one or more ProSe identifiers.

According to clause 6.7.1.2 of 3GPP TS 23.304, the Link Identifier Update (LIU) procedure as defined in clause 6.4.3.2 of 3GPP TS 23.304 is reused between a source ProSe end UE and a ProSe UE-to-UE relay UE to perform a link identifier update and when the IP address/prefix needs to be changed, the LIU procedure is cooperated with a relay update procedure as depicted in Figure 6.7.1.2-1 (reproduced as FIG. 7) of 3GPP TS 23.304. The details on the LIU procedure are introduced in clause 7.2.4 of [2] and the details on the relay update procedure are introduced in clause 7.2.13 of [2].

The LIU procedure is used to update and exchange the new identifiers (e.g., application layer ID, layer-2 ID, security information and IP address/prefix) between two UEs for a 5G ProSe direct link before using the new identifiers. A source ProSe end UE may change the its user info. Normally, when user info is changed, the corresponding IP address/prefix should be also changed. The source ProSe end UE could initiate the LIU procedure toward a U2U relay UE by sending a PROSE DIRECT LINK IDENTIFIER UPDATE REQUEST message to the U2U relay UE. In the PROSE DIRECT LINK IDENTIFIER UPDATE REQUEST message, a list of target end UE user info and/or a list of target end UE IP address/prefix may be included. In response to reception of the PROSE DIRECT LINK IDENTIFIER UPDATE REQUEST message, the U2U relay UE may initiate the 5G ProSe UE-to-UE relay update procedure as specified in clause 7.2.13 of 3GPP TS 24.554. The U2U relay UE may individually initiate a relay update procedure toward each of those target ProSe end UEs as indicated in the list of target end UE user info for updating those target ProSe end UEs with the source ProSe end UE's new identifiers.

According to clause 7.2.13.3 of 3GPP TS 24.554, upon receipt of a PROSE UE TO UE RELAY UPDATE REQUEST message, the target UE (of a 5G ProSe UE-to-UE relay update procedure, as a role of target ProSe end UE) shall replace the source 5G ProSe end UE's original IP address/prefix with the source 5G ProSe end UE's new IP address/prefix, replace the source 5G ProSe end UE's original Application ID with the source 5G ProSe end UE's new Application ID, and then respond a PROSE UE TO UE RELAY UPDATE ACCEPT message to the initiating UE (of the same 5G ProSe UE-to-UE relay update procedure, as a role of UE-to-UE relay UE) if the target UE determines that the PROSE UE TO UE RELAY UPDATE REQUEST message can be accepted. The U2U relay UE may then continue the LIU procedure with the source ProSe end UE by sending a PROSE DIRECT LINK IDENTIFIER UPDATE ACCEPT message to the source ProSe end UE. If more than one target ProSe end UEs are involved, the initiating UE may wait for the responses from all target UEs (of 5G ProSe UE-to-UE relay update procedures) before continuing the LIU procedure with the source ProSe end UE.

In one embodiment, from someone target ProSe end UE perspective, a new IP address/prefix of the source ProSe end UE may be not acceptable to this target ProSe end UE due to e.g. collision with an IP address/prefix as known/used by other ProSe capable UE communicating with this target ProSe end UE. As specified in clause 7.2.13.5 of 3GPP TS 24.554, if the PROSE UE TO UE RELAY UPDATE REQUEST message cannot be accepted, the target UE shall respond a PROSE UE TO UE RELAY UPDATE REJECT message to the initiating UE. If the U2U relay UE receive the PROSE UE TO UE RELAY UPDATE REJECT message, the U2U relay UE shall continue the ongoing LIU procedure, which triggered the initiation of the relay update procedure, indicating the failing target UE(s) to the source ProSe end UE as specified in clause 7.2.4.6 of 3GPP TS 24.554. That is, the U2U relay UE may respond a PROSE DIRECT LINK IDENTIFIER UPDATE REJECT message to the source ProSe end UE if the U2U relay UE receives the PROSE UE TO UE RELAY UPDATE REJECT message from one or more target ProSe end UEs.

For example, a source end UE could send a $1^{st}$ hop DCR message (including user info e.g. source end UE ID1) to a relay UE. In response to reception of the $1^{st}$ hop DCR message, the relay UE may send a $2^{nd}$ hop DCR message (including the user info e.g. the source end UE ID1). Both the $1^{st}$ hop DCR message and the $2^{nd}$ hop DCR message may include a relay service code used for identifying a connectivity service. It is possible that more than one target 5G ProSe end UEs could receive the $2^{nd}$ hop DCR message from the relay UE and these target 5G ProSe end UEs may be interested in the connectivity service or they could match the relay service code. In this situation, each of these target 5G ProSe end UEs may continue the corresponding link establishment procedure with the relay UE to establish individual $2^{nd}$ hop PC5 link between the relay UE and each target 5G ProSe end UE.

For example, there are a first target end UE and a second target end UE and they receive the $2^{nd}$ hop DCR message from the relay UE. The first target end UE may then establish a first $2^{nd}$ hop PC5 link with the relay UE, and the second target end UE may then establish a second $2^{nd}$ hop PC5 link with the relay UE as well. The first target end UE could send a first $2^{nd}$ hop DCA message to the relay UE for completing establishment of the first $2^{nd}$ hop PC5 link. The second target end UE could send a second $2^{nd}$ hop DCA message to the relay UE for completing establishment of the second $2^{nd}$ hop PC5 link. After that, the relay UE may respond a $1^{st}$ hop Direct Communication Accept (DCA) message to the source end UE. In the UE-to-UE relay communication, the source end UE could use IP address/prefix (e.g. IP-S1) of the source end UE, IP address/prefix (e.g. IP-T1) of the first target end UE and IP address/prefix (e.g. IP-T2) of the second target end UE to communicate with the first/second target end UEs via the relay UE.

Figure 26:
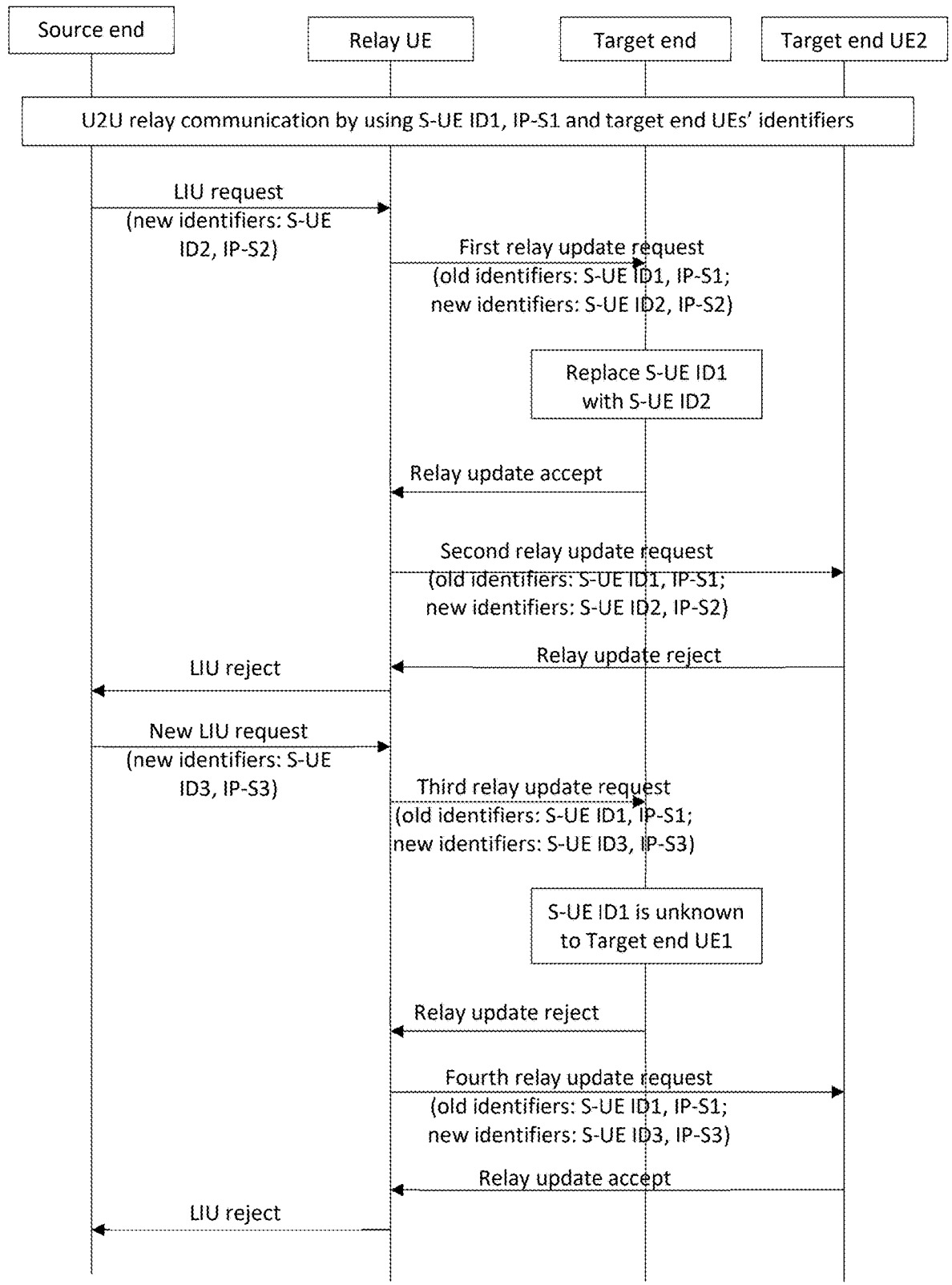
FIG. 26 is a message flow chart according to one exemplary embodiment.

Later, as illustrated in FIG. 26, the source end UE may send a LIU request message to the relay UE for updating its current user info (e.g. from the source end UE ID1 to a source end UE ID2). In response to reception of the LIU request message, the relay UE may then initiate a first relay update procedure with the first target end UE and a second relay update procedure with the second target end UE. The relay UE may send a first relay update request message of the first relay update procedure to the first target end UE. The first relay update request message may include the source end UE's identifiers including at least one of e.g. old/current/original user info (e.g. the source end UE ID1), old/current/original IP address/prefix (e.g. the IP-S1), new user info (e.g. the source end UE ID2), new IP address/prefix (e.g. IP-S2), etc. Similarly, the relay UE may send a second relay update request message of the second relay update procedure to the second target end UE. The second relay update request message may include the source end UE's identifiers including at least one of e.g. old/current/original user info (e.g. the source end UE ID1), old/current/original IP address/prefix (e.g. the IP-S1), new user info (e.g. the source end UE ID2), new IP address/prefix (e.g. IP-S2), etc.

For the first target end UE, it may accept the first relay update request message and send a first relay update accept message (corresponding to the first relay update request message) to the relay UE. Thus, the first target end UE may replace the source end UE's old/current/original user info and IP address/prefix with the source end UE's new user info and IP address/prefix. But, for the second target end UE, it may not accept the second relay update request message (due to e.g. IP address/prefix collision) and thus the second target end UE may send a relay update reject message (corresponding to the second relay update request message) to the relay UE. Thus, the relay UE may send a LIU reject message to the source end UE. Upon reception of the LIU reject message, it supposes that the source end UE may send a new LIU request message to the relay UE for updating its current user info (e.g. from the source end UE ID1 to a source end UE ID3).

In response to reception of the new LIU request message, the relay UE may then initiate a third relay update procedure with the first target end UE and a fourth relay update procedure with the second target end UE. The relay UE may send a third relay update request message of the third relay update procedure to the first target end UE. The third relay update request message may include the source end UE's identifiers including at least one of e.g. old/current/original user info (e.g. the source end UE ID1), old/current/original IP address/prefix (e.g. the IP-S1), new user info (e.g. the source end UE ID3), new IP address/prefix (e.g. IP-S3), etc. Similarly, the relay UE may send a fourth relay update request message of the fourth relay update procedure to the second target end UE.

The fourth relay update request message may include the source end UE's identifiers including at least one of e.g. old/current/original user info (e.g. the source end UE ID1), old/current/original IP address/prefix (e.g. the IP-S1), new user info (e.g. the source end UE ID3), new IP address/prefix (e.g. IP-S3), etc. For this time, it may become the first target end UE cannot accept the third relay update request message as it cannot recognize the source end UE based on the source end UE ID1 indicated in the third relay update request message, since the first target end UE has replaced the source end UE ID1 with the source end UE ID2 for the source end UE during the first relay update procedure. And then, the relay UE may still respond another LIU reject message (corresponding to the new LIU request message) to the source end UE. To this end, user info update on the source end UE cannot be realized because the first target end UE implemented with the procedural text in 3GPP TS 24.554 is not able to recognize the source end UE in the following relay update procedure anymore. The user info update failure would cause release or abortion of the U2U relay communication.

Figure 27:
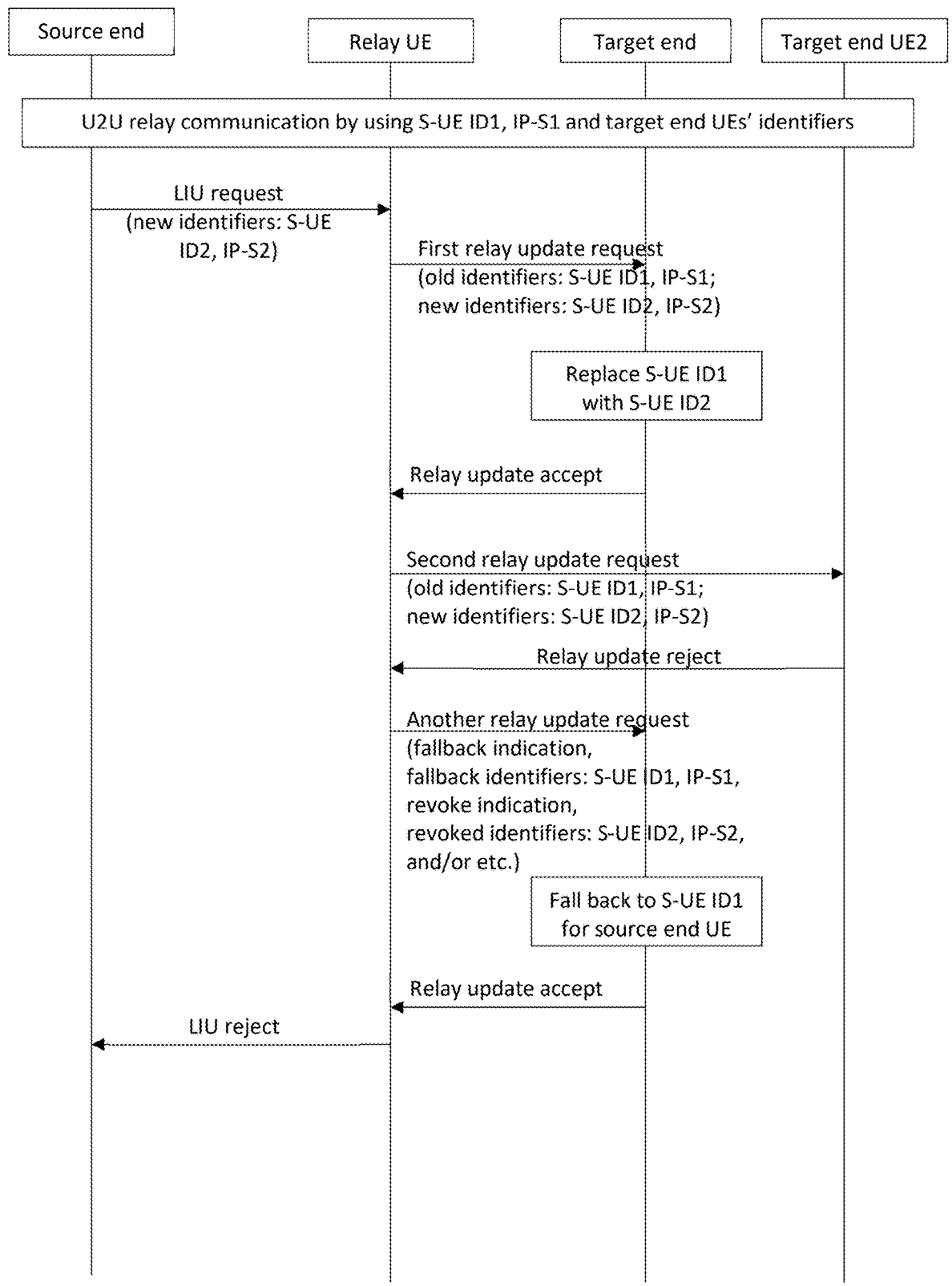
FIG. 27 is a message flow chart according to one exemplary embodiment.

To address the issue, the relay UE could initiate another relay update procedure with the first target end UE for fallback of the source end UE's identifiers (e.g. for the first target end UE to replace the source end UE ID2 with the source end UE ID1), if/when/after the relay UE is aware that the second relay update procedure is not accepted by the second target end UE. I.e. the relay UE could send another relay update request message to the first target end UE for fallback of the source end UE's original identifiers in response to reception of a relay update reject message corresponding to the second relay update request message from the second target end UE. The relay update request message for fallback of the source end UE's original identifiers may include the source end UE's identifiers including at least one of e.g. user info for fallback (e.g. the source end UE ID1), IP address/prefix for fallback (e.g. the IP-S1), user info for revoke (e.g. the source end UE ID2), IP address/prefix for revoke (e.g. IP-S2), etc. In one embodiment, the relay update request message for fallback of the source end UE's original identifiers may include fallback indication so that the first target end UE could understand to fall back the source end UE's user info to the source end UE ID1 and the source end UE's IP address/prefix to the IP-S1. In one embodiment, the relay update request message for fallback of the source end UE's original identifiers may include revoke indication so that the first target end UE could understand to revoke the source end UE ID2 and the IP-S2. The concept of this solution could be illustrated in FIG. 27.

On the other hand, if a new IP address/prefix of the source end UE is assigned by the relay UE, and if a relay update reject message from the second target end UE can include information indicating the second target end UE cannot accept the new IP address/prefix of the source end UE (e.g. the IP-S2), the relay UE could initiate another relay update procedure with the first target end UE. The relay UE could send another relay update request message to the first target end UE and this relay update request message could include at least one of e.g. the old/current/original user info (e.g. the source end UE ID1), the old/current/original IP address/prefix (e.g. the IP-S1), the new user info (e.g. the source end UE ID2), a second new IP address/prefix (e.g. IP-S3), etc. The relay UE could then initiate the other relay update procedure with the second target end UE. The relay UE could send the other relay update request message to the second target end UE and this relay update request message could include at least one of e.g. the old/current/original user info (e.g. the source end UE ID1), the old/current/original IP address/prefix (e.g. the IP-S1), the new user info (e.g. the source end UE ID2), the second new IP address/prefix (e.g. IP-S3), etc.

The concept of the above solution could be also applied for the case of a single source end UE communicating with a single target end UE via a single relay UE.

Figure 28:
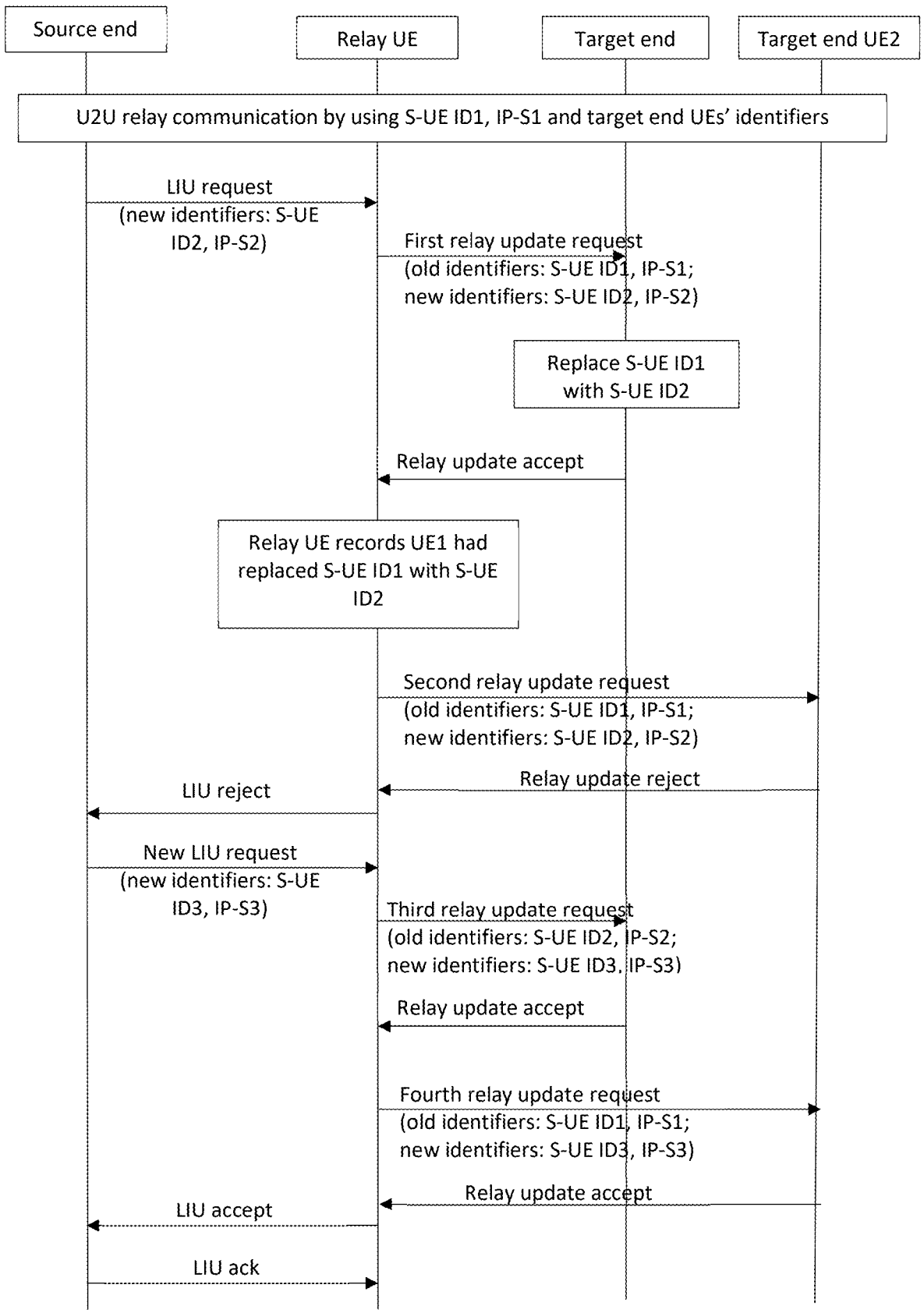
FIG. 28 is a message flow chart according to one exemplary embodiment.

Based on the first relay update accept message received from the first target end UE, the relay UE can know the first target end UE had replaced the source end UE's old/current/original user info with the source end UE's new user info. Thus, when the relay UE sends the third relay update request message to the first target end UE in response to reception of the new LIU request message from the source end UE, it would be also feasible for the relay UE to modify the source end UE's old/current/original user info by changing the source end UE ID1 to the source end UE ID2 in the third relay update request message so that the first target end UE can recognize the source end UE based on the applied source end UE ID2. The relay UE could also modify the source end UE's old/current/original IP address/prefix by changing the IP-S1 to the IP-S2 in the third relay update request message. On the other hand, the relay UE may know the second target end UE could not apply with the source end UE's new user info based on the relay update reject message received from the second target end UE. Thus, when the relay UE sends the fourth relay update request message to the second target end UE in response to reception of the new LIU request message from the source end UE, the relay UE may not modify the source end UE's old/current/original user info in the fourth relay update request message. Also, the relay UE may not modify the source end UE's old/current/original IP address/prefix in the fourth relay update request message. The concept of this alternative could be illustrated in FIG. 28.

Figure 30A:
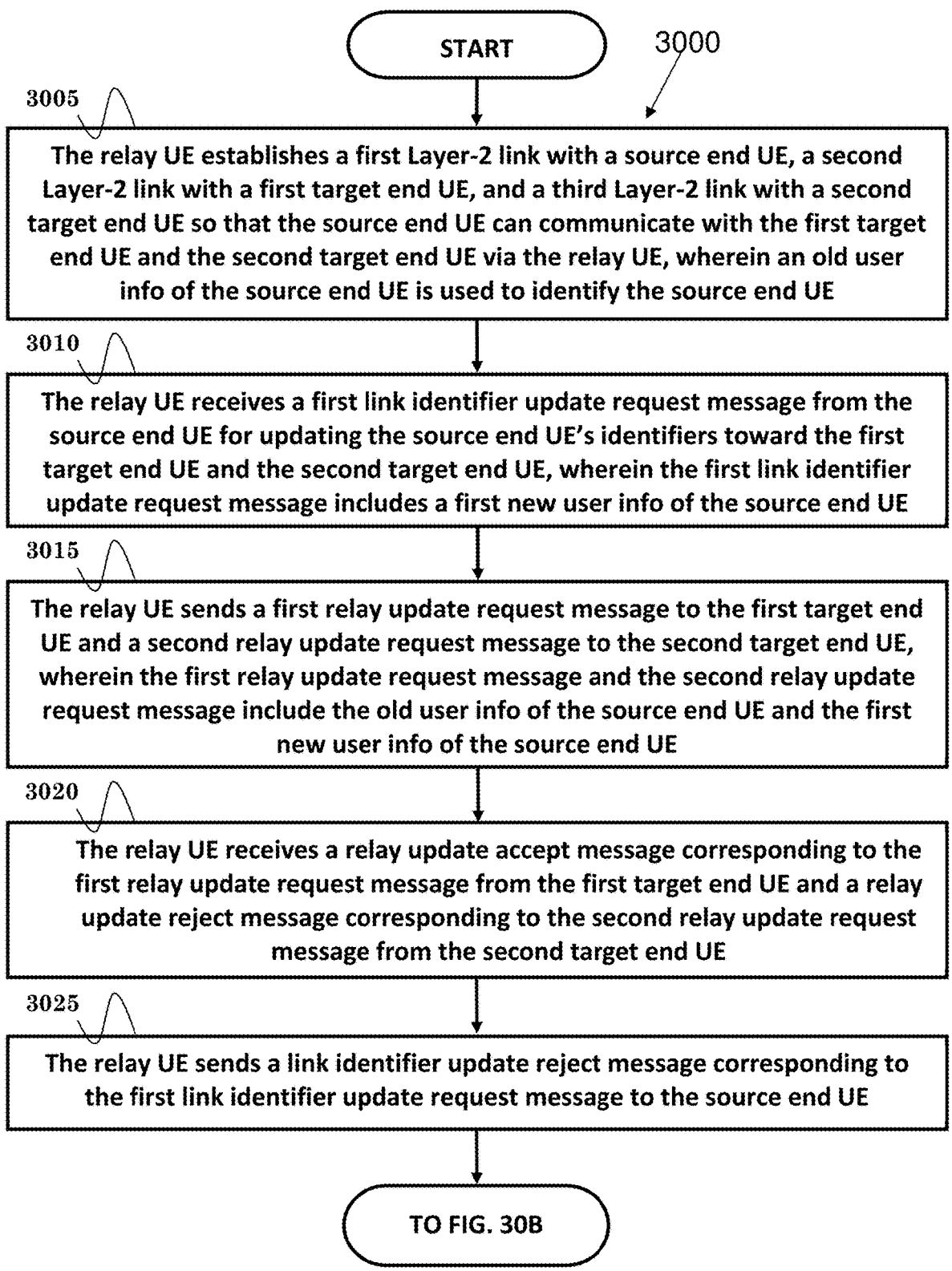
FIGS. 30A and 30B are a flow chart according to one exemplary embodiment.
Figure 30B:
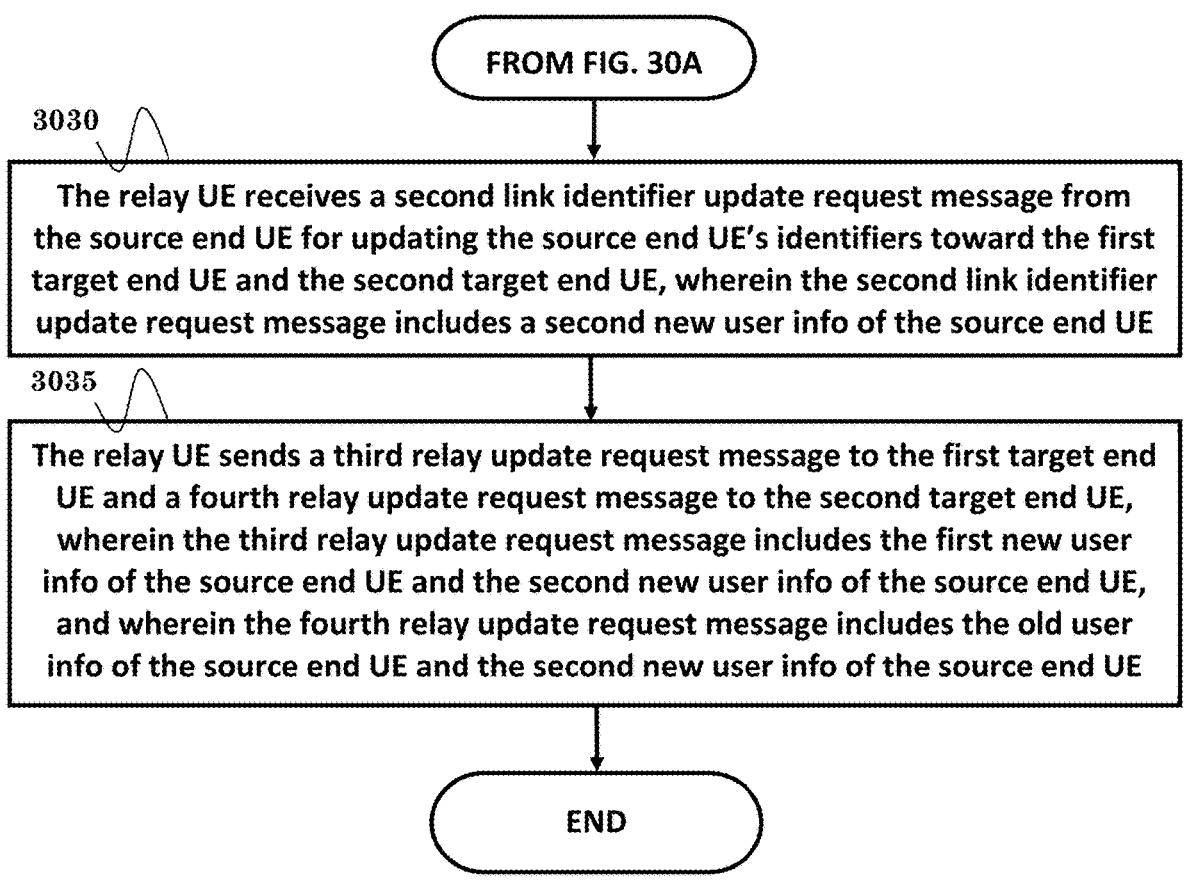

FIGS. 30A and 30B is a flow chart 3000 for a relay UE. In step 3005, the relay UE establishes a first Layer-2 link with a source end UE, a second Layer-2 link with a first target end UE, and a third Layer-2 link with a second target end UE so that the source end UE can communicate with the first target end UE and the second target end UE via the relay UE, wherein an old user info of the source end UE is used to identify the source end UE. In step 3010, the relay UE receives a first link identifier update request message from the source end UE for updating the source end UE's identifiers toward the first target end UE and the second target end UE, wherein the first link identifier update request message includes a first new user info of the source end UE. In step 3015, the relay UE sends a first relay update request message to the first target end UE and a second relay update request message to the second target end UE, wherein the first relay update request message and the second relay update request message include the old user info of the source end UE and the first new user info of the source end UE.

In step 3020, the relay UE receives a relay update accept message corresponding to the first relay update request message from the first target end UE and a relay update reject message corresponding to the second relay update request message from the second target end UE. In step 3025, the relay UE sends a link identifier update reject message corresponding to the first link identifier update request message to the source end UE. In step 3030, the relay UE receives a second link identifier update request message from the source end UE for updating the source end UE's identifiers toward the first target end UE and the second target end UE, wherein the second link identifier update request message includes a second new user info of the source end UE. In step 3035, the relay UE sends a third relay update request message to the first target end UE and a fourth relay update request message to the second target end UE, wherein the third relay update request message includes the first new user info of the source end UE and the second new user info of the source end UE, and wherein the fourth relay update request message includes the old user info of the source end UE and the second new user info of the source end UE.

In one embodiment, an old IP address/prefix of the source end UE may be used before the first link identifier update request message is received from the source end UE. The first link identifier update request message may further include a first new IP address/prefix of the source end UE. The first relay update request message may further include the old IP address/prefix of the source end UE and the first new IP address/prefix of the source end UE.

In one embodiment, the second relay update request message may further include the old IP address/prefix of the source end UE and the first new IP address/prefix of the source end UE. The relay update reject message may include information indicating the second target end UE cannot accept the second relay update request message. The second link identifier update request message may further include a second new IP address/prefix of the source end UE.

In one embodiment, the third relay update request message may further include the first new IP address/prefix of the source end UE and the second new IP address/prefix of the source end UE. The fourth relay update request message may further include the old IP address/prefix of the source end UE and the second new IP address/prefix of the source end UE. The user info may be an upper layer ID, an user info ID or an application layer ID.

Referring back to FIGS. 3 and 4, in one exemplary embodiment from the perspective of a relay UE. The relay UE 300 includes a program code 312 stored in the memory 310. The CPU 308 could execute program code 312 to enable the relay UE (i) to establish a first Layer-2 link with a source end UE, a second Layer-2 link with a first target end UE, and a third Layer-2 link with a second target end UE so that the source end UE can communicate with the first target end UE and the second target end UE via the relay UE, wherein an old user info of the source end UE is used to identify the source end UE, (ii) to receive a first link identifier update request message from the source end UE for updating the source end UE's identifiers toward the first target end UE and the second target end UE, wherein the first link identifier update request message includes a first new user info of the source end UE, (iii) to send a first relay update request message to the first target end UE and a second relay update request message to the second target end UE, wherein the first relay update request message and the second relay update request message include the old user info of the source end UE and the first new user info of the source end UE, (iv) to receive a relay update accept message corresponding to the first relay update request message from the first target end UE and a relay update reject message corresponding to the second relay update request message from the second target end UE, (v) to send a link identifier update reject message corresponding to the first link identifier update request message to the source end UE, (vi) to receive a second link identifier update request message from the source end UE for updating the source end UE's identifiers toward the first target end UE and the second target end UE, wherein the second link identifier update request message includes a second new user info of the source end UE, and (vii) to send a third relay update request message to the first target end UE and a fourth relay update request message to the second target end UE, wherein the third relay update request message includes the first new user info of the source end UE and the second new user info of the source end UE, and wherein the fourth relay update request message includes the old user info of the source end UE and the second new user info of the source end UE. Furthermore, the CPU 308 can execute the program code 312 to perform all of the above-described actions and steps or others described herein.

Alternatively, the first target end UE may apply with the source end UE's new IP address/prefix (i.e. the IP-S2) and continue to use the source end UE's old/current/original IP address/prefix (i.e. the IP-S1) when/if/after the first target end UE accepts the first relay update request message or sends a relay update accept message corresponding to the first relay update request message to the relay UE. And then, the first target end UE may replace the source end UE's old/current/original user info (i.e. the source end UE ID1) with the source end UE's new user info (i.e. the source end UE ID2) when/if/after the first target end UE receives a (very first) IP packet from the source end UE via the relay UE by using the source end UE's new IP address/prefix (i.e. the IP-S2).

Figure 29:
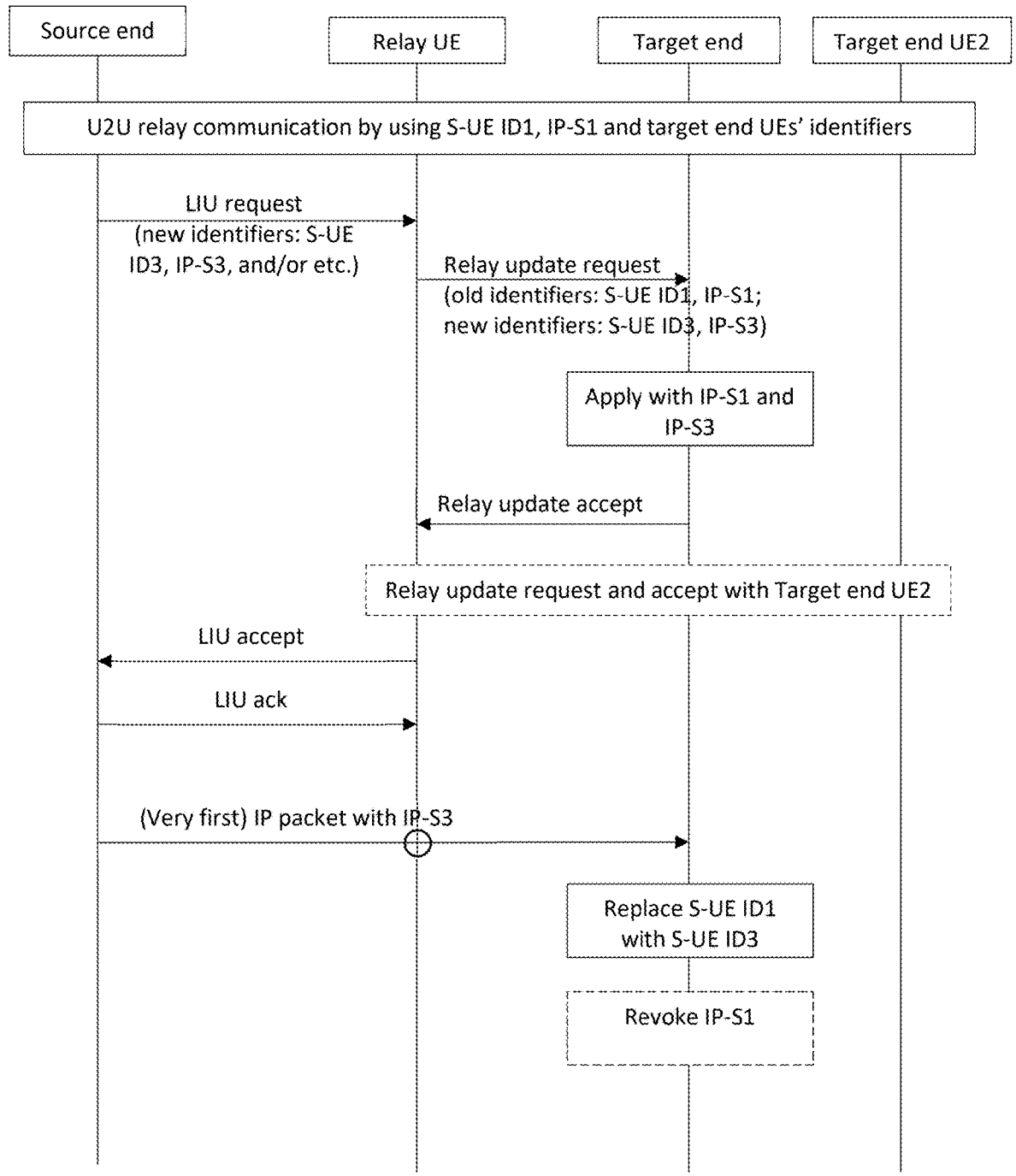
FIG. 29 is a message flow chart according to one exemplary embodiment.

Following the above example, if the first target end UE receive the third relay update request message before receiving the (very first) IP packet by using the IP-S2, the first target end UE may apply with the source end UE's second new IP address/prefix (i.e. the IP-S3) and continue to use the source end UE's old/current/original IP address/prefix (i.e. the IP-S1) when/if/after the first target end UE accepts the third relay update request message or sends a relay update accept message corresponding to the third relay update request message to the relay UE. And then, the first target end UE may replace the source end UE's old/current/original user info (i.e. the source end UE ID1) with the source end UE's second new user info (i.e. the source end UE ID3) when/if/after the first target end UE receives a (very first) IP packet from the source end UE via the relay UE by using the source end UE's second new IP address/prefix (i.e. the IP-S3). The concept of this solution could be illustrated in FIG. 29.

More specifically, said PC5 link could be a PC5 connection, unicast link, direct link, layer-2 link, and/or etc. Said source end UE could be a source 5G ProSe End UE. Said target end UE could be a target 5G ProSe End UE. Said relay UE could be a 5G ProSe UE-to-UE relay UE. Said user info could be a user info ID, application layer ID or a upper layer ID.

More specifically, the $1^{st}$ hop DCR message could be sent by using a source layer-2 ID of the source end UE and a destination layer-2 ID. The destination layer-2 ID could be a broadcast layer-2 ID associated with the relay service code or the connectivity service.

More specifically, the $2^{nd}$ hop DCR message could be sent by using a source layer-2 ID of the relay UE and a destination layer-2 ID. The destination layer-2 ID could be a broadcast layer-2 ID associated with the relay service code or the connectivity service.

More specifically, the first $2^{nd}$ hop DCA message could be sent by using a layer-2 ID of the first target end UE as Source and a layer-2 ID of the relay UE as Destination. The second $2^{nd}$ hop DCA message could be sent by using a layer-2 ID of the second target end UE as Source and a layer-2 ID of the relay UE as Destination. The $1^{st}$ hop DCA message could be sent by using a layer-2 ID of the relay UE as Source and a layer-2 ID of the source end UE as Destination.

More specifically, the PROSE DIRECT LINK IDENTIFIER UPDATE REJECT message corresponding to the PROSE UE TO UE RELAY UPDATE REJECT message could include information about which target end UE(s) cannot apply with the source end UE's one or more new identifiers. Based on the information, the source end UE may remove the target end UE(s), which cannot apply with the source end UE's one or more new identifiers, from the U2U relay communication (by e.g. initiating link modification procedure with the relay UE).

More specifically, the first/third relay update request message could be sent by using a layer-2 ID of the first target end UE as Destination and a layer-2 ID of the relay UE as Source. The second/fourth relay update request message could be sent by using a layer-2 ID of the second target end UE as Destination and a layer-2 ID of the relay UE as Source. The LIU request message could be sent by using a layer-2 ID of the relay UE as Destination and a layer-2 ID of the source end UE as Source.

More specifically, it may be feasible for the source end UE to re-initiate a LIU procedure for updating its identifiers in which the new user info could be the same but another/different IP address/prefix could be re-assigned. Thus, the source UE ID3 included in the third/fourth relay update request message could be the same as the source UE ID2 included in the first/second relay update request message, and the IP-S2 included in the first/second relay update request message could be different from the IP-S3 included in the third/fourth relay update request message.

More specifically, said relay update request message could be a PROSE UE TO UE RELAY UPDATE REQUEST message or such message with different term. Said relay update accept message could be a PROSE UE TO UE RELAY UPDATE ACCEPT message or such message with different term. Said relay update reject message could be a PROSE UE TO UE RELAY UPDATE REJECT message or such message with different term. Said link identifier update request message could be a PROSE DIRECT LINK IDENTIFIER UPDATE REQUEST message or such message with different term. Said link identifier update accept message could be a PROSE DIRECT LINK IDENTIFIER UPDATE ACCEPT message or such message with different term. Said link identifier update reject message could be a PROSE DIRECT LINK IDENTIFIER UPDATE REJECT message or such message with different term.

Figure 31:
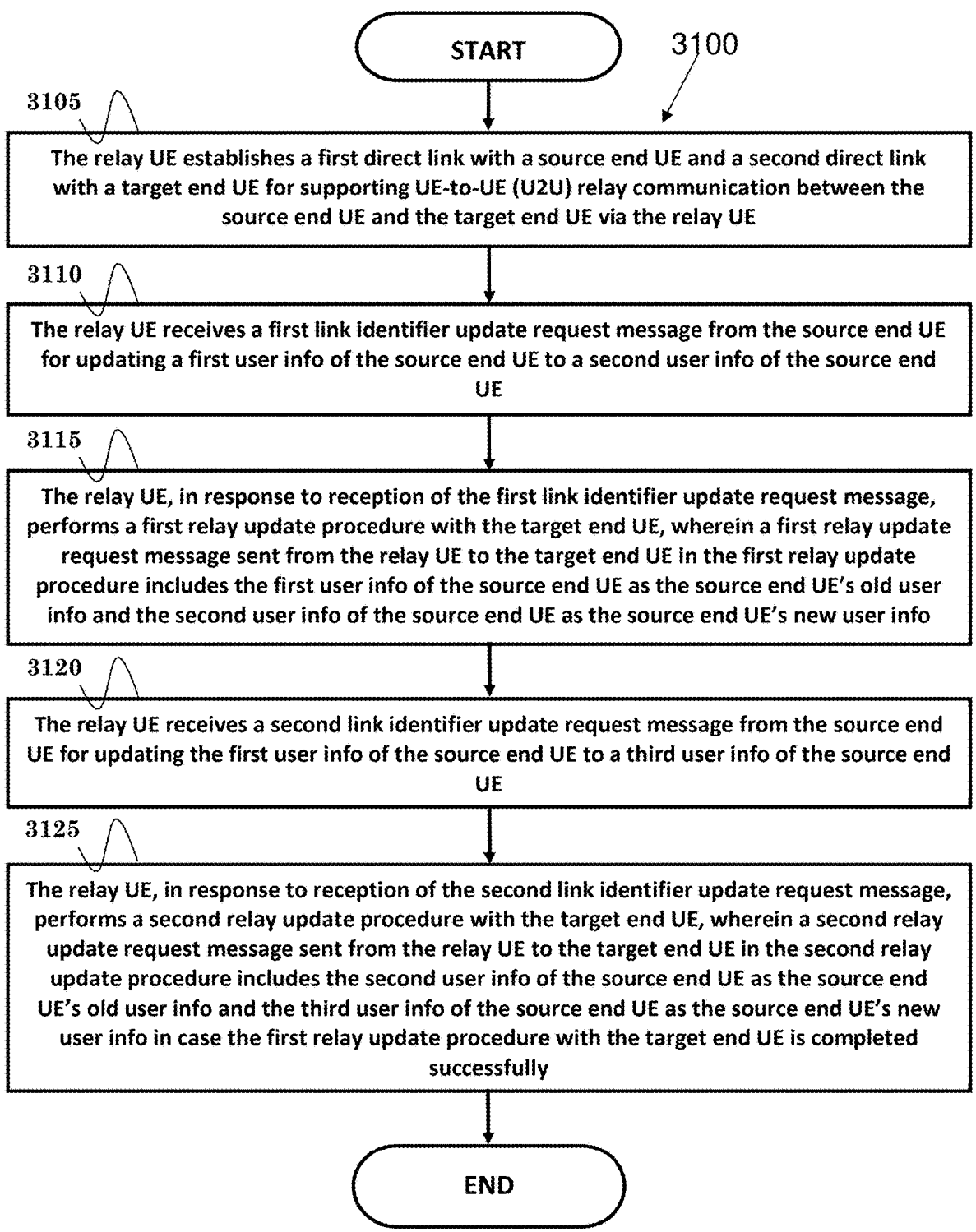
FIG. 31 is a flow chart according to one exemplary embodiment.

FIG. 31 is a flow chart 1300 for a relay UE. In step 3105, the relay UE establishes a first direct link with a source end UE and a second direct link with a target end UE for supporting UE-to-UE (U2U) relay communication between the source end UE and the target end UE via the relay UE. In step 3110, the relay UE receives a first link identifier update request message from the source end UE for updating a first user info of the source end UE to a second user info of the source end UE. In step 3115, the relay UE, in response to reception of the first link identifier update request message, performs a first relay update procedure with the target end UE, wherein a first relay update request message sent from the relay UE to the target end UE in the first relay update procedure includes the first user info of the source end UE as the source end UE's old user info and the second user info of the source end UE as the source end UE's new user info. In step 3120, the relay UE receives a second link identifier update request message from the source end UE for updating the first user info of the source end UE to a third user info of the source end UE. In step 3125, the relay UE, in response to reception of the second link identifier update request message, performs a second relay update procedure with the target end UE, wherein a second relay update request message sent from the relay UE to the target end UE in the second relay update procedure includes the second user info of the source end UE as the source end UE's old user info and the third user info of the source end UE as the source end UE's new user info in case the first relay update procedure with the target end UE is completed successfully.

In one embodiment, the relay UE could receive a relay update accept message from the target end UE in the first relay update procedure in case the first relay update procedure with the target end UE is completed successfully, wherein the relay update accept message includes the first user info of the source end UE as the source end UE's old user info and the second user info of the source end UE as the source end UE's new user info. The first or second link identifier update request message could be a PROSE DIRECT LINK IDENTIFIER UPDATE REQUEST message, the first or second relay update request message is a PROSE UE TO UE RELAY UPDATE REQUEST message, and/or the relay update accept message is a PROSE UE TO UE RELAY UPDATE ACCEPT message. The second relay update request message may include the first user info of the source end UE as the source end UE's old user info and the third user info of the source end UE as the source end UE's new user info in case the first relay update procedure with the target end UE is not completed successfully.

In one embodiment, the relay UE could receive a relay update reject message from the target end UE in the first relay update procedure in case the first relay update procedure with the target end UE is not completed successfully. The relay update reject message may be a PROSE UE TO UE RELAY UPDATE REJECT message.

Referring back to FIGS. 3 and 4, in one exemplary embodiment from the perspective of a relay UE. The relay UE 300 includes a program code 312 stored in the memory 310. The CPU 308 could execute program code 312 to enable the relay UE (i) to receive a first link identifier update request message from the source end UE for updating a first user info of the source end UE to a second user info of the source end UE, (ii) to perform a first relay update procedure with the target end UE in response to reception of the first link identifier update request message, wherein a first relay update request message sent from the relay UE to the target end UE in the first relay update procedure includes the first user info of the source end UE as the source end UE's old user info and the second user info of the source end UE as the source end UE's new user info, (iii) to receive a second link identifier update request message from the source end UE for updating the first user info of the source end UE to a third user info of the source end UE, and (iv) to perform a second relay update procedure with the target end UE in response to reception of the second link identifier update request message, wherein a second relay update request message sent from the relay UE to the target end UE in the second relay update procedure includes the second user info of the source end UE as the source end UE's old user info and the third user info of the source end UE as the source end UE's new user info in case the first relay update procedure with the target end UE is completed successfully. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a relay User Equipment (UE), comprising:
   the relay UE establishes a first direct link with a source end UE and a second direct link with a target end UE for supporting UE-to-UE (U2U) relay communication between the source end UE and the target end UE via the relay UE;
   the relay UE receives a first link identifier update request message from the source end UE for updating a first user info of the source end UE to a second user info of the source end UE;
   the relay UE, in response to reception of the first link identifier update request message, performs a first relay update procedure with the target end UE, wherein a first relay update request message sent from the relay UE to the target end UE in the first relay update procedure includes the first user info of the source end UE as the source end UE's old user info and the second user info of the source end UE as the source end UE's new user info;
   the relay UE receives a second link identifier update request message from the source end UE for updating the first user info of the source end UE to a third user info of the source end UE; and
   the relay UE, in response to reception of the second link identifier update request message, performs a second relay update procedure with the target end UE, wherein a second relay update request message sent from the relay UE to the target end UE in the second relay update procedure includes the second user info of the source end UE as the source end UE's old user info and the third user info of the source end UE as the source end UE's new user info in case the first relay update procedure with the target end UE is completed successfully.

2. The method of claim 1, further comprising:
   the relay UE receives a relay update accept message from the target end UE in the first relay update procedure in case the first relay update procedure with the target end UE is completed successfully, wherein the relay update accept message includes the first user info of the source end UE as the source end UE's old user info and the second user info of the source end UE as the source end UE's new user info.

3. The method of claim 2, wherein the first or second link identifier update request message is a PROSE DIRECT LINK IDENTIFIER UPDATE REQUEST message, the first or second relay update request message is a PROSE UE TO UE RELAY UPDATE REQUEST message, and/or the relay update accept message is a PROSE UE TO UE RELAY UPDATE ACCEPT message.

4. The method of claim 1, wherein the second relay update request message includes the first user info of the source end UE as the source end UE's old user info and the third user info of the source end UE as the source end UE's new user info in case the first relay update procedure with the target end UE is not completed successfully.

5. The method of claim 4, further comprising:
   the relay UE receives a relay update reject message from the target end UE in the first relay update procedure in case the first relay update procedure with the target end UE is not completed successfully.

6. The method of claim 5, wherein the relay update reject message is a PROSE UE TO UE RELAY UPDATE REJECT message.

7. A relay User Equipment (UE), comprising:
   a control circuit;
   a processor installed in the control circuit; and
   a memory installed in the control circuit and operatively coupled to the processor;
   wherein the processor is configured to execute a program code stored in the memory to:
      establish a first direct link with a source end UE and a second direct link with a target end UE for supporting UE-to-UE (U2U) relay communication between the source end UE and the target end UE via the relay UE;
      receive a first link identifier update request message from the source end UE for updating a first user info of the source end UE to a second user info of the source end UE;
      perform, in response to reception of the first link identifier update request message, a first relay update procedure with the target end UE, wherein a first relay update request message sent from the relay UE to the target end UE in the first relay update procedure includes the first user info of the source end UE as the source end UE's old user info and the second user info of the source end UE as the source end UE's new user info;
      receive a second link identifier update request message from the source end UE for updating the first user info of the source end UE to a third user info of the source end UE; and
      perform, in response to reception of the second link identifier update request message, a second relay update procedure with the target end UE, wherein a second relay update request message sent from the relay UE to the target end UE in the second relay update procedure includes the second user info of the source end UE as the source end UE's old user info and the third user info of the source end UE as the source end UE's new user info in case the first relay update procedure with the target end UE is completed successfully.

8. The relay UE of claim 7, wherein the processor is further configured to execute a program code stored in the memory to:
   receive a relay update accept message from the target end UE in the first relay update procedure in case the first relay update procedure with the target end UE is completed successfully, wherein the relay update accept message includes the first user info of the source end UE as the source end UE's old user info and the second user info of the source end UE as the source end UE's new user info.

9. The relay UE of claim 8, wherein the first or second link identifier update request message is a PROSE DIRECT LINK IDENTIFIER UPDATE REQUEST message, the first or second relay update request message is a PROSE UE TO UE RELAY UPDATE REQUEST message, and/or the relay update accept message is a PROSE UE TO UE RELAY UPDATE ACCEPT message.

10. The relay UE of claim 7, wherein the second relay update request message includes the first user info of the source end UE as the source end UE's old user info and the third user info of the source end UE as the source end UE's new user info in case the first relay update procedure with the target end UE is not completed successfully.

11. The relay UE of claim 10, wherein the processor is further configured to execute a program code stored in the memory to:
   receive a relay update reject message from the target end UE in the first relay update procedure in case the first relay update procedure with the target end UE is not completed successfully.

12. The relay UE of claim 11, wherein the relay update reject message is a PROSE UE TO UE RELAY UPDATE REJECT message.

* * * * *